(12) United States Patent  
Kim et al.

(10) Patent No.: US 6,888,589 B2
(45) Date of Patent: May 3, 2005

(54) MATRIX-TYPE DISPLAY CAPABLE OF BEING REPAIRED BY PIXEL UNIT AND A REPAIR METHOD THEREFOR

(75) Inventors: Kyung-seop Kim, Kyungki-do (KR); Woon-yong Park, Kyungki-do (KR); Jung-hee Lee, Seoul (KR); Shi-yual Kim, Kyungki-do (KR); Kyung-nam Lee, Kyungki-do (KR); Dong-gyu Kim, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/436,975

(22) Filed: Jul. 28, 2003

(65) Prior Publication Data

US 2004/0001176 A1 Jan. 1, 2004

Related U.S. Application Data

(60) Continuation of application No. 09/625,997, filed on Jul. 26, 2000, now abandoned, which is a division of application No. 08/742,969, filed on Nov. 1, 1996, now Pat. No. 6,100,948.

(30) Foreign Application Priority Data

Nov. 1, 1995 (KR) ............................................. 95-39530
Jul. 30, 1996 (KR) ............................................. 96-31403

(51) Int. Cl.[7] ............................................. G02F 1/1333
(52) U.S. Cl. ......................................... 349/54; 349/139
(58) Field of Search ........................... 349/40, 43, 139, 349/54

(56) References Cited

U.S. PATENT DOCUMENTS

| 4,807,973 | A  | 2/1989  | Kawasaki |
| 5,121,236 | A  | 6/1992  | Ukai et al. |
| 5,202,778 | A  | 4/1993  | Niki |
| 5,303,074 | A  | 4/1994  | Salisbury |
| 5,608,558 | A  | 3/1997  | Katsumi |
| 5,648,826 | A  | 7/1997  | Song et al. |
| 5,696,566 | A  | 12/1997 | Kim et al. |
| 5,724,107 | A  | 3/1998  | Nishikawa et al. |
| 5,969,779 | A  | 10/1999 | Kim et al. |
| 6,313,889 | B1 | 11/2001 | Song et al. |
| 6,317,176 | B1 | 11/2001 | Kim et al. |

FOREIGN PATENT DOCUMENTS

| DE | 43 18 028 A | 12/1993 |
| EP | 0 461 417 A | 12/1991 |
| JP | 4-96023     | 3/1992  |
| JP | 5-297412    | 11/1993 |

Primary Examiner—Toan Ton
(74) Attorney, Agent, or Firm—Volentine Francos & White, PLLC

(57) ABSTRACT

A matrix-type display capable of being repaired by pixel unit, Two or more of signal lines such as scanning lines, image signal lines and auxiliary signal lines and a pixel electrode are overlapped via an insulating layer, so that a defect such as the disconnection of the image signal lines and scanning lines, the short of the pixel electrode and the signal line, and the loss of electrode of a switching element, and a pixel defect can be repaired. Here, the layout of the auxiliary gate line and dual gate line can be modified.

8 Claims, 46 Drawing Sheets

FIG.27A
FIG.27B
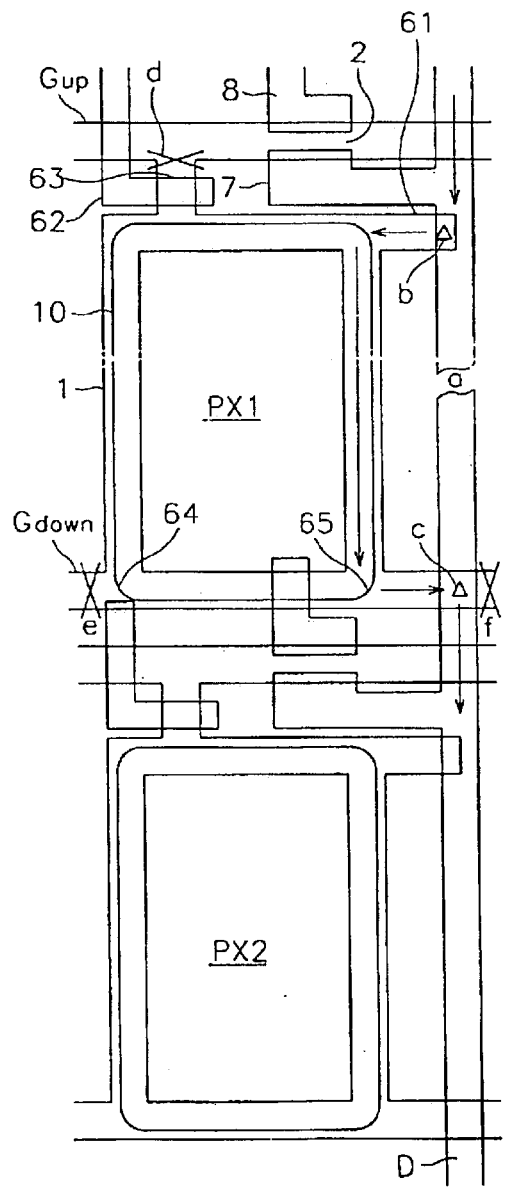
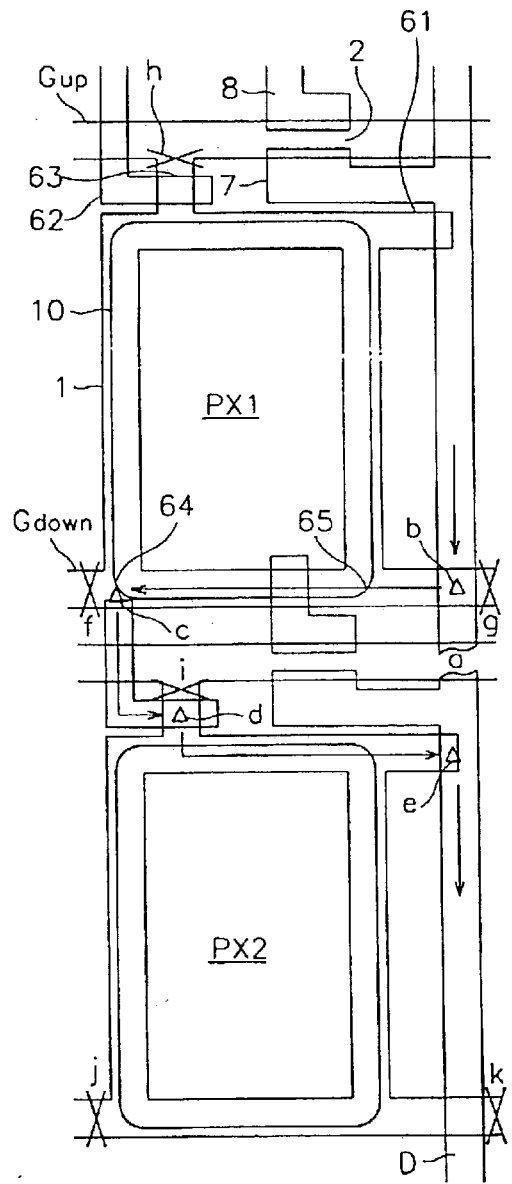

MATRIX-TYPE DISPLAY CAPABLE OF BEING REPAIRED BY PIXEL UNIT AND A REPAIR METHOD THEREFOR

CROSS REFERENCE TO RELATED APPLICATIONS

This is a continuation application of application Ser. No. 09/625,997, filed Jul. 26, 2000, now abandoned, which is a divisional application of application Ser. No. 08/742,969, filed Nov. 1, 1996, now U.S. Pat. No. 6,100,948 which is hereby incorporated by reference in its entirety for all purposes.

BACKGROUND OF THE INVENTION

The present invention relates to a matrix-type display and a repair method therefor, and more particularly, to a matrix-type display which can be repaired by pixel unit.

As an interface between a person and a computer, there are several flat panel displays such as liquid crystal displays (LCDs), plasma display panels (PDPs), electroluminesences (ELs) and field emission displays (FPDs), replacing conventional cathode ray tubes (CRTs). These flat panel displays adopt a matrix-type wiring layout in which horizontal and vertical signal lines cross.

This conventional matrix-type wiring layout is described with reference to the drawings.

FIG. 1 shows the layout of a conventional matrix-type display.

As shown in FIG. 1, in the conventional matrix-type display, a plurality of scanning lines $G_1, G_2, \ldots,$ and $G_m$ are formed parallel to one another in the horizontal direction and a plurality of image signal lines $D_1, D_2, D_3, D_4, \ldots, D_{2n-1}$ and $D_{2n}$ are formed in the vertical direction, which cross the scanning lines with an insulating layer being interposed therebetween.

Each scanning line $G_1, G_2, \ldots,$ or $G_m$ has an input pad $GP_1, GP_2, \ldots, GP_m$ at one end through which scanning signals are input from outside, and each the image signal line $D_1, D_2, D_3, D_4, \ldots, D_{2n-1}$ or $D_{2n}$ also has input pads $DP_1, DP_2, DP_3, DP_4, \ldots, DP_{2n-1}$ and $DP_{2n}$. Here, the input pads of a group of the image signal lines $D_1, D_3, \ldots$ and $D_{2n-1}$ are formed at upper end of the data lines, and the other group of the image signal lines $D_2, D_4, \ldots$ and $D_{2n}$ have the input pads at their lower end.

On the other hand, pixels (PX) are formed in the region defined by the scanning lines $G_1, G_2, \ldots, G_m$ and the image signal lines $D_1, D_2, D_3, D_4, \ldots D_{2n-1}$ and $D_{2n}$. Here, the layout of the pixels depend on the types of the displays.

The LCDs using an electro-optical effect of a liquid crystal materials have been highlighted among the flat panel displays. The driving modes of the LCD are roughly classified into a simple matrix type and an active matrix type.

The active matrix type LCD controls the pixels using a switching element having a non-linear characteristics. A thin film transistor (TFT) having three terminals is generally used as the switching element, and a thin film diode (TFD) such as a metal insulator metal (MIM) having two terminals is often used as the switching element.

Especially, the twisted nematic (TN) LCD adopting a TFT as a switching element is comprised of a TFT array panel, a color filter panel, and a liquid crystal material therebetween. The TFT array panel has TFTs, pixel electrodes, scanning lines (or gate lines) for transmitting scanning signals (or switching signals) and image signal lines or data lines for supplying a image signal. The color filter panel consists of a common electrode and color filters.

Hereinafter, the pixel layout of the TFT LCD will be described with reference to FIG. 2.

FIG. 2 shows a conventional TFT LCD. Each pixel (PX) includes a TFT, a liquid crystal capacitor $L_{lc}$, a storage capacitor $C_{st}$, etc. The TFT is formed on a lower substrate, a liquid crystal capacitor $C_{lc}$ is comprised of a pixel electrode 10 on the lower substrate, a common electrode CE on an upper substrate and a liquid crystal material filled therebetween, and a storage capacitor $C_{st}$ formed on the lower substrate. The storage capacitor $C_{st}$ prevents the charges in the liquid crystal capacitor $C_{lc}$ from discharging for a time. On the other hand, the pixel PX is connected to a data line and a gate line via the TFT. For example, three terminals of the TFT are connected to the data line, the gate line and the pixel electrode 10, respectively. However, in FIG. 2, the TFT for switching a pixel PX exists outside the pixel PX, that is, a terminal of the TFT is connected to a pixel electrode 10 of the adjacent pixel so as to drive the adjacent pixel. A TFT for driving a pixel may be formed in the corresponding pixel.

When either a constant voltage or a periodical voltage is applied to the common electrode CE, and a voltage is applied to the pixel electrode 10 via the TFT, the display operation is performed by the electro-optical effect of the liquid crystal material composing the liquid crystal capacitor $C_{lc}$.

Referring to FIGS. 3 and 4, the plan layout and the vertical layout of the TFT array panel of the LCD shown in FIGS. 1 and 2 will be described.

FIG. 3 shows the layout of the TFT array panel corresponding to the lower panel of the LCD shown in FIG. 2. The gate line is in the shape of a closed curve enclosing the pixel electrode. FIG. 4 is a sectional view of a portion cut along a line A—A in FIG. 3. In fact, the regions represented by $PX_i$ (i=1, 2, 3, 4) having rectangle-like shapes, correspond to the lower portion of a pixel. For convenience, the rectangle-like regions including the gate line and the data line are called as "pixels" or "pixel regions". Also, let a group of pixels formed along the horizontal direction and a group of pixels formed along the vertical direction as "a pixel row" and "a pixel column", respectively.

As shown in FIGS. 3 and 4, the upper and lower gate lines $G_{up}$ and $G_{down}$ are formed on a transparent insulating substrate in the above and below of a pixel row. The lower gate line $G_{down}$ extends straight in the horizontal direction. The upper gate line $G_{up}$ is comprised of a first horizontal portion $G_{h1}$ which is the longest portion thereof, a first vertical portion $G_{v1}$ extending downward from the end of the first horizontal portion $G_{h1}$, a second horizontal portion $G_{h2}$, extending in the horizontal direction from the end of the first vertical portion $G_{v1}$, and a second vertical portion $G_{v2}$ extending upward from the end of the second horizontal portion $G_{h2}$. This layout of the upper gate line $G_{up}$ is repeated by pixel. Generally, the above dual layout of the gate line is called as a dual gate line layout.

The first horizontal portion $G_{h1}$ of the upper gate line $G_{up}$ and the lower gate line $G_{down}$ or are connected by a left auxiliary gate line 1a, and the second vertical portion $G_{v2}$ of the upper gate line $G_{up}$ is lengthened downward to form a right auxiliary gate line 1b reaching the lower gate line $G_{down}$.

A data line D is vertically formed between each pixel column and crosses with the first horizontal portion $G_{h1}$ of the upper gate line $G_{up}$ and the lower gate line $G_{down}$ via an gate insulating layer 4 (see FIG. 4).

The upper and lower gate lines $G_{up}$ and $G_{down}$ and a pair of the left and the right auxiliary gate lines 1a and 1b form a closed curve and serve as a black matrix. Within the region defined by the closed curve, there is a pixel electrode 10 which is overlapped with the gate lines $G_{up}$ and $G_{down}$ and the auxiliary gate lines 1a and 1b. And a gate insulating layer 4 (see FIG. 4) and a protection layer 9 (see FIG. 4) are interposed between the pixel electrode 10 and the gate lines $G_{up}$ and $G_{down}$ and the auxiliary gate lines 1a and 1b. The overlapped portions plays as the storage capacitor $C_{st}$ (see FIG. 2). This storage capacitor formed along a closed curve is called a "ring capacitor". However, only the upper and lower gate lines $G_{up}$ and $G_{down}$ and the auxiliary gate lines 1a and 1b forming the ring capacitor is often called a ring capacitor. Here, a ring capacitor means the latter.

It is preferable that the gate lines $G_{up}$ and $G_{down}$ and the auxiliary gate lines 1a and 1b have the above described layout of a closed-curve shape surrounding the pixel electrode 10 since a gate signal can be transferred even if the part of the gate lines $G_{up}$ and $G_{down}$ and the auxiliary gate lines 1a and 1b are disconnected.

In the meantime, a TFT is formed on the second vertical portion $G_{v2}$ of the upper gate line $G_{up}$, which will be described in detail with reference to FIGS. 3 and 4.

A part of the second vertical portion $G_{v2}$ serves as a gate electrode 2 of the TFT. When the gate lines $G_{up}$ and $G_{down}$ are made of material which can be anodized, such as aluminum, they, except gate pads (not shown) electrically connecting the gate lines $G_{up}$ and $G_{down}$ to the outside, are anodized in general. Thus, a gate oxide layer 3 which is anodized part of the gate lines exists on the gate electrode 2. A gate insulating layer 4 is formed on the whole surface of the gate oxide layer 3 excluding the gate pad.

A semiconductor layer 5 is formed covering the gate electrode 2 with the gate insulating layer 4 being interposed therebetween. The semiconductor layer 5 is also formed on the gate lines $G_{up}$ and $G_{down}$ to prevent a short between the gate lines $G_{up}$ and $G_{down}$ and a data line D. Generally, the semiconductor layer 5 is made of amorphous silicon or polysilicon.

A contact layer 6 for improving an ohmic contact between the semiconductor layer 5 and a metal of the data line D is formed on the semiconductor layer 5, which is generally made of n+ amorphous silicon doped with n impurities of a high concentration.

The source electrode 7, which is a branch of the data line D, and the drain electrode 8 separated from the source electrode 7 are formed on the contact layer 6. Since the source electrode 7 locates near a cross point between the upper gate line $G_{up}$ and the data line D, the source electrode 7 may be overlapped with the first horizontal portion $G_{h1}$ of the upper gate line $G_{up}$ of the next pixel, as shown in FIG. 3. One end of the drain electrode 8 opposites to the source electrode 7 with respect to the gate electrode 2, and the other end of the drain electrode 8 is connected to the pixel electrode 10 of the upper pixel in the same pixel column, with crossing the lower gate line $G_{down}$ or of the upper pixel. For example, as shown in FIG. 3, the drain electrode 8 of the pixel PX2 is connected to the pixel electrode 10 of the pixel PX1 which is the upper pixel of the same pixel column, with crossing the lower gate line $G_{down}$ located beneath the pixel electrode 10 of the pixel PX1.

A passivation layer 10 covers the resultant surface where the source electrode 7 and the drain electrode 8 are formed, excluding on the contact portion between the drain electrode 8 and the pixel electrode 10 and pads (not shown), and the pixel electrode 10 made of a transparent conductive material is formed on the passivation layer 9.

In the pixel layout shown in FIG. 3, a TFT (including a gate electrode, a source electrode and a drain electrode) formed in a pixel region does not drive the pixel electrode in the pixel region. However, for the convenience, the TFT will be called "the TFT (the gate electrode, the source electrode and the drain electrode) of the pixel" through the whole specification.

The described above, the flat panel displays, particularly, the TFT array panel for the LCD has wirings such as the gate and the data lines for supplying signals to the pixels. These wirings may be easily disconnected or shorted by a topographical characteristic of the region through which they pass or by the subsequent heat treatments or etching processes. If a wiring is disconnected or shorted, the signals required for driving the pixel cannot be applied and the display operation cannot be performed properly.

In fact, the above described LCD having the gate wiring layout including the upper and the lower gate lines $G_{up}$ and $G_{down}$ and the auxiliary gate lines 1a and 1b, the disconnection of the gate wiring $G_{up}$, $G_{down}$, 1a and 1b is easily repaired. However, in cases of the disconnection of the data line D, the short of the pixel electrode 10 and the gate wiring $G_{up}$, $G_{down}$, 1a and 1b, and the defect of the gate electrode 2, it is difficult to repair.

To solve the above problems, several solutions have been suggested. Among the solutions, one solution uses a repair line formed in a shape of a closed curve around a display region comprised of the pixels. The repair line crosses the gate lines and the data lines with being overlapped with them via an insulating layer. If a wiring is disconnected, then the repair line complements the disconnected wiring.

The conventional matrix-type display in which a repair line is formed in shape of a closed curve around a display region will be described in detail with reference to FIG. 5.

As shown in FIG. 5, a repair line RL made of a conductive material crosses a plurality of linear scanning lines $G_1$, $G_2$, ..., $G_m$ formed in the horizontal direction and a plurality of linear image signal lines $D_1$, $D_2$, $D_3$, $D_4$, ..., $D_{2n-1}$ and $D_{2n}$ crossing the linear scanning lines. The repair line RL crosses once each scanning line $G_1$, $G_2$, ..., or $G_m$, and twice each image signal line $D_1$, $D_2$, $D_3$, $D_4$, ..., $D_{2n-1}$ or $D_{2n}$, at the upper and the lower end portions. Here, since the cross points of the repair line RL, the scanning lines $G_1$, $G_2$, ..., $G_m$ and the image signal lines $D_1$, $D_2$, $D_3$, $D_4$, ..., $D_{2n-1}$, and $D_{2n}$ have insulating layers therebetween, the cross portions play as capacitors.

Hereinafter, the operation of the above described matrix-type display will be described in detail.

Switching signals are applied to the TFTs in each pixel row in sequence via the scanning lines $G_1$, $G_2$, ..., and $G_m$ formed in the horizontal direction and image signals are applied to the pixel electrodes 10 via the image signal lines $D_1$, $D_2$, $D_3$, $D_4$, ..., $D_{2n-1}$ and $D_{2n}$ and the TFTs.

For example, as shown FIG. 5, supposing that an image signal line $D_3$ is disconnected. The open point is represented as a mark "≈". An image signal passing through the image signal line $D_3$ does not reach a portion of the data line below the open point. Then, the upper and the lower cross points of the image signal line $D_3$ and the repair line RL, represented by Δ, are shorted using a laser. Concerning a pixel connected to the image signal line $D_3$ below the disconnect point, an image signal from the input pad $DP_3$ passes the shorted upper cross point, moves along a left path $P_1$ or a right path $P_2$ of the repair line RL. However, since the right path $P_2$ is longer than the path $P_1$ and crosses more image signal lines than the path $P_1$ cross, it is more effective to use the left path $P_1$ than to use the path $P_2$. Thus, it is required to transmit the signal only along the path $P_1$ and to block the path $P_2$. Therefore, two points on the path $P_2$ represented by a mark "x", which are near the short points, are cut. As a result, the signal can be applied to the image signal line $D_3$ below the disconnect point via the path $P_1$ of the repair line RL.

In the meantime, the signal passing through the path $P_1$ is forced to meet the cross points a and a' of the image signal lines $D_1$ and $D_2$ and the repair line RL. In fact, as described above, the cross points a and a' function as a capacitor which distorts the image signal passing through the repair line RL. Particularly, since the number of the electrical lines increases, the number of the cross points existing on the path as the size of the screen increases, and thus the number of the capacitors increases, the overall electrostatic capacitance also increases and the signal distortion increases. In addition, since the length of the repair line RL increases and thus the resistance increases, the signal passing through the repair line RL is further distorted by a RC time delay.

Also, the number of the image signal lines $D_1, D_2, D_3, D_4, \ldots, D_{2n-1}$ and $D_{2n}$ which can be repaired using the repair line RL is limited due to the limitation of a space.

Furthermore, when pixel defects, such as disablement of transmission of the image signals to the pixel electrodes, are generated due to the defect of the TFTs, it is impossible to repair.

SUMMARY OF THE INVENTION

To solve the above problems, it is an object of the present invention to provide a matrix-type display by which nearly all disconnection of signal lines is effectively repaired while preventing the increase of the processing number, the decrease of an aperture ratio and a RC time delay, and the defects caused from a short between pixel electrodes and signal lines and a loss in an electrode of a switching element can be repaired.

It is another object of the present invention to provide a method for repairing disconnection of a data line of the matrix-type display.

Another object of the invention is to provide a method for repairing the pixel defect.

As one aspect of the first object, the matrix-type display having a plurality of pixel regions arranged in a matrix-type, comprises:

an upper first signal line and a lower first signal line formed in a horizontal direction, the upper and the lower first signal lines serving as an upper and a lower boundaries of each pixel region respectively;

a second signal line formed in a vertical direction between pixel regions, the second signal line crossing the upper and the lower first signal lines and being insulated from the upper and the lower first signal lines;

an auxiliary signal line formed adjacent to the second signal line, wherein the auxiliary signal lines serves as a left or a right boundary of the each pixel region, and the upper and the lower gate lines and the auxiliary signal line have at least three cross points with the second signal line together;

a transparent pixel electrode, formed in each pixel region; and a switching element having a first terminal connected to the upper or the lower first signal line, a second terminal connected to the pixel electrode, and a third terminal connected to the second signal line.

The auxiliary signal line may be connected to the upper or the lower first signal lines, and/or overlapped with the pixel electrode to serve as a storage electrode, and/or made of an opaque metal to shield a periphery of the pixel electrode as a black matrix.

The matrix-type display in this invention may further comprises an isolated connecting member overlapped with the upper first signal line in a pixel region and the lower first signal line in the upper pixel region. It is preferable that the display comprises an isolated connecting means overlapped with the auxiliary signal line in a pixel region and that in the upper pixel region, respectively.

In order to repair an open of a data line in a matrix-type display having pixel regions in which a gate line for transmitting a gate signal, a data line for transmitting a data signal, a transparent pixel electrode, a switching element and an auxiliary gate line, wherein the gate line and the auxiliary gate line together have at least two cross points with the data line, the gate line or the auxiliary gate line is short-circuited with the data line at the cross points adjacent to an open point of the data line, and the auxiliary gate line is separated from the gate line. Therefore the auxiliary gate line serves as a bypass of the open point.

Preferably, the gate line comprises two parts serving as an upper and an lower boundaries of each pixel region.

The auxiliary gate line may be overlapped with the pixel electrode to be used as an storage electrode.

Instead of the auxiliary gate line, a storage electrode overlapped with the pixel electrode is formed. Then, the storage electrode has at least two cross points with the data line. In this case, the repair method comprises the steps of isolating the storage electrode adjacent to an open point of the data line, and short-circuiting the isolated storage electrode with the data line at the cross points adjacent to the open point.

When a pixel defect is generated in a pixel region, a pixel electrode in the pixel region is connected to a gate line or a data line through a auxiliary signal line, thereby supplying a gate signal or a data signal to the pixel electrode.

The auxiliary pixel electrode may be connected to the gate line and overlapped with the pixel electrode and the data line via an insulating material. The auxiliary signal line and the date line is short-circuited at the overlapped point, thereby connecting them. The liquid crystal display may include a connecting member formed between the auxiliary signal line and the pixel electrode via insulating materials and the connecting member at the overlapped point is made of the material of which the data line is made. In this case, the connection of the auxiliary signal line and the pixel electrode is made by using the connecting member. If the auxiliary signal line is connected to the gate line, it should be separated from the gate line.

Another case is that the liquid crystal display includes connecting means overlapped with the auxiliary signal line and the pixel electrode, respectively, and the auxiliary signal line is overlapped with the data line via an insulating material. Furthermore, the connecting means is made of the materials of which the data line is made. In this case, the auxiliary signal line and the connecting means are short-circuited at the overlapped point of them, the connecting means and the pixel electrode are short-circuited at the overlapped point of them, and the auxiliary signal line and the data line are short-circuited at the overlapped point of them, thereby the pixel electrode is connected to the data line. When the auxiliary signal line is connected to the gate line, the auxiliary signal line is separated from the gate line.

BRIEF DESCRIPTION OF THE DRAWINGS

The above objects and advantages of the present invention will become more apparent by describing in detail preferred embodiments thereof with reference to the attached drawings in which:

FIGS. 27A to 27D illustrates methods for repairing defects of the LCD shown in FIG. 26;

DETAILED DESCRIPTION OF THE INVENTION

Referring to FIGS. 6A to 15, a basic concept of the present invention and the operation thereof will be described.

Here, since a main purpose of the present invention is to repair a second signal line or a data line, the dual gate line structure and the ring capacitor structure both can be adopted as it is. However, only one of these two structures may be adopted when required and their modifications may be utilized.

Some examples of the structures are suggested.

As a first type, the dual gate line structure and the ring capacitor structure are both adopted.

As a second type, only the dual gate line structure is adopted. That is, the auxiliary gate lines 1$a$ and 1$b$ in FIG. 3 are removed.

As a third type, only the ring capacitor structure is adopted. The part of the lower gate line $G_{down}$, which does not form the ring capacitor, is removed in FIG. 3. In this case, there is no need to distinguish the auxiliary gate lines 1$a$ and 1$b$ and the remaining lower gate line $G_{down}$.

As a fourth type, there is a structure in which the part of the lower gate line $G_{down}$ or, which forms the ring capacitor, is removed. In this case, there is no need to distinguish the auxiliary gate lines 1$a$ and 1$b$ and the remaining part of the lower gate line $G_{down}$. However, the remaining lower gate line $G_{down}$ does not function as an electrode of a storage capacitor.

Figure 1:
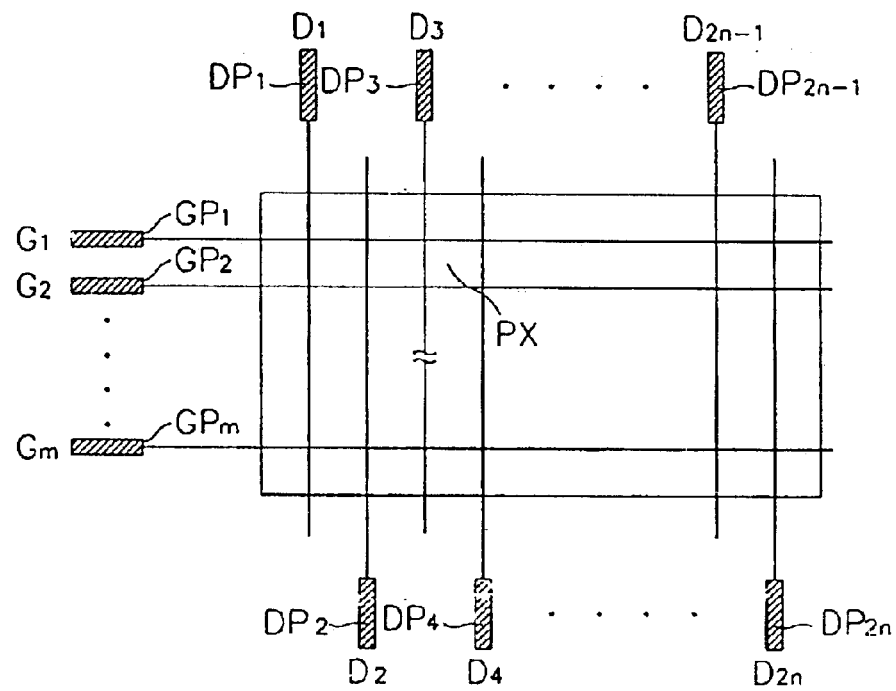
FIG. 1 is a plan view showing the wiring layout of a matrix-type display.
Figure 2:
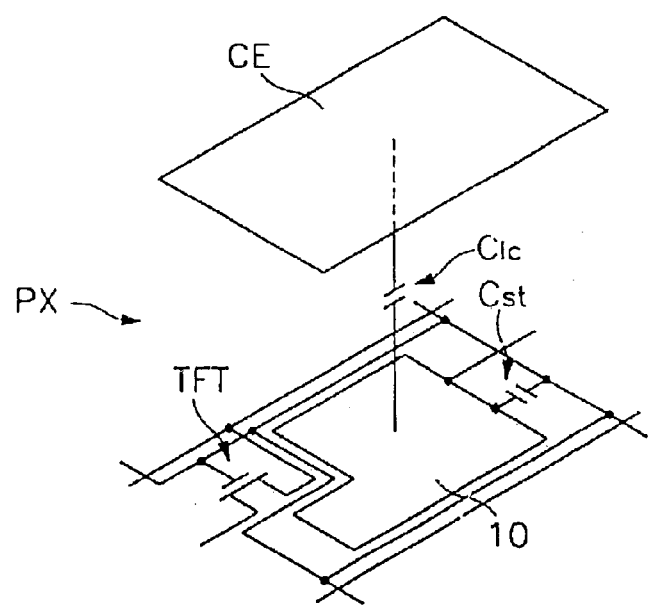
FIG. 2 illustrates a pixel of a conventional TFT LCD.
Figure 3:
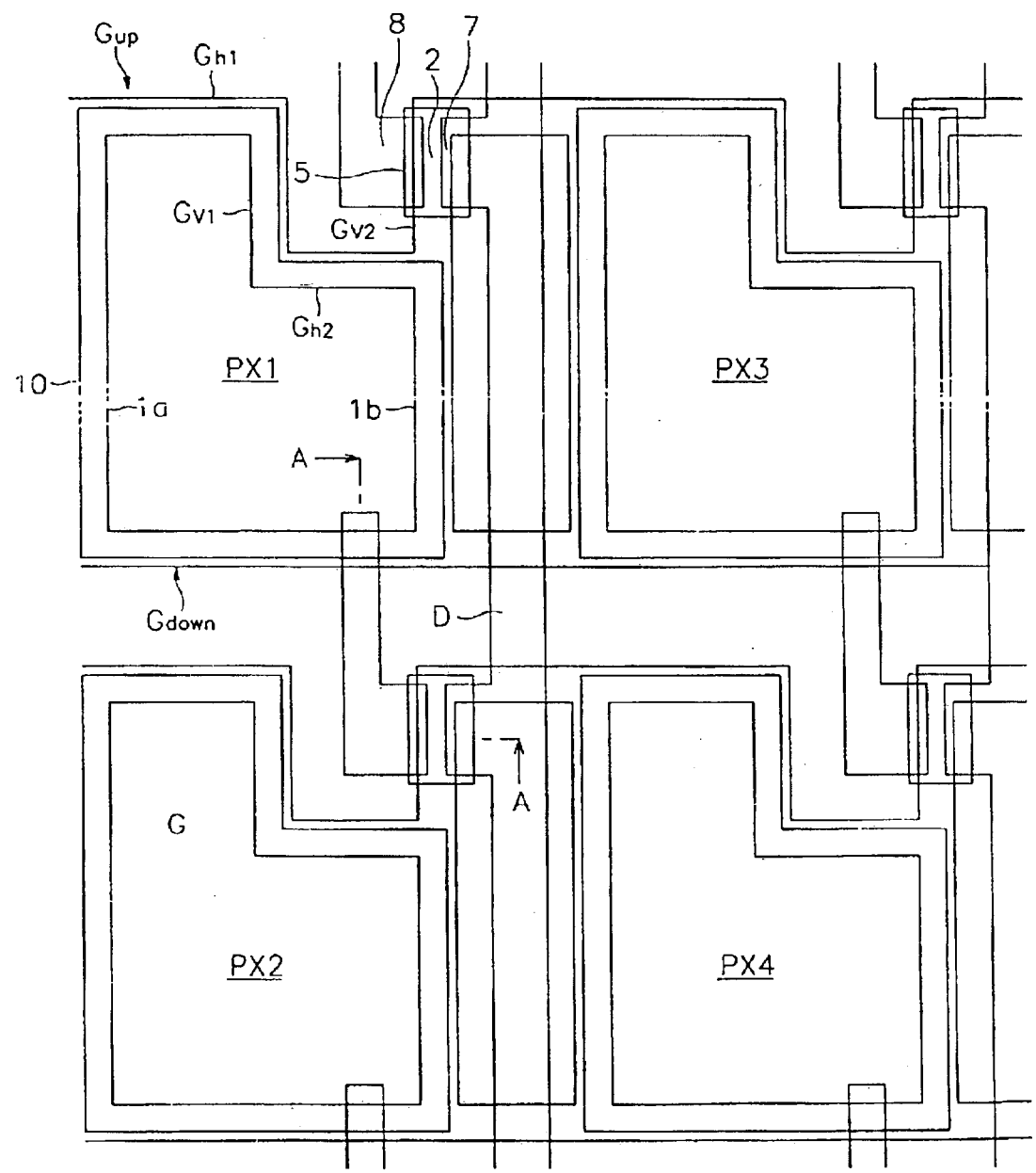
FIG. 3 shows a layout of the TFT array panel of the LCD shown in FIG. 2.

As a fifth type, the lower gate line $G_{down}$ may be completely removed in FIG. 3. In this case, it is impossible to repair the disconnection of the gate lines $G_{up}$ and $G_{down}$. The auxiliary gate lines function as a capacitor and/or a black matrix.

As a sixth type, one of the auxiliary gate lines 1$a$ and 1$b$ is removed from the structure in FIG. 3, or one or both of the auxiliary gate lines 1$a$ and 1$b$ is separated from one or both of the upper and the lower gate lines $G_{up}$ and $G_{down}$. If the auxiliary gate lines 1$a$ and 1$b$ are connected to one of the upper and lower gate lines $G_{up}$ and $G_{down}$, the auxiliary gate lines 1$a$ and 1$b$ function as an electrode of a storage capacitor as well as a black matrix. However, the auxiliary gate lines 1$a$ and 1$b$ are separated from both the gate lines $G_{up}$ and $D_{down}$, the auxiliary gate lines 1$a$ and 1$b$ function as only a black matrix. This sixth example is compatible with the above five examples.

Several methods for repairing defects of a pixel or a data line is described.

When an image signal is not applied to a pixel electrode, i.e., a pixel defect occurs, the defect is repaired by connecting the defected pixel electrode to a gate line or a data line, thereby a gate signal or a data signal being applied to the defected pixel electrode.

Before describing methods for repairing a data line, it is noted that the methods are to form a bypass which go around the open point. A member serving as the bypass, if the member is made of a single line, has at least two overlapped portions with an open data line, which are on either side of the open point. In the mean time, if a part of a path through which a scanning signal passes is used as the bypass, the part should be separated from the other part. Therefore, a gate line and a auxiliary gate line connected to the gate line, which form a scanning signal path, has at least three overlapped points with the data line, such that the scanning signal is transmitted to the next pixel. However, if the gate line in the upper pixel is used as a path transmitting the gate signal, the number of the overlapped points to need is only two.

Figure 6A:
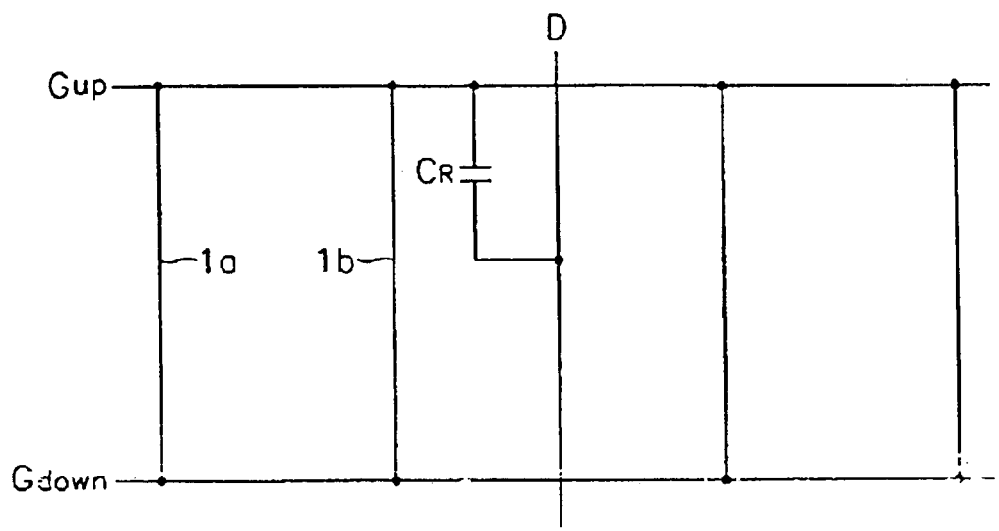
FIGS. 6A to 6C are schematic diagrams showing a first example of a repairing means according to the present invention.
Figure 6B:
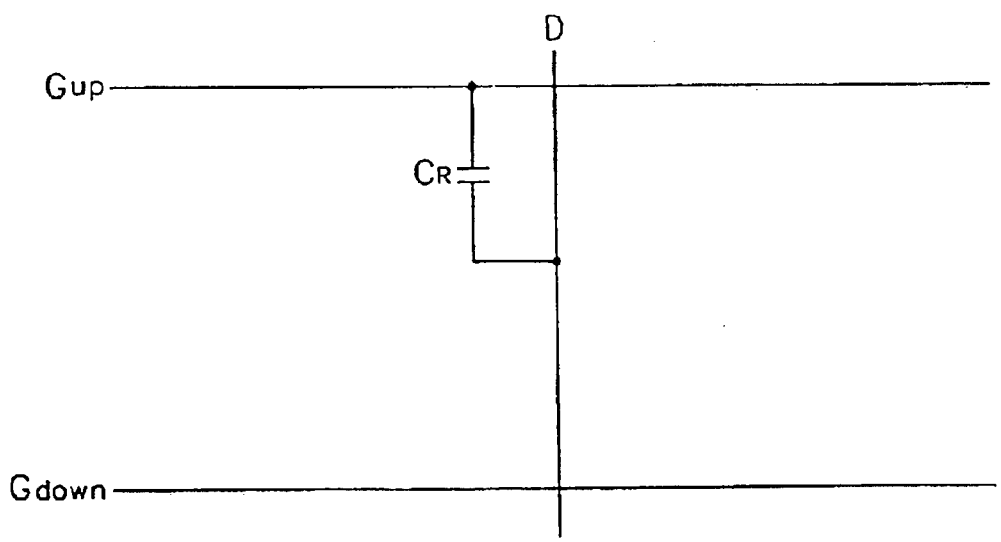

First, supposing that a second signal line D and a upper first signal line $G_{up}$, are connected via a capacitor $C_R$ as shown in FIGS. 6A to 6B. Here, FIG. 6A corresponds to the above described first type in which the dual gate line structure and the ring capacitor structure are both adopted, and FIG. 6B corresponds to the second type in which the auxiliary signal lines 1a and 1b are removed (herein one of the auxiliary signal lines may be omitted like the sixth type). Also, FIG. 6C corresponds to the fourth type in which the lower first signal line $G_{down}$ forming the ring capacitor is only removed, so that both auxiliary signal lines 1a and 1b are required to transfer a signal from the first signal line.

A method for repairing an open data line shown in FIG. 6A will be described.

Figure 7:
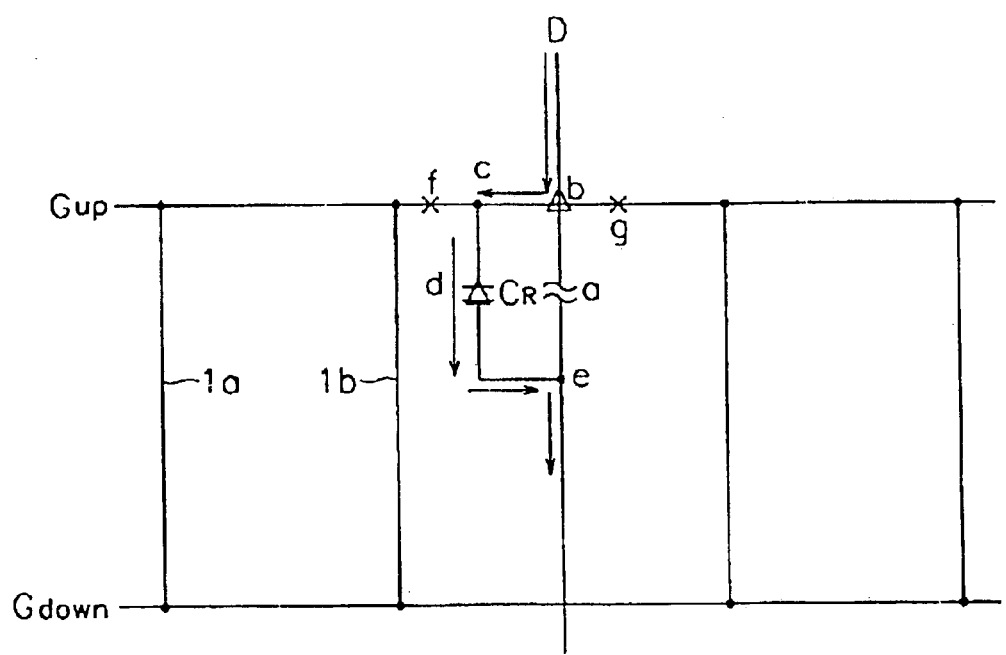
FIG. 7 is a schematic diagram illustrating a method for repairing an open data line in FIG. 6A.

As shown in FIG. 7, when the position of the open point a of the second signal line D is placed between a cross point of the upper first signal line $G_{up}$ and the second signal line D and a connect point e of the capacitor $C_R$ and the second signal line D. The second signal line D and the upper first signal line $G_{up}$ are shorted at point b and then both terminals of the capacitor $C_R$ are shorted d. Thereafter, the points f and g of the upper first signal line $G_{up}$ on left side of the connect point c with the capacitor $C_R$ and on the right side of the short point b are disconnected. As a result, the signal flowing along the second signal line D goes around the open point a via the upper first signal line $G_{up}$ and the shorted capacitor $C_R$ and enters again the second signal line D.

Figure 6C:
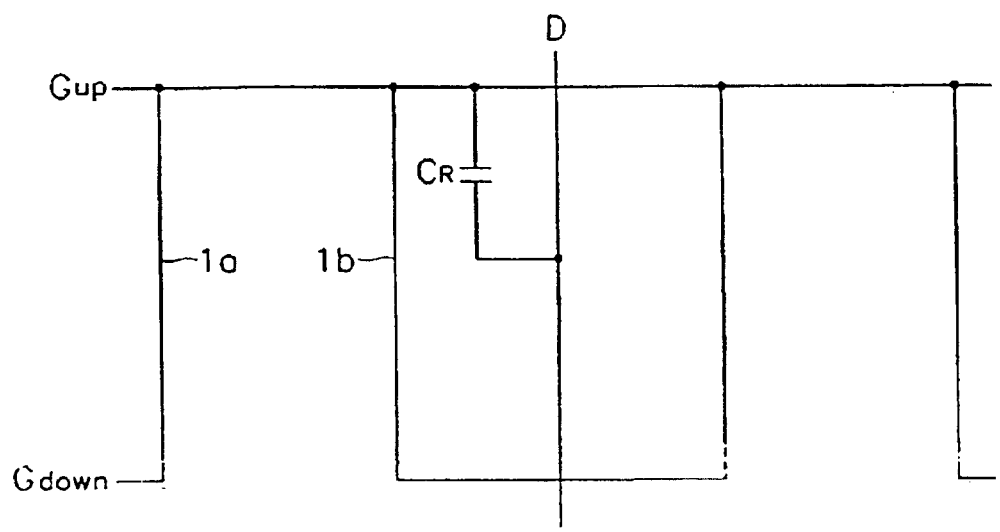

The cases shown in FIGS. 6B and 6C can be repaired by the essentially same method in FIG. 6A.

When the second signal line D and the lower first signal line $G_{down}$ are connected via a capacitor, the above described repair method can still be applicable.

Figure 8:
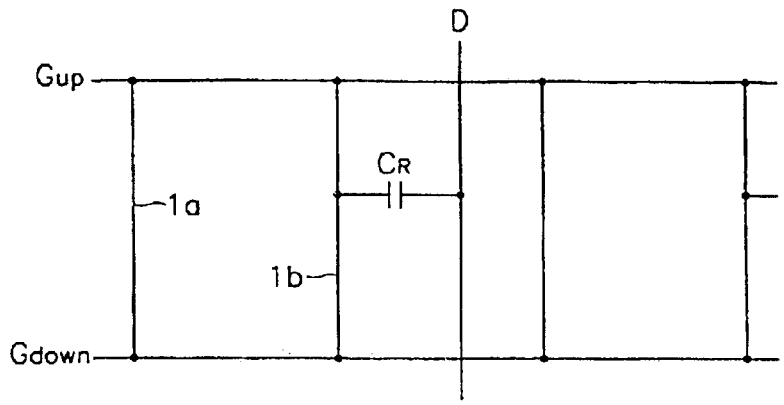
FIG. 8 is a schematic diagram showing a second example of a repairing means according to the present invention.

Next, it is assumed that a second signal line D and an auxiliary signal line 1b are connected via a capacitor $C_R$, as shown in FIG. 8. In this case, the other auxiliary signal line 1a which is not connected to the second signal line D via a capacitor $C_R$ may be removed.

A method for repairing the above case shown in FIG. 8 will be described.

Figure 9A:
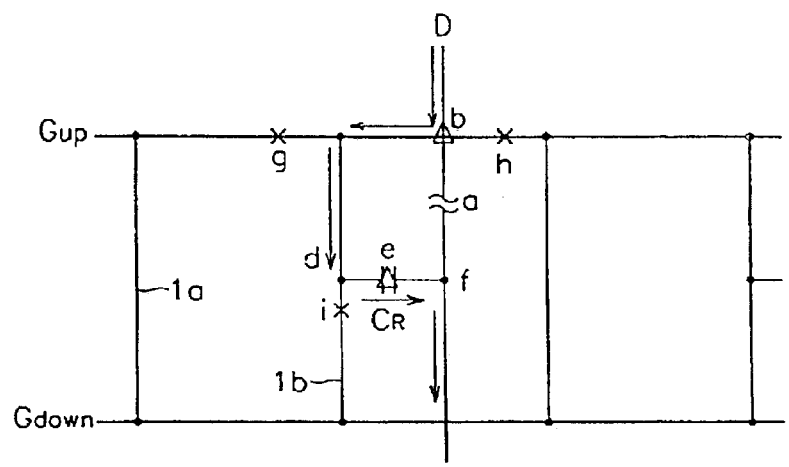
FIGS. 9A and 9B are schematic diagrams each illustrating method for repairing an open data line in FIG. 8.

As shown in FIG. 9A, when the position of the open point of the second signal line D lies between a cross point b of the upper first signal line $G_{up}$ and the second signal line D and a connect point f of the capacitor $C_R$ and the second signal line D. The second signal line D and the upper first signal line $G_{up}$ are shorted at point b and then both terminals of the capacitor $C_R$ are shorted e. Thereafter, the points g and h of the upper first signal line $G_{up}$ on the left side of the connect point c of the upper first signal line $G_{up}$ and the capacitor $C_R$ and on the right side of the short point b is disconnected respectively. Also, the auxiliary signal line 1b beneath a connect point d of the auxiliary signal line 1b and the capacitor $C_R$ is disconnected at point i. As a result, the signal flowing along the second signal line D goes around the open point a via the upper first signal line $G_{up}$, the auxiliary signal line 1b and the shorted capacitor $C_R$ and enters the second signal line D.

Figure 9B:
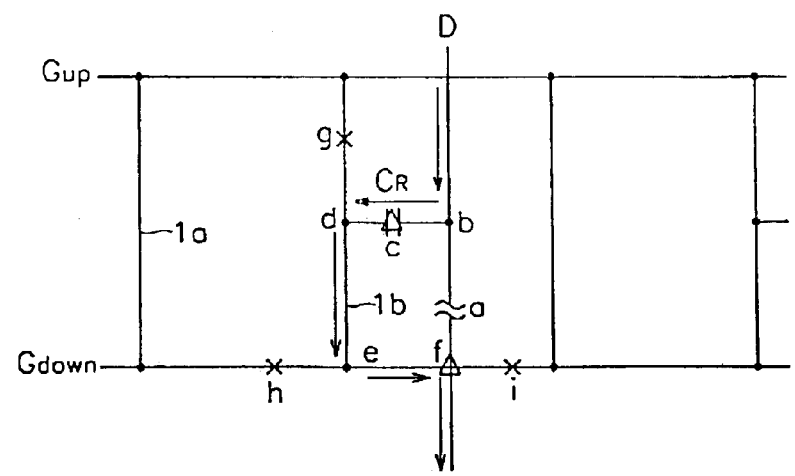

On the other hand, when the second signal line D placed between a connect point of the capacitor $C_R$ and the second signal line D and a cross point f of a down first signal line $G_{down}$ or and the second signal line D is disconnected (a) as shown in FIG. 9B, both terminals of the capacitor $C_R$ are shorted (c) and then the second signal line D and the down first signal line $G_{down}$ are shorted (f). Thereafter, the auxiliary signal line 1b above a connect point d of the auxiliary signal line 1b and the capacitor $C_R$ is disconnected (g) and the down first signal line $G_{down}$ of the outer sides of the connect point e between the down first signal line $G_{down}$ and the auxiliary signal line 1b and the short point f is disconnected respectively (h and i). As a result, the signal flowing along the second signal line D flows again the second signal line D around the disconnect point a via the shorted capacitor $C_R$, the auxiliary signal line 1b and the down first signal line $G_{down}$.

In the above case, all disconnection of the second signal line between the cross point of the upper first signal line and the second signal line and the cross point of the down first signal line and the second signal line can be repaired. Also, since the signal can be transferred to the upper first signal line $G_{up}$ and the down first signal line $G_{down}$ even if there is no the auxiliary signal line 1a which is not connected to the second signal line D via the capacitor $C_R$, the auxiliary signal line 1a may be omitted.

Figure 10A:
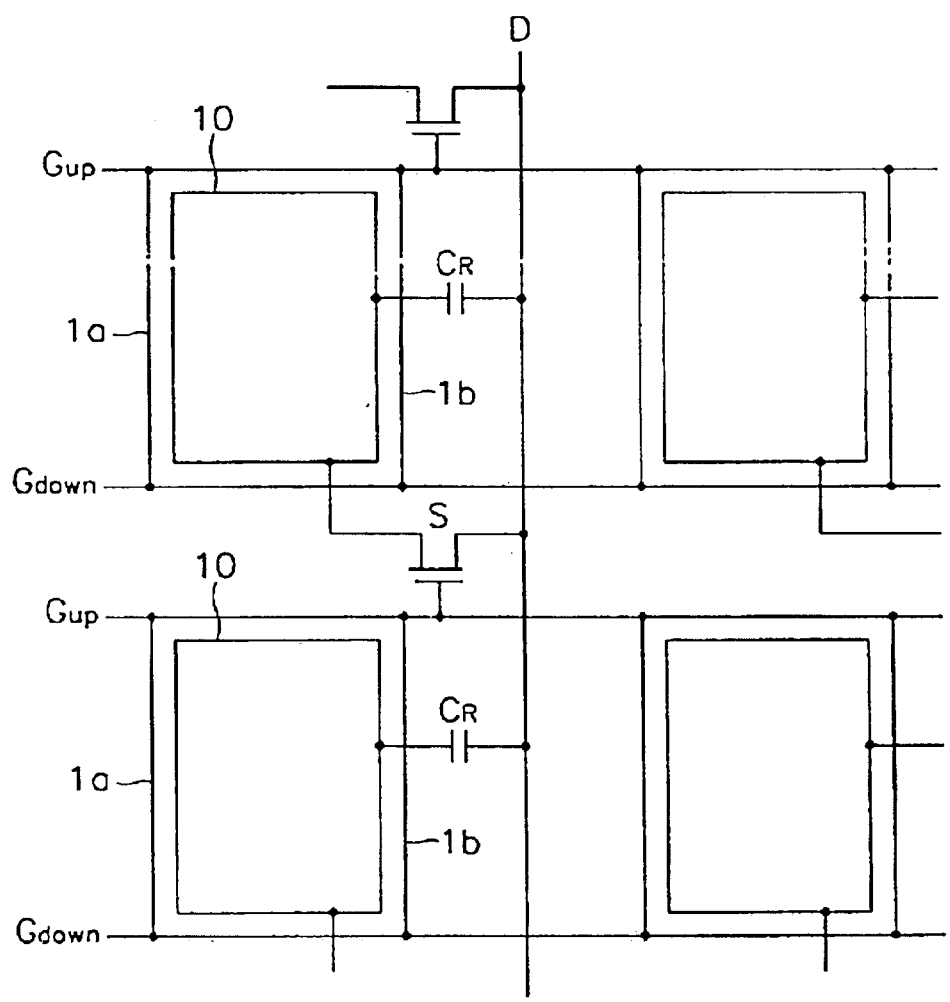
FIGS. 10A to 10C are schematic diagrams each showing a third example of a repairing means according to the present invention.
Figure 10B:
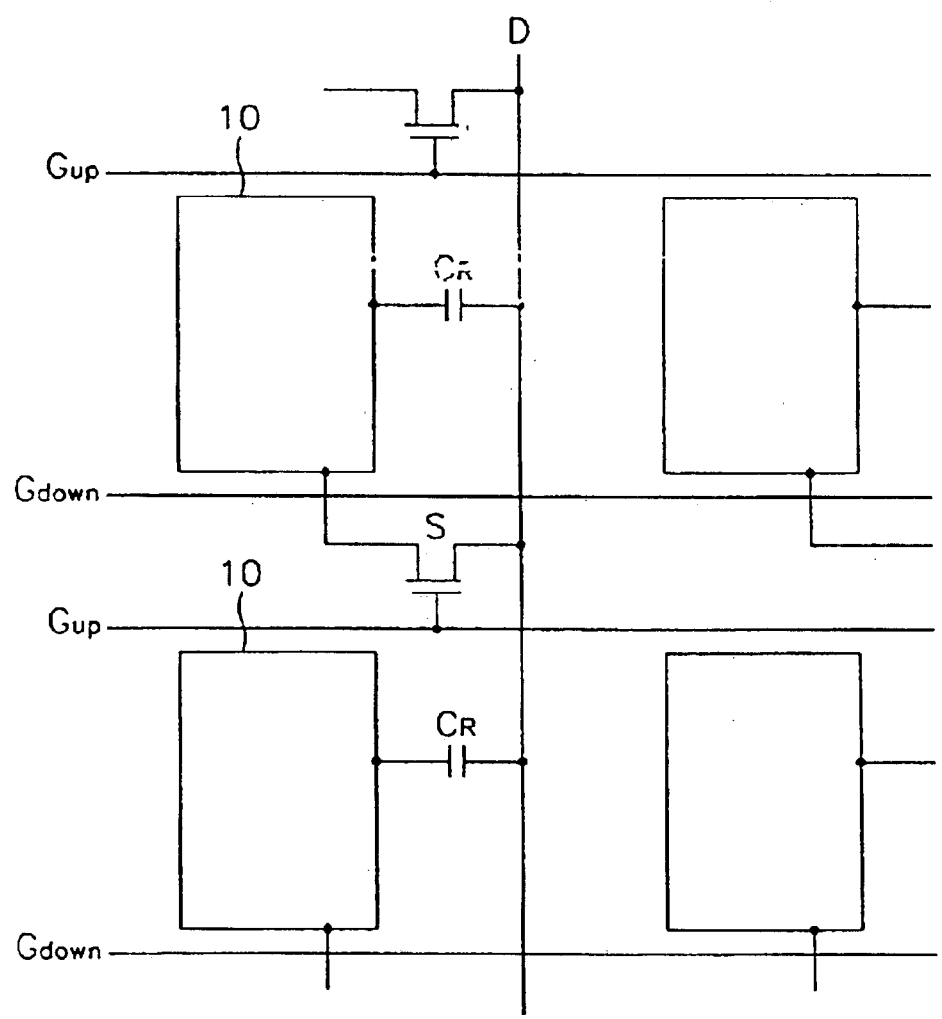
Figure 10C:
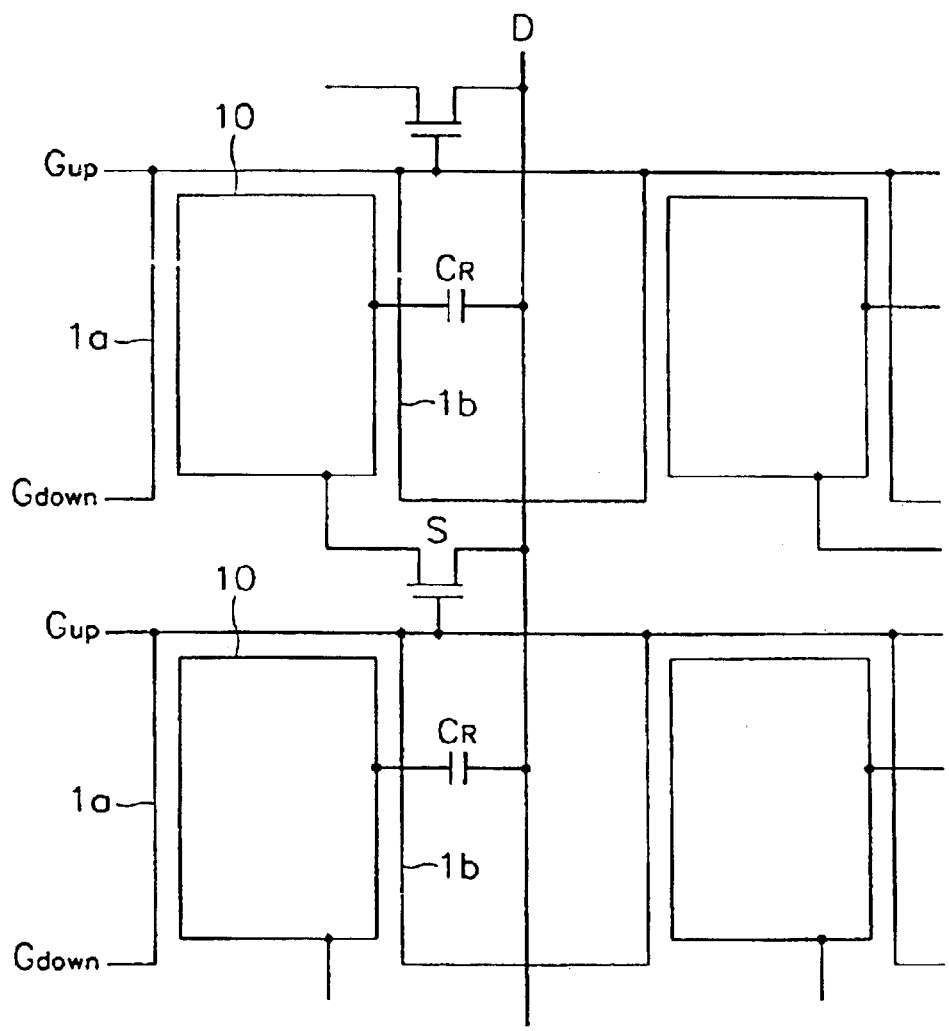

Next, as shown in FIGS. 10A and 10B, supposing that a second signal line D and a pixel electrode 10 are connected via a capacitor $C_R$. As described above, the pixel electrode 10 is connected to a terminal of a switching element S and the remaining two terminals of the switching element S are connected to an upper first signal line $G_{up}$ of next row of same column and the second signal line D, respectively. Here, there are three cases as shown in FIGS. 10A to 10C. In FIG. 10A, as the first type, the dual gate line layout and the ring capacitor layout are both adopted. FIG. 10B shows the second type adopting only the dual gate line layout, where one of the auxiliary signal lines 1a and 1b may be omitted as the sixth type. Also, FIG. 10C shows a layout in which the down first signal line forming the ring capacitor is omitted.

Then, a method of repairing the case shown in FIG. 10A will be described.

Figure 11:
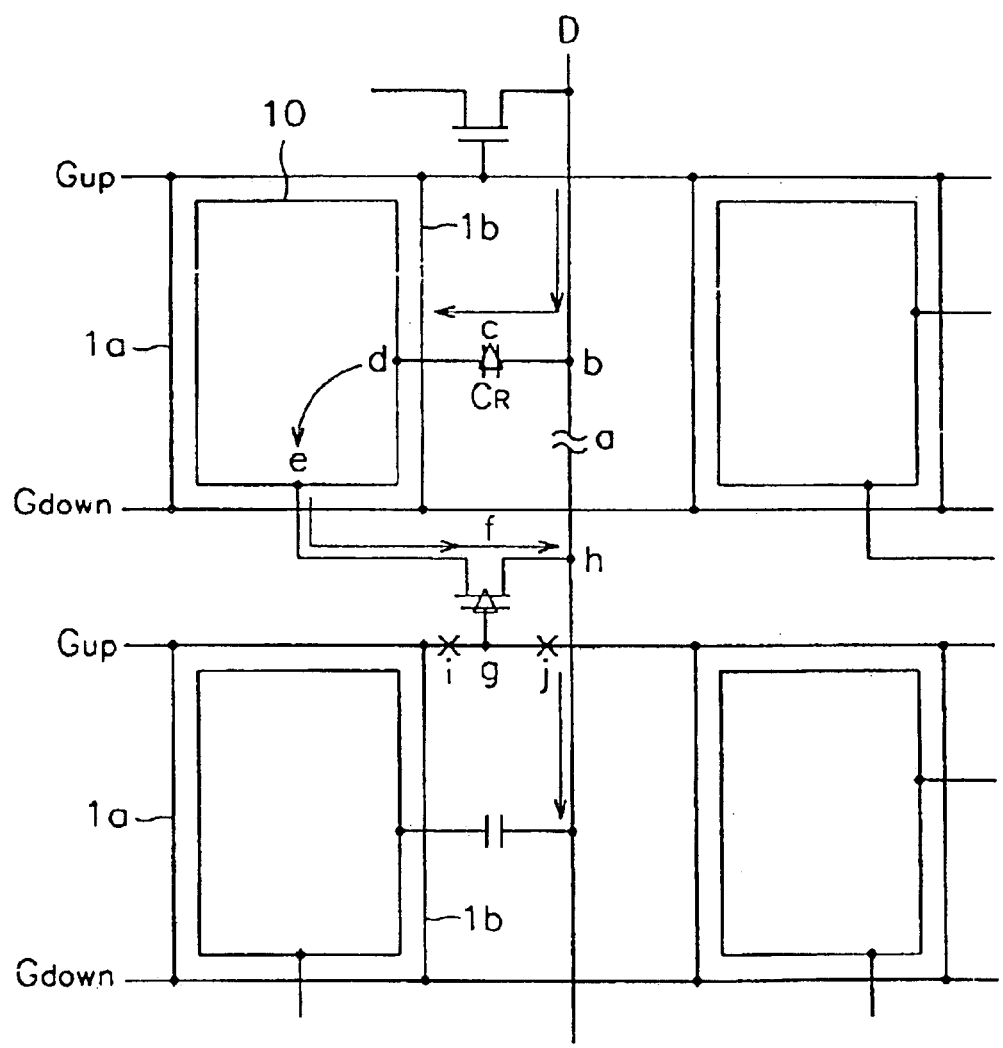
FIG. 11 is a schematic diagram illustrating a method for repairing the data line shown in the layout shown in FIG. 10A.

As shown in FIG. 11, when the second signal line D placed between a connect point of the second signal line D and the capacitor $C_R$ and a connect point h of a terminal of the switching element S and the second signal line D is disconnected (a), both terminals of the capacitor $C_R$ are shorted (c) and three terminals of the switching element S are shorted (f). Then, the upper first signal line $G_{up}$ of the outer sides of a connect point g between the switching element S and the upper first signal line $G_{up}$ is disconnected respectively (i and j). As a result, the signal flowing along the second signal line D flows again the second signal line D around the disconnect point a via the shorted capacitor $C_R$, the pixel electrode 10 and the shorted switching element S.

However, this repairing method can be applied to only the case in which the second signal line D placed between the connect point b of the second signal line D and the capacitor $C_R$ and the connect point h of the second signal line D and a terminal of the switching element S is disconnected (a).

The cases shown in FIGS. 10B and 10C can be repaired using the same method described above.

Hereinafter, there will be described the sixth type in which the layout of the auxiliary signal lines are modified.

Figure 12A:
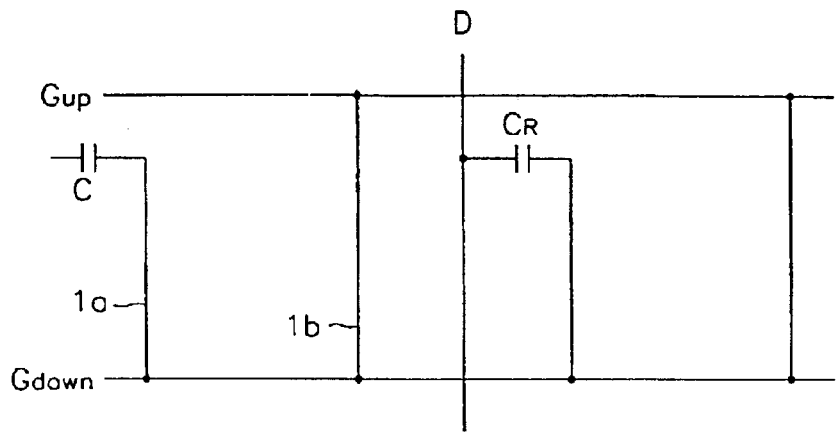
FIGS. 12A to 12B are schematic diagrams each showing a fourth example of a repairing means according to the present invention.
Figure 12B:
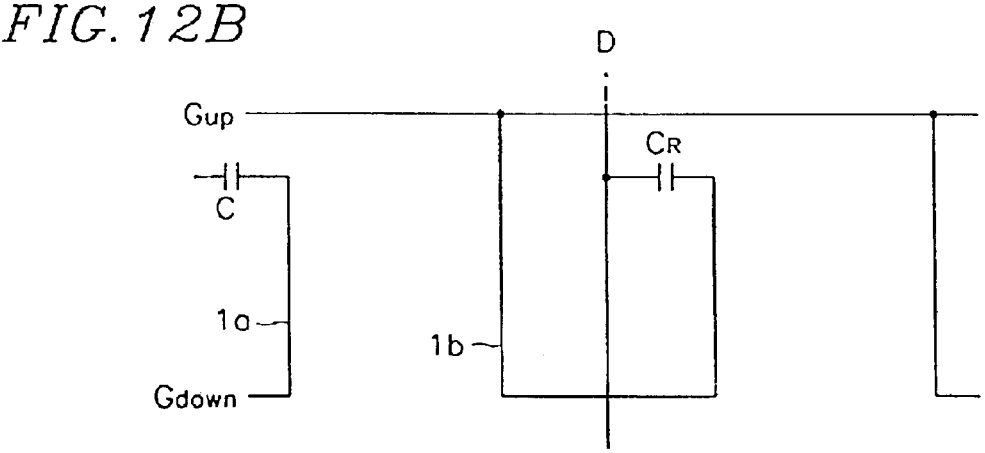

First, as shown in FIGS. 12A and 12B, supposing that an end of an auxiliary signal line 1a is separated from an upper first signal line $G_{up}$ and a second signal line D and a down first signal line $G_{down}$ are connected via a capacitor $C_R$. Here, FIGS. 12A and 12B show layouts combined with the first and fourth types, respectively, wherein the remaining auxiliary signal line 1b which is not separated from the upper first signal line $G_{up}$ may be omitted.

Then, a method of repairing the case shown in FIG. 12A will be described.

Figure 13:
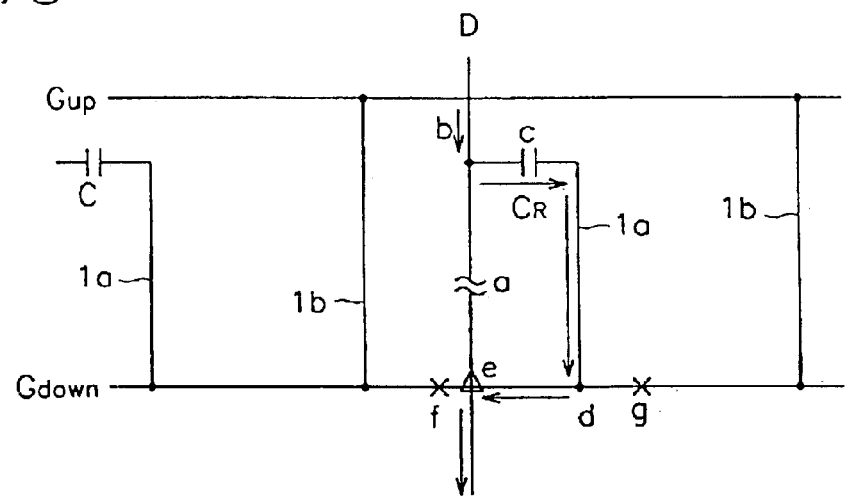
FIG. 13 is a schematic diagram illustrating a method for repairing an open data line in FIG. 12A.

As shown in FIG. 13, when the second signal line D placed between a connect point b of the second signal line D and the capacitor $C_R$ and a cross point of the second signal line D and the down first signal line $G_{down}$ is disconnected (a), both terminals of the capacitor $C_R$ are shorted (c) and then the second signal line D and the down first signal line $G_{down}$ are shorted (e). Then, the down first signal line $G_{down}$ located at the outer sides of a connect point d between the down first signal line $G_{down}$ and the capacitor $C_R$ and the short point e is disconnected respectively (f and g). As a result, the signal flowing along the second signal line D flows again the second signal line D around the disconnect point a via the shorted capacitor $C_R$ and the down first signal line $G_{down}$.

However, this repairing method can be applied to only the case in which the second signal line D placed between the connect point b of the second signal line D and the capacitor $C_R$ and the cross point of the second signal line D and the down first signal line $G_{down}$ own is disconnected (a).

The case shown in FIG. 12B can be repaired using the same method described above.

On the other hand, a case in which one end of the auxiliary signal line 1a is separated from the down first signal line $G_{down}$ and the second signal line D and the upper first signal line $G_{up}$ are connected via the capacitor $C_R$ can be repaired using the method similar with the above method.

Next, supposing that both ends of an auxiliary signal line 1a are connected to a second signal line D via capacitors $C_{R1}$ and $C_{R2}$ respectively. In this case, various modifications are possible since the repairing can be performed using only one auxiliary signal line 1a. That is, there are examples as shown in FIGS. 4A to 4D where each layout is obtained by combining the first, third, fourth and fifty types to a basic modified layout in which the auxiliary signal line 1a is separated from the upper and down first signal lines $G_{up}$ and $G_{down}$.

Besides the above modifications, many modifications may be considered as follows: a layout in which the remaining auxiliary signal line 1b is omitted, a layout in which one of the upper and down first signal lines $G_{up}$ and $G_{down}$ is omitted, and layouts in which the auxiliary signal line 1a is connected to the up first signal line $G_{up}$ and/or the down first signal line $G_{down}$ in the layouts shown in FIGS. 14A to 14D.

Figure 14A:
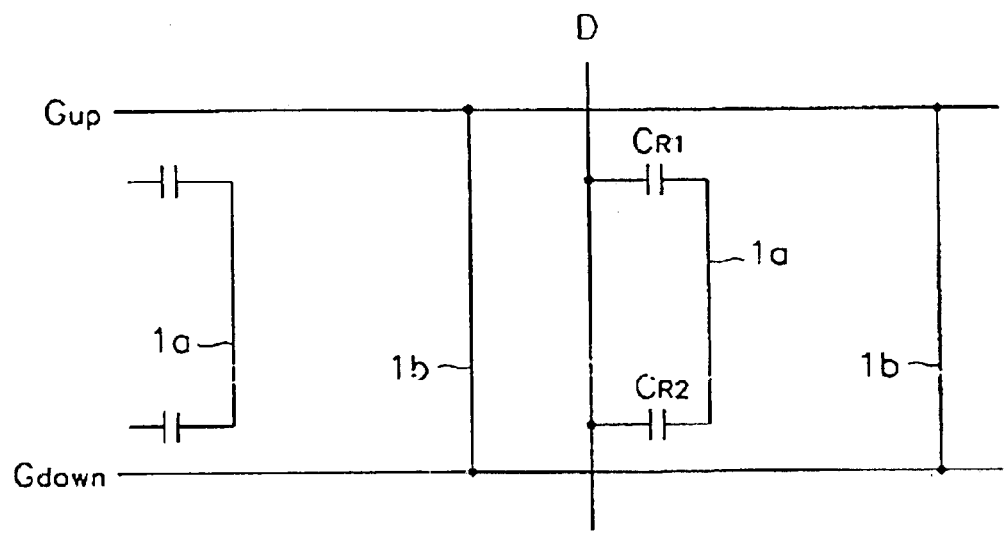
FIGS. 14A to 14D are schematic diagrams each showing a fifth example of a repairing means according to the present invention.

The above various modifications may be repaired using different methods, however, a method of repairing only the case shown in FIG. 14A, as an example, will be described.

Figure 15:
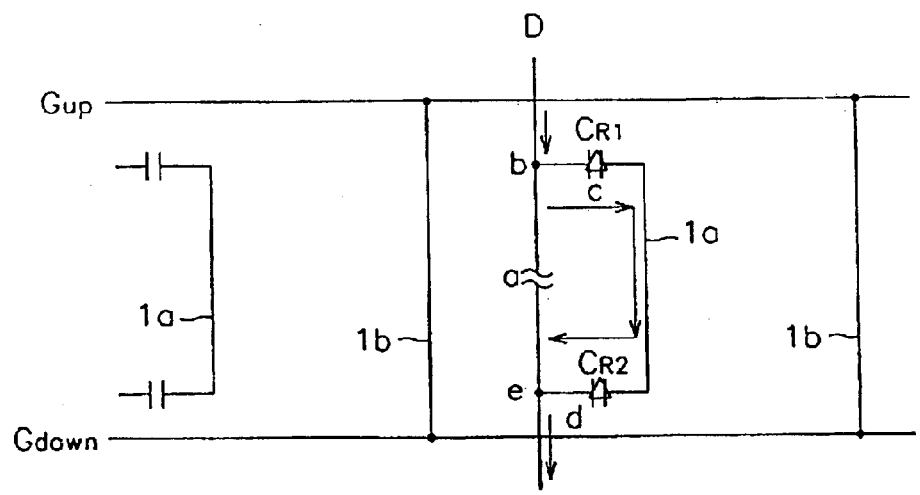
FIG. 15 is a schematic diagram illustrating a method for repairing an open data line in FIG. 14A.

As shown in FIG. 15, when the second signal line D placed between a connect point b, of the second signal line D and a capacitor $C_{R1}$ and a connect point e of the second signal line D and a capacitor $C_{R2}$ is disconnected (a), both terminals of two capacitors $C_{R1}$ and $C_{R2}$ are shorted (c and d). As a result, the signal flowing along the second signal line D flows again the second signal line D around the disconnect point a via the shorted capacitors $C_{R1}$ and $C_{R2}$.

However, this repairing method can be applied to only the case in which the second signal line D placed between the connect point b of the second signal line D and the capacitor $C_{R1}$ and the connect point e of the second signal line D and the capacitor $C_{R2}$ is disconnected (a).

Figure 14B:
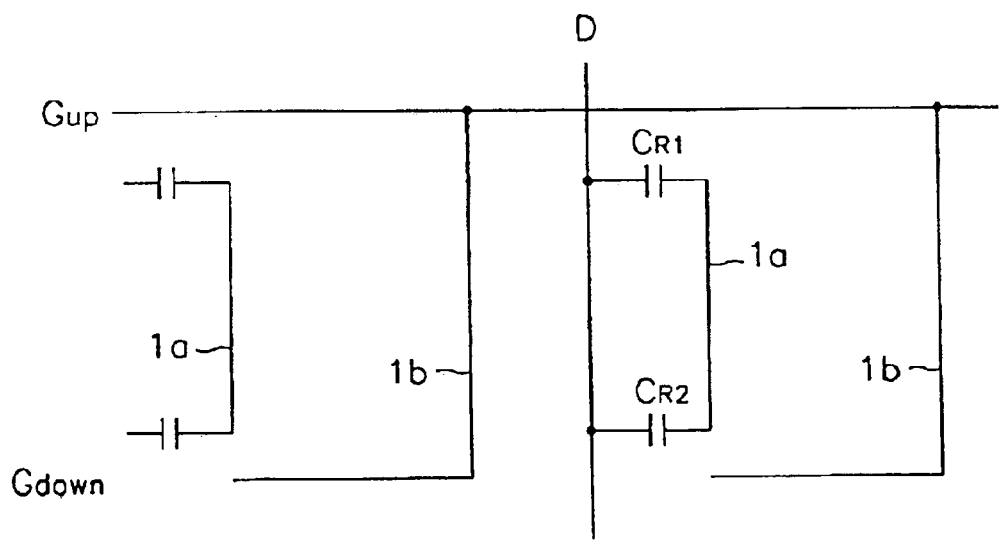
Figure 14C:
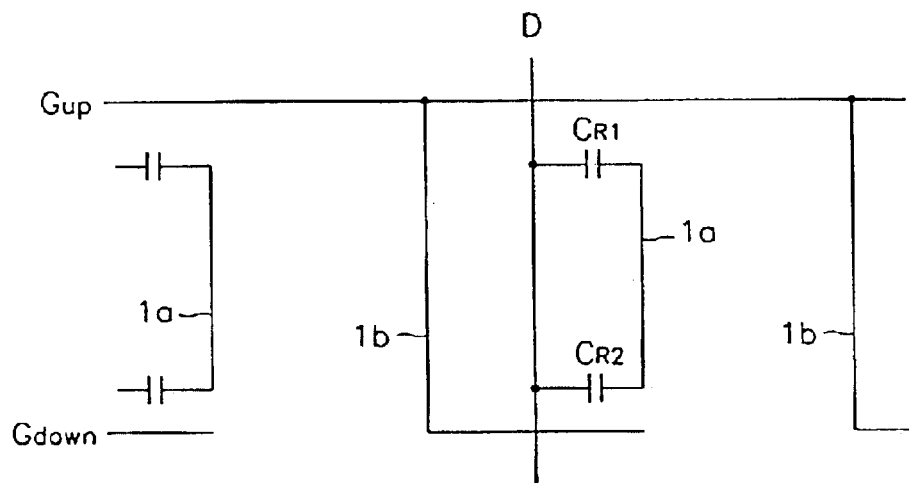
Figure 14D:
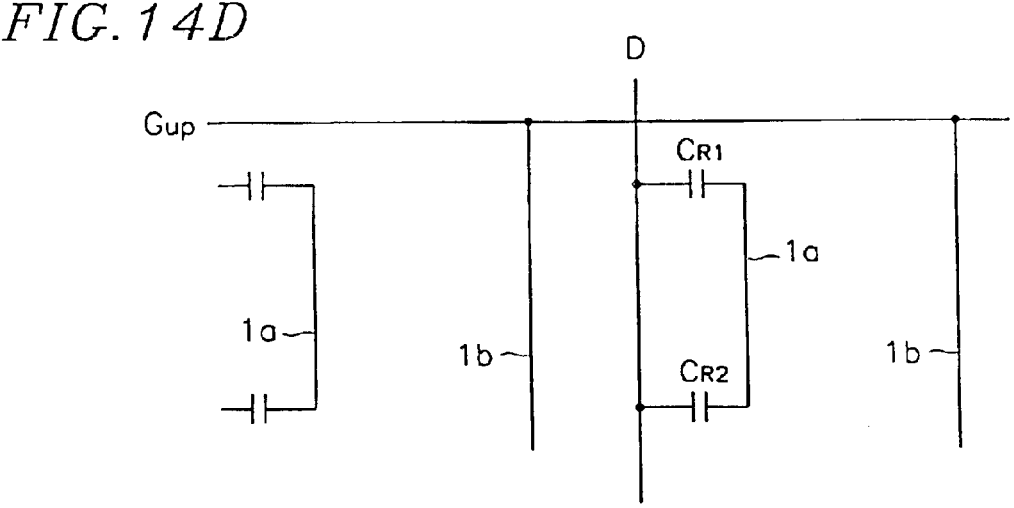

The cases shown in FIGS. 14B to 14D can be repaired using the same method described above.

On the other hand, there may be provided the following embodiments by combining the above described basic layouts, modifying the same or adding another layout to the above layouts, where all disconnection of the second signal line can be repaired. Here, as a layout to be added, it may be considered that a layout in which two points of the second signal line intended to be connected each other are connected via a capacitor.

Hereinafter, the preferred embodiments of a matrix-type display according to the present invention which adopt the repairing means based on the basic concept of the present invention described above will be described with reference to FIGS. 16 to 27D.

First, the first embodiment of the matrix type display in accordance with the present invention is based on the basic layouts shown in FIGS. 6A to 6C and 10A to 10C, where the defect of a data line is repaired using a means for connecting the data line to an upper gate line and a means for connecting the upper gate line to a pixel electrode. In order to connect the data line and the upper gate line via an insulator, a branch from the data line may extend to the upper gate line or a branch from the upper gate line may extend to the data line. However, if the branch from the upper gate line extends to the data line, the upper gate line and another gate line opposing the data line may be shorted. Thus, it is preferable to make a branch from the data line. Also, in order to connect the upper gate line and the pixel electrode via an insulator, the pixel electrode may be formed so as to be overlapped with the upper gate line. For example, after protruding the pixel electrode toward the outside of the closed region enclosed by the gate lines, the protruded portion of the pixel electrode may be overlapped with the upper gate line which does not form the closed region or a branch from the upper gate line may extend to be overlapped with the protruded portion of the pixel electrode. For the later, a space should be enough to form the protruded portion therein.

Hereinafter, the first embodiment of the matrix-type display will be described in detail with reference to FIGS. 16, 17A and 17B.

Figure 16:
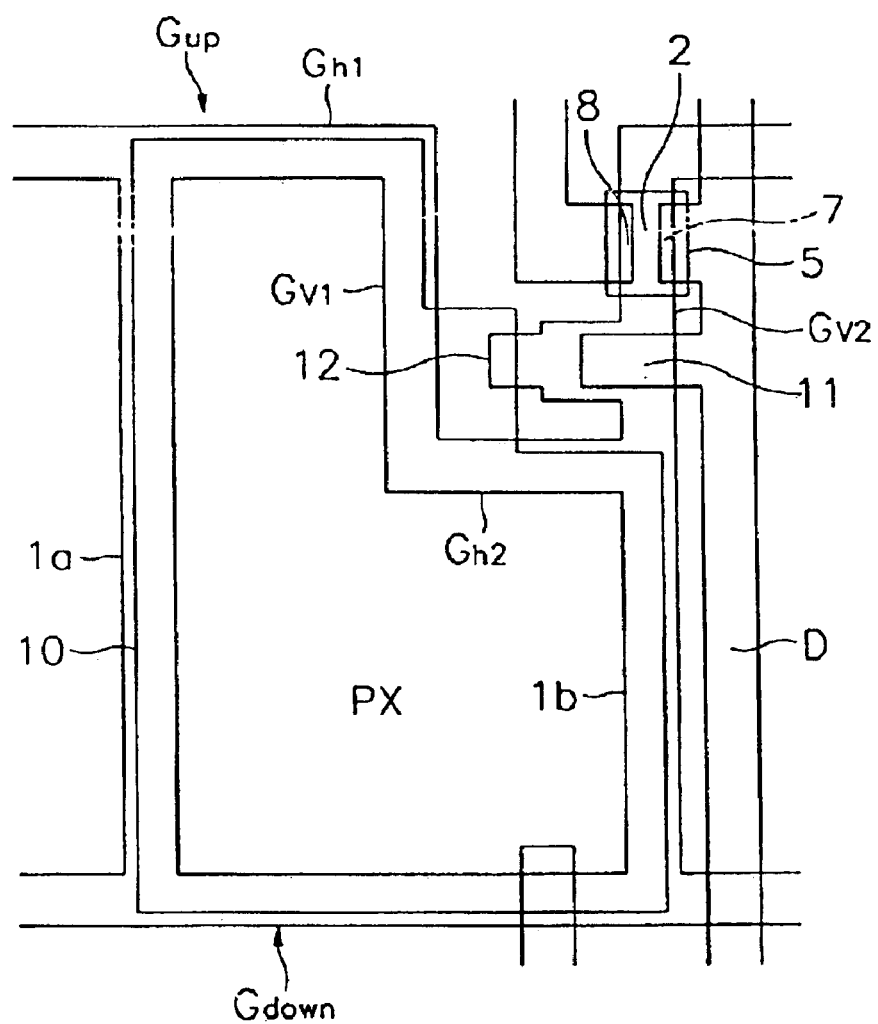
FIG. 16 shows a layout of a first embodiment of a TFT array panel of an LCD according to the present invention.
Figure 17A:
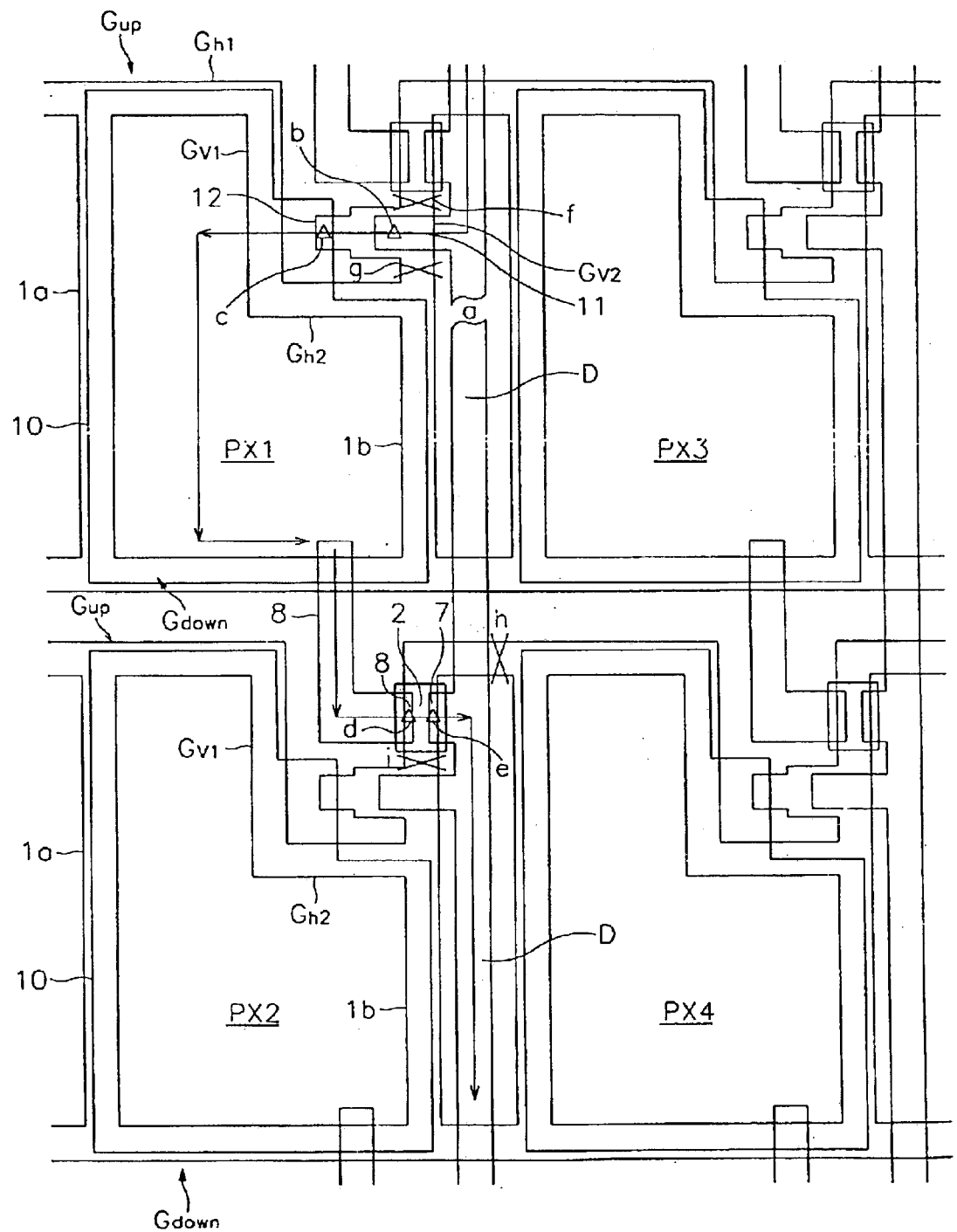
FIGS. 17A and 17B illustrates methods for repairing defects of the LCD shown in FIG. 16.
Figure 17B:
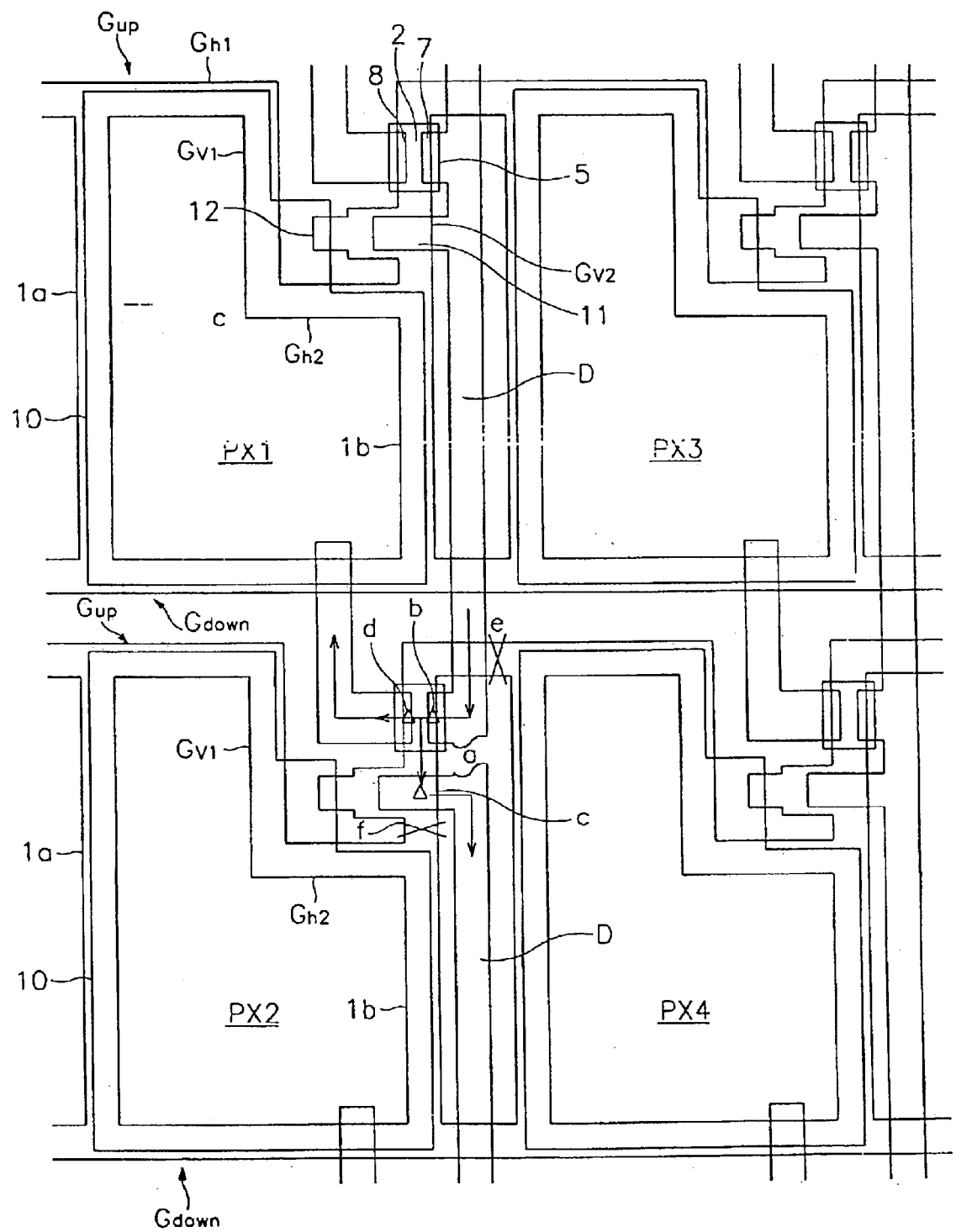

FIG. 16 is an arrangement plan showing a pixel layout of a first embodiment of a TFT array panel of the matrix-type LCD according to the present invention, and FIGS. 17A to 17B are diagrams of illustrating a method of repairing the disconnection of a data line in the substrate of the LCD according to the first embodiment.

Figure 4:
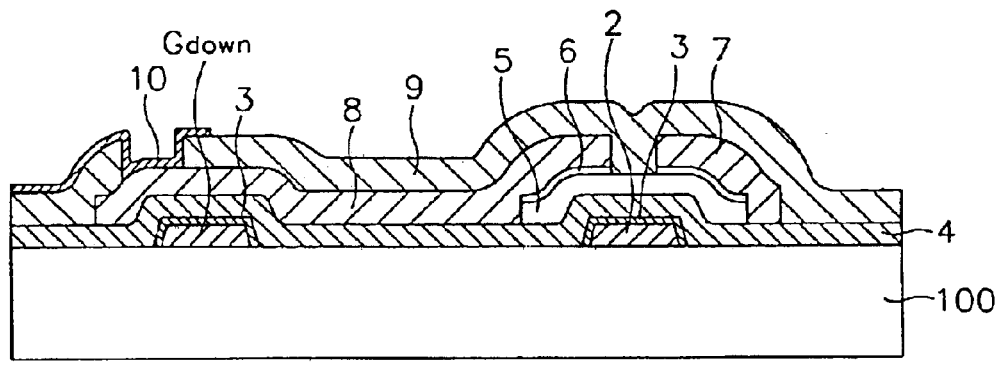
FIG. 4 is a sectional view of a portion along a line A—A shown in FIG. 3.
Figure 5:
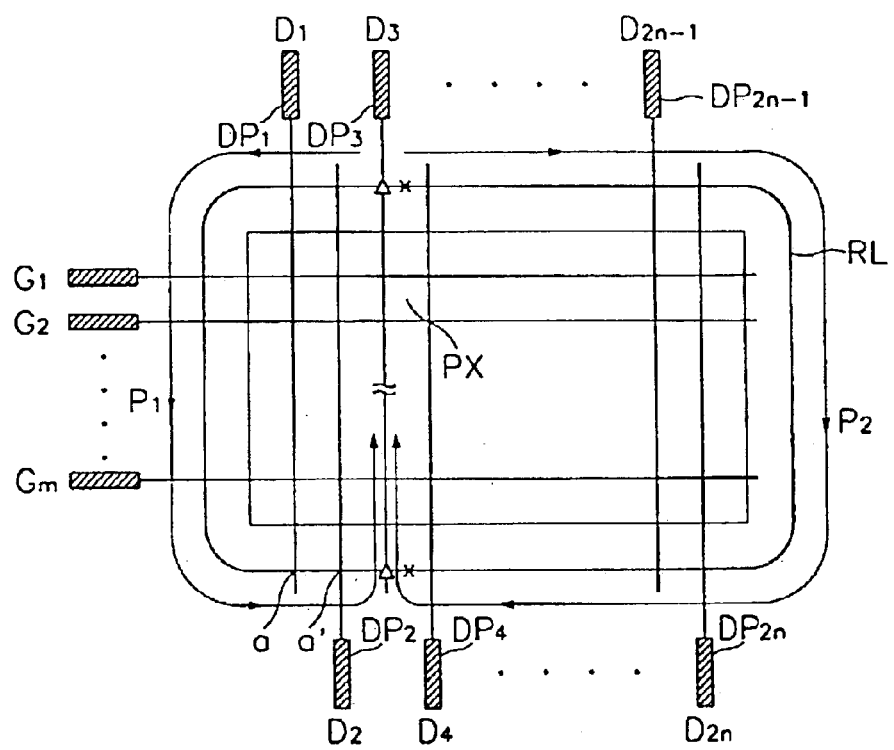
FIG. 5 is a plan view of the wiring of a conventional matrix-type display having a repair line.

As shown in FIG. 16, in the substrate of the matrix-type LCD according to the first embodiment of the present invention, a first connect portion 11 as a branch of a data line D extends to a second vertical portion $G_{v2}$ of an upper gate line $G_{up}$ while being overlapped with the second vertical portion $G_{v2}$. Also, a portion of a pixel electrode is protruded from a concave portion formed with a first vertical portion $G_{v1}$, a second horizontal portion $G_{h1}$ and the second vertical portion $G_{v2}$ of the upper gate line $G_{up}$ while being free from a closed region formed by the up and lower gate lines $G_{up}$ and $G_{down}$ and left and right auxiliary gate lines 1a and 1b. A second connect portion 12 as a branch from the second vertical portion $G_{v2}$ extends to the protruded portion of the pixel electrode 10 while being overlapped with the pixel electrode 10. Here, an overlap point between the first connect portion 11 and the second vertical portion $G_{v2}$ is located beneath a gate electrode 2. The gate oxide layer 3 and the gate insulating layer 4 shown in FIG. 4 are interposed between the first connect portion 11 and the second vertical portion $G_{v2}$, and the gate oxide layer 3, the gate insulating layer 4 and the passivation layer 9 shown in FIG. 4 are interposed between the second connect portion 12 and the pixel electrode 10. Also, a source electrode 7 and the gate electrode, and the gate electrode 2 and a drain electrode 8 are formed while being overlapped respectively. In addition, the upper gate line $G_{up}$ and the lower gate line $G_{down}$, and the left and right auxiliary gate lines 1a and 1b are overlapped at the pixel electrode 10 and the periphery of the pixel electrode 10 via an insulation layer, thereby forming a ring-type capacitor. The remaining portions are similar with those of the layouts shown in FIGS. 3 and 4.

The inferiority of the data line in the above LCD can be repaired using the following methods one of which is selected in accordance with the locations of the disconnection.

First, as shown in FIG. 17A, supposing that the center of the data line D is disconnected, that is, the data line D placed between a diverging point of the first connect portion 11 in a pixel PX1 and a diverging point of the source electrode 7 of a pixel PX2 which is formed below the pixel PX1 is disconnected (a), so that a data signal cannot be transferred to a portion following the disconnected point. Here, the arrows shown in FIG. 17A represent the flow of the signal.

In this case, the pixel electrode 10 of the pixel PX1 with failure is used as a substitute route for the disconnected data line. A cross point between the first connect portion 11 located above the disconnect point a of the data line D and the second vertical portion $G_{v2}$ is shorted (b) using a laser, so that the data signal flowing along the data line D comes to flow along the second vertical portion $G_{v2}$ via the first connect portion 11 around the disconnect point a.

Subsequently, a cross point between the second connect portion 12 and the pixel electrode 10 is shorted (c) using a laser and then two points of the second vertical portion $G_{v2}$, above and below the second connect portion 12, are disconnected (f and g). As a result, the data signal flown into the second vertical portion $G_{v2}$ comes to flow along the pixel electrode 10 via the second connect portion 12 and flow toward the drain electrode 8 of the pixel PX2 which is below the pixel PX1 while being connected to the pixel electrode 10 of the pixel PX1.

Then, the drain electrode 8 and the gate electrode 2, and the gate electrode 2 and the source electrode 7 of the pixel PX2 are shorted respectively (d and e) and the two points of the upper gate line $G_{up}$ of the pixel PX2, above and below the gate electrode 2, are disconnected (h and i). As a result, the data signal comes to flow along the data line D via the drain electrode 8, the data electrode 2 and the source electrode 7 of the pixel PX2.

That is, the data signal flows via the first connect portion 11, the second vertical portion $G_{v2}$ and the second connect portion 12 and the pixel electrode of the disconnected pixel PX1 and returns to the data line D via the drain electrode 8, the gate electrode 2 and the source electrode 7 of the pixel PX2.

In the above case, a gate signal is applied to pixels PX3 and PX4 each located at the right of the disconnected pixel PX1 and the pixel PX2 via only the upper gate line $G_{down}$. Also, the gate electrode 2 of the disconnected pixel PX1 receives the gate signal from the upper gate line $G_{up}$ of the pixel PX3. However, the gate signal is not applied to the gate electrode 2 of the pixel PX2.

Here, since the data signal is continuously applied to the pixel PX1 even if the pixel PX1 has a defect such as a disconnection, the defect thereof cannot be shown easily.

Next, as shown in FIG. 17B, supposing that the data line D placed between a diverging point of the source electrode 7 and a diverging point of the first connect portion 11 in a pixel PX2 is disconnected (a), so that a data signal cannot be transferred to a portion following the diverging point of the first connect portion 11. Here, the arrows shown in FIG. 17B represent the flow of the signal.

In this case, the defect can be repaired using only a TFT, the second vertical portion $G_{v2}$ and the first connect portion 11 compared with the above case described with reference to FIG. 17A. First, a cross point between the source electrode 7 and the gate electrode 2, located above the disconnect point a of the data line D, is shorted (b) using a laser, so that the data signal flowing along the data line D comes to flow the gate electrode 2 along the source electrode 7 around the disconnect point a. Also, the upper gate line $G_{up}$ located above the gate electrode 2 is disconnected (e) to prevent the flowing of the data signal along the gate line of a right pixel PX4.

Subsequently, a cross point between the second vertical portion $G_{v2}$ and the first connect portion 11 is shorted (c) and then the second vertical portion $G_{v2}$ of the upper gate line $G_{up}$, below the short point c, is disconnected, so that the data signal comes to flow along the data line D via the second vertical portion $G_{v2}$. As a result, the data signal flown along the data line D can flow again along the data line D via the source electrode 7, the gate electrode 2, the second vertical portion $G_{v2}$ and the first connect portion 11 of the disconnected pixel PX2.

Here, since a signal is not applied to a pixel PX1 located above the disconnected pixel PX2, it is regarded that the pixel PX1 has a defect. However, when the gate electrode 2 and the drain electrode 8 of the disconnected pixel PX2 are shorted, the data signal is continuously applied to the pixel electrode 10 of the pixel PX1, so that the defect thereof cannot be shown easily.

The second embodiment of the matrix-type display in accordance with the present invention is based on the basic layouts shown in FIGS. 8 and 10A to 10C, where the defect of a data line is repaired using a means for connecting the data line to an auxiliary gate line and a means for connecting the date line to a pixel electrode. In order to connect the data line and the auxiliary gate line via an insulator, a branch from the data line may extend to the auxiliary gate line or a branch from the auxiliary gate line may extend to the data line. Here, this embodiment adopts the former case. Also, in order to connect the data line and the pixel electrode via an insulator, after protruding a branch from the pixel electrode toward the outside of the closed region enclosed by the gate lines, the protruded branch may be overlapped with the data line. Otherwise, a branch from the data line may be made to be overlapped with the pixel electrode. However, since resistance of the pixel electrode is greater than that of the data line, it is preferable to make a branch from the data line. However, in order that the branch of the data line overlaps the pixel electrode, it is inevitable that the branch overlaps spontaneously the gate lined defining the pixel electrode. Thus, it is preferable that the data line, the auxiliary gate line and the pixel electrode overlap each other through only one branch of the data line.

Hereinafter, the second embodiment of the matrix-type display will be described in detail with reference to FIGS. 18, 19A to 19C.

Figure 18:
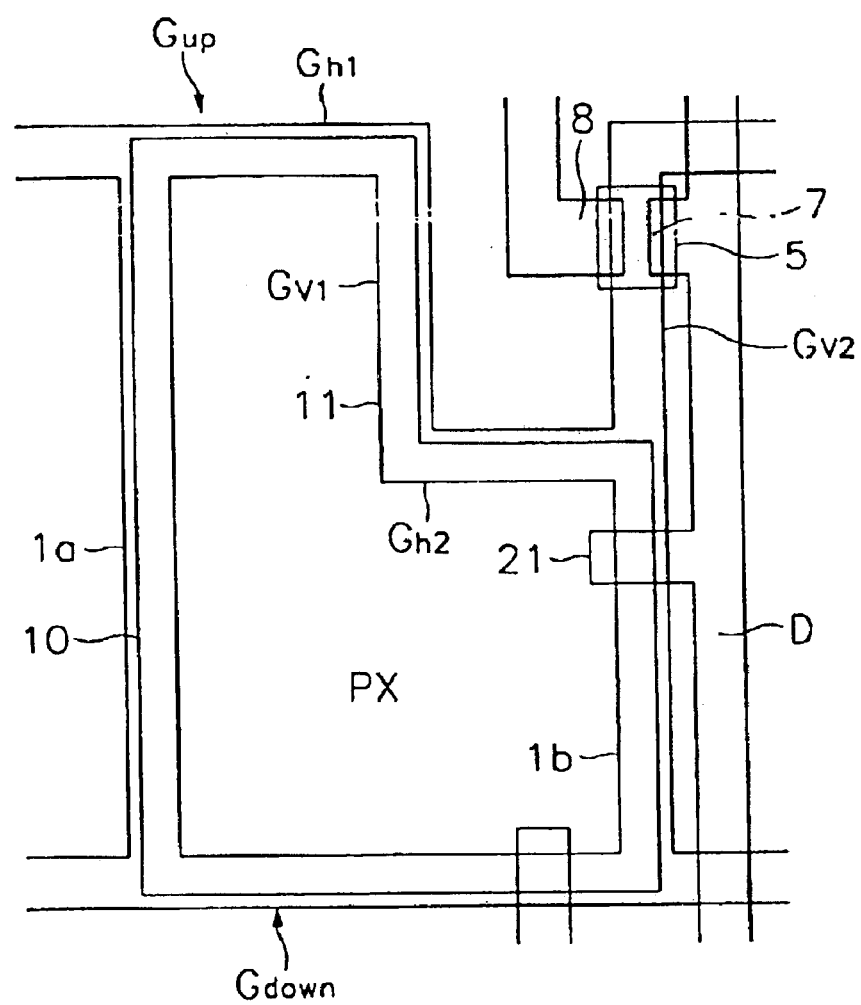
FIG. 18 shows a layout of a second embodiment of a TFT array panel of an LCD according to the present invention.
Figure 19A:
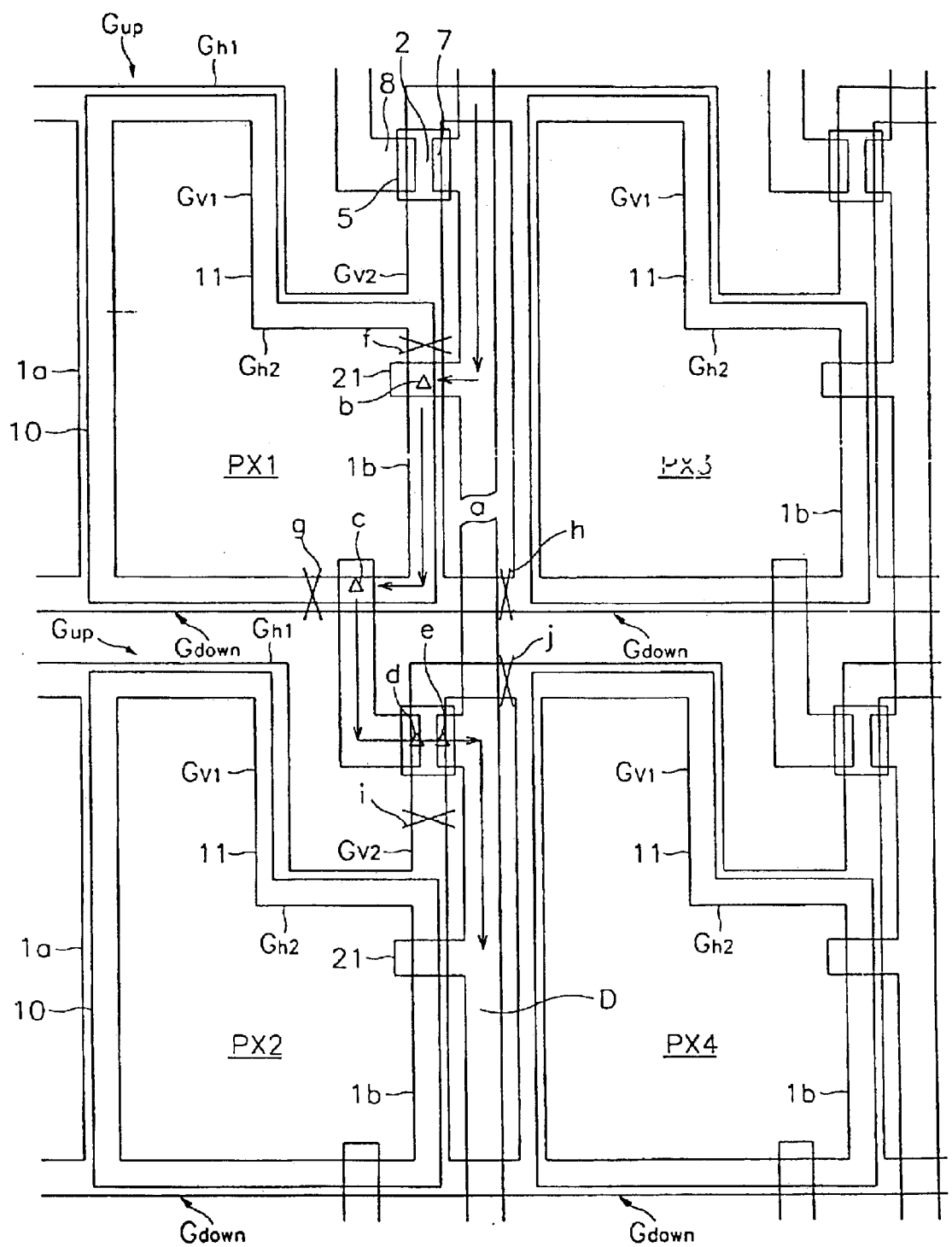
FIGS. 19A to 19C illustrates methods for repairing defects of the LCD shown in FIG. 18.
Figure 19B:
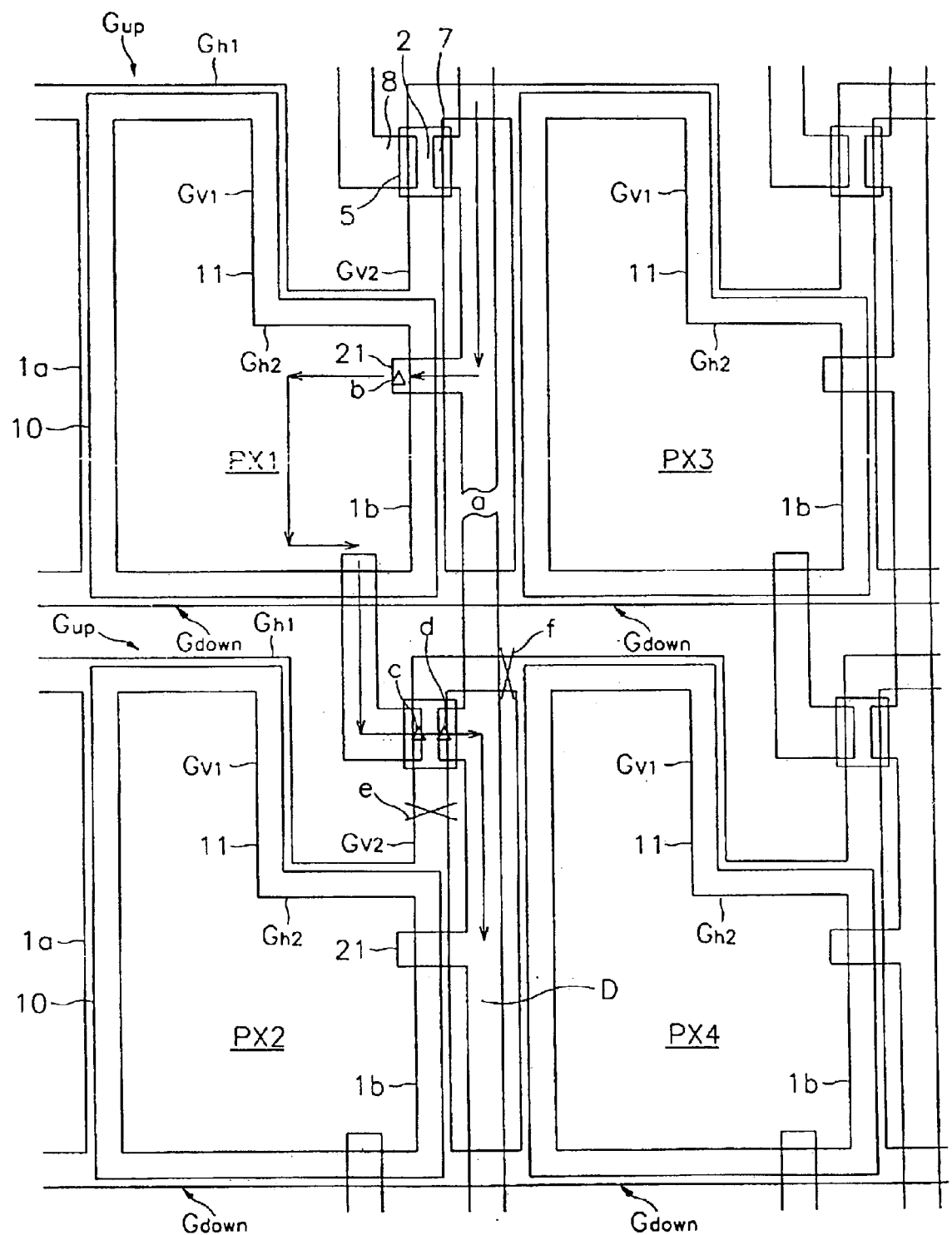
Figure 19C:
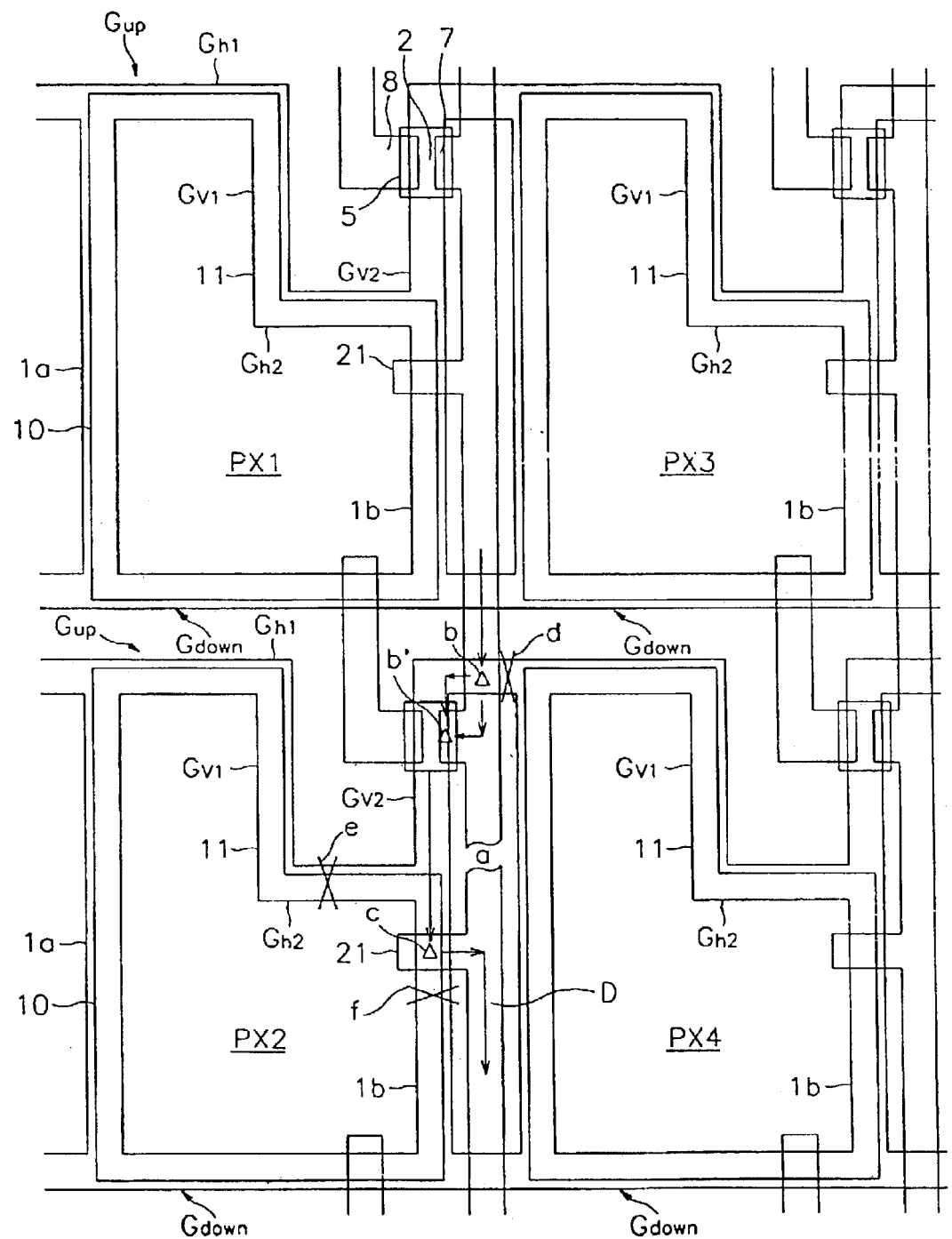

FIG. 18 is an arrangement plan of a pixel layout of a second embodiment of the TFT array panel of the matrix-type LCD according to the present invention, and FIGS. 19A to 19C are diagrams of illustrating a method of repairing the disconnection of the data line in the LCD according to the second preferred embodiment of the present invention.

As shown in FIG. 18, in the substrate of the matrix-type LCD according to the second embodiment of the present invention, a connect portion 21 as a branch of a data line D extends to a pixel electrode 10 while being overlapped with a right auxiliary gate line 1b and the pixel electrode 10. Here, in order to form the overlapped portion between the connect portion 21 and the pixel electrode 10, the connect portion 21 should sufficiently extend toward the pixel electrode 10. Also, since the pixel electrode 10 is overlapped with the right auxiliary gate line 1b, a cross point between the connect portion 21 and the right auxiliary gate line 1b overlaps the pixel electrode 10. Here, the gate oxide layer 3 and the gate insulating layer 4 of FIG. 4 are interposed between the connect portion 21 and the right auxiliary gate line 1b, and the passivation layer 9 is interposed between the connect portion 21 and the pixel electrode 10. In addition, the upper gate line $G_{up}$ and the lower gate line $G_{down}$, and the left and right auxiliary gate lines 1a and 1b are overlapped at the pixel electrode 10 and the periphery of the pixel electrode 10 via an insulation layer, thereby forming a ring-type capacitor. The remaining portions are similar with those of the layouts shown in FIGS. 3 and 4.

The inferiority of the data line in the above matrix-type LCD can be repaired using the following methods one of which is selected in accordance with the locations of the disconnection.

First, as shown in FIGS. 19A and 19B, supposing that the data line D placed between a diverging point of the connect portion 21 in a pixel PX1 and a diverging point of the source electrode 7 of a pixel PX2 which is formed below the pixel PX1 is disconnected (a), so that a data signal cannot be transferred to a portion following the disconnected point. Here, the arrows shown in FIGS. 19A and 19B represent the flow of the signal.

In this case, the disconnection may be repaired using the right auxiliary gate line 1b of the pixel PX1 or the pixel electrode 10. First, a method of repairing the disconnection using the right auxiliary gate line 1b of the pixel PX1 will be described with reference to FIG. 19A.

A cross point between the connect portion 21 located above the disconnect point a of the data line D and the pixel electrode 10 and the right auxiliary gate line 1b is shorted (b) using a laser, and then the right auxiliary gate line 1b located above the short point b is disconnected (f). Here, the pixel electrode 10, the right auxiliary gate line 1b and the connect portion 21 are simultaneously shorted at the short point b, so that a defect may occur in the gate line and the data line D. However, in case of employing Al or Al composite as the material of the gate line, since the right auxiliary gate line is oxidized at the short point b by a battery effect between the right auxiliary gate line 1b and the pixel electrode 10, the right auxiliary gate line 1b and the pixel electrode 10 are spontaneously insulated each other. In addition, the contact resistance of indium thin oxide (ITO) composing the pixel electrode 10 is greater than those of the right auxiliary gate line 1b and the data line D, a data signal is not transferred to the pixel electrode 10. Also, even if the pixel PX1 has the defects, it is difficult to detect the defects since the data signal is continuously applied.

Thus, the data signal flown along the data line D comes to flow along the right auxiliary gate line 1b of the pixel PX1 via the connect portion 21, around the disconnect point a. Then, the data signal comes to flow along a lower gate line $G_{down}$ which is connected to the right auxiliary gate line 1b.

Subsequently, a cross point among the lower gate line $G_{down}$ and the pixel electrode 10 of the pixel PX1 and the drain electrode 8 of the pixel PX2 is shorted (c) using a laser and then the lower gate line $G_{down}$ located at the left of the short point c and the lower gate line $G_{down}$ located at the right of a cross point between the lower gate line $G_{down}$ and the right auxiliary gate line 1b are disconnected (g and h). Here, there is possibility in that a defect which is similar with that at the short point b occurs. However, the defect does not matter due to the above described reason. Thus, the signal flown along the lower gate line $G_{down}$ of the pixel PX1 comes to flow along the drain electrode 8 of the pixel PX2.

Then, the drain electrode 8 and the gate electrode 2, and the gate electrode 2 and the source electrode 7 of the pixel PX2 are shorted respectively (d and e) and the two points of the upper gate line $G_{up}$ of the pixel PX2, below and above the gate electrode 2, are disconnected (i and j). As a result, the data signal comes to flow along the data line D again.

That is, the data signal flows via the connect portion 21, the right auxiliary gate line 1b and the lower gate line $G_{down}$ of the pixel PX1 and returns to the data line D via the drain electrode 8, the gate electrode 2 and the source electrode 7 of the pixel PX2.

In the above case, a gate signal is applied to a pixel PX3 which is located at the right of the disconnected pixel PX1 via only the upper gate line $G_{up}$, and a gate signal is applied to a pixel PX4 which is located at the right of the pixel PX2 located below the disconnected pixel PX1 via only the down gate signal $G_{down}$. Here, the gate signal is not applied to the gate electrode 2 of the pixel PX2.

Next, referring to FIG. 19B, a method of repairing the defect which is the same as that of FIG. 19A using the pixel electrode 10 will be described. That is, in this case, the data line D placed between a diverging point of the connect portion 21 in a pixel PX1 and a diverging point of the source electrode 7 of a pixel PX2 which is formed below the pixel PX1 is disconnected (a), so that a data signal cannot be transferred to a portion following the disconnected point. Here, the arrows shown in FIG. 19B represent the flow of the signal.

When a cross point between the connect portion 21 located above the disconnect point a of the data line D and the pixel electrode 10 is shorted (b) using a laser, the data signal flown along the data line D flows toward the pixel electrode 10 of the pixel PX1 via the connect portion 21, around the disconnect point a and continuously flows along the drain electrode 8 of the pixel PX2 which is connected to the pixel electrode 10.

Then, the drain electrode 8 and the gate electrode 2, and the gate electrode 2 and the source electrode 7 of the pixel PX2 are shorted respectively (c and d) and the two points of the upper gate line $G_{up}$ of the pixel PX2, above and below the gate electrode 2, are disconnected (e and f). As a result, the data signal comes to flow along the data line D again.

That is, the data signal flows via the connect portion 21 and the pixel electrode 10 of the pixel PX1 and returns to the data line D via the drain electrode 8, the gate electrode 2 and the source electrode 7 of the pixel PX2.

In the above case, a gate signal is applied to a pixel PX4 which is located at the right of the pixel PX2 via only the lower gate line $G_{down}$, and a gate signal is not applied to the gate electrode 2 of the pixel 2.

Here, the pixel PX1 has the defect, however, it is difficult to detect the defect since the data signal is continuously applied to the pixel electrode 10 of the pixel PX1.

Then, as shown in FIG. 19C, supposing that the data line D placed between a diverging point of the source electrode 7 of the pixel PX2 and a diverging point of the connect portion 21 of the pixel, PX2 is disconnected (a), so that a data signal cannot be transferred to a portion following the disconnected point. Here, the arrows shown in FIG. 19C represent the flow of the signal.

A cross point between the data line D located above the disconnect point a of the data line D and the upper gate line $G_{up}$ is shorted (b) or the source electrode 7 and the gate electrode 2 are shorted (b'), and then the upper gate line $G_{up}$ located at the right of the short point b and the second horizontal portion $G_{h2}$ are disconnected (d and e). As a result, the data signal flows toward the right auxiliary gate line 1b from the second vertical portion $G_{v2}$.

Subsequently, a cross point between the connect portion 21 and the pixel electrode 10 is shorted (c) using a laser and then the right auxiliary gate line 1b located below the short point c is disconnected (f). As a result, the gate signal flown along the right auxiliary gate line 1b returns to the data line D. Here, like the above case, the pixel electrode 10, the lower gate line $G_{down}$ and the drain electrode 8 are simultaneously shorted at the short point c, so that a defect may occur in the gate line and the data line. However, the defect does not matter due to the above described reason. Thus, the data signal flows via the gate electrode 2, the second vertical portion $G_{v2}$ and the right auxiliary gate line 1b and returns to the data line D via the connect portion 21.

In the above case, a gate signal is applied to a pixel PX4 which is located at the right of the disconnected pixel PX2 via only the lower gate line $G_{down}$, and a gate signal is not applied to the gate electrode 2 of the disconnected pixel PX2.

Here, since the signal is not applied to the pixel PX1 located above the disconnected pixel PX2, the pixel PX1 is regarded as a pixel having a defect. However, when the gate electrode 2 and the drain electrode 8 of the disconnected pixel PX2 are shorted, the data signal is continuously applied to the pixel electrode 10 of the pixel PX1. Thus, the defect of the pixel PX1 is not shown easily.

The third embodiment of the matrix-type display in accordance with the present invention is based on the basic layout shown in FIG. 8, where the defect of a data line is repaired using a means for connecting an auxiliary gate line to the data line and a means for connecting a drain electrode to the lower gate line. In order to connect the data line and the auxiliary gate line via an insulator, a branch from the data line may extend to the auxiliary gate line or a branch from the auxiliary gate line may extend to the data line. Here, this embodiment adopts the later case. Also, since the drain electrode is overlapped with the lower gate line, it is unnecessary to adopt another layout for overlapping therebetween. In addition, the upper gate line and the lower gate line, and the left and right auxiliary gate lines are overlapped at the pixel electrode and the periphery of the pixel electrode via an insulation layer, thereby forming a ring-type capacitor.

Hereinafter, the third embodiment of the present invention will be described in detail with reference to FIGS. 20, 21A and 21B.

Figure 20:
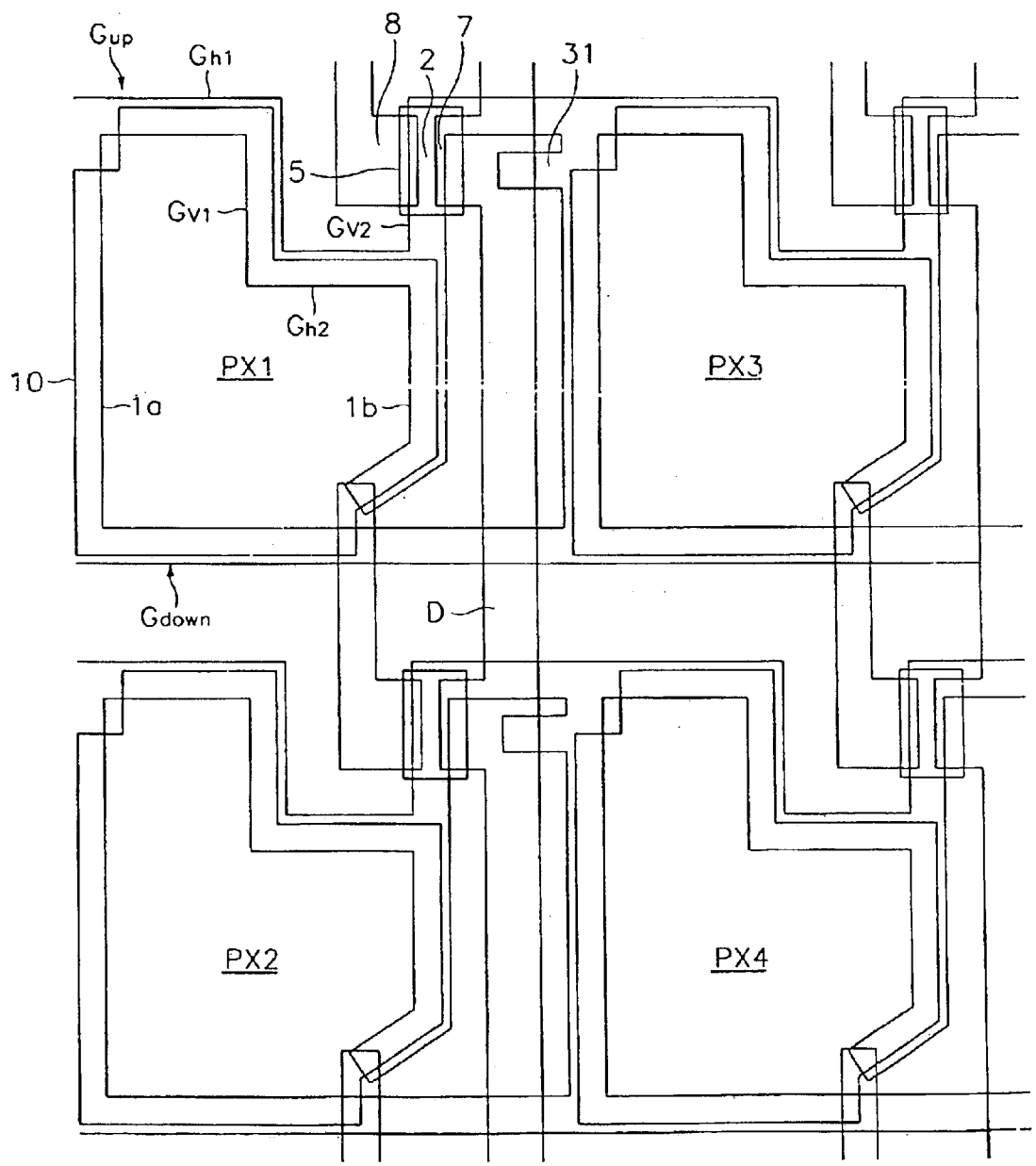
FIG. 20 shows a layout of a third embodiment of a TFT array panel of an LCD according to the present invention.
Figure 21A:
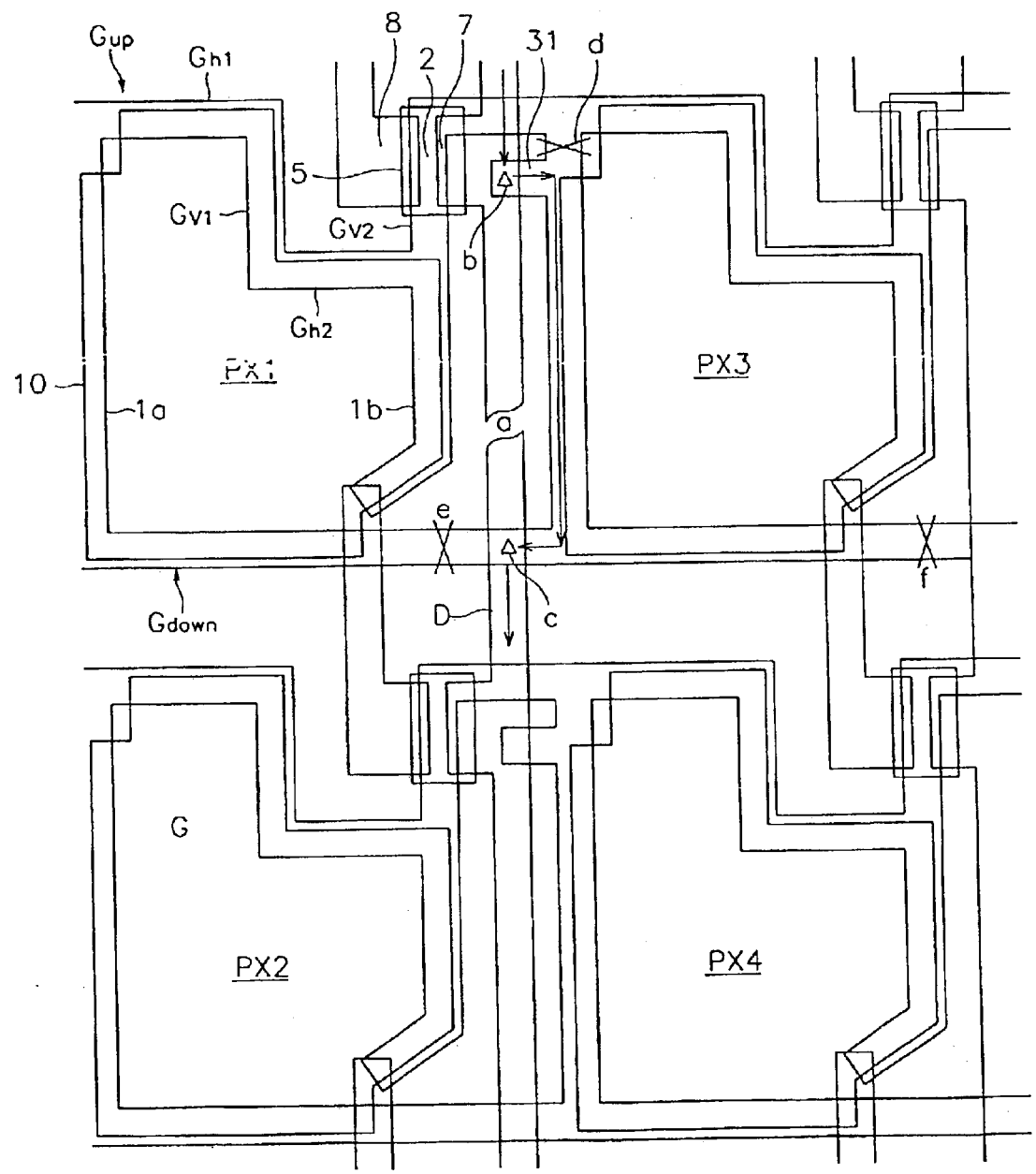
FIGS. 21A and 21B illustrates methods for repairing defects of the LCD shown in FIG. 20.
Figure 21B:
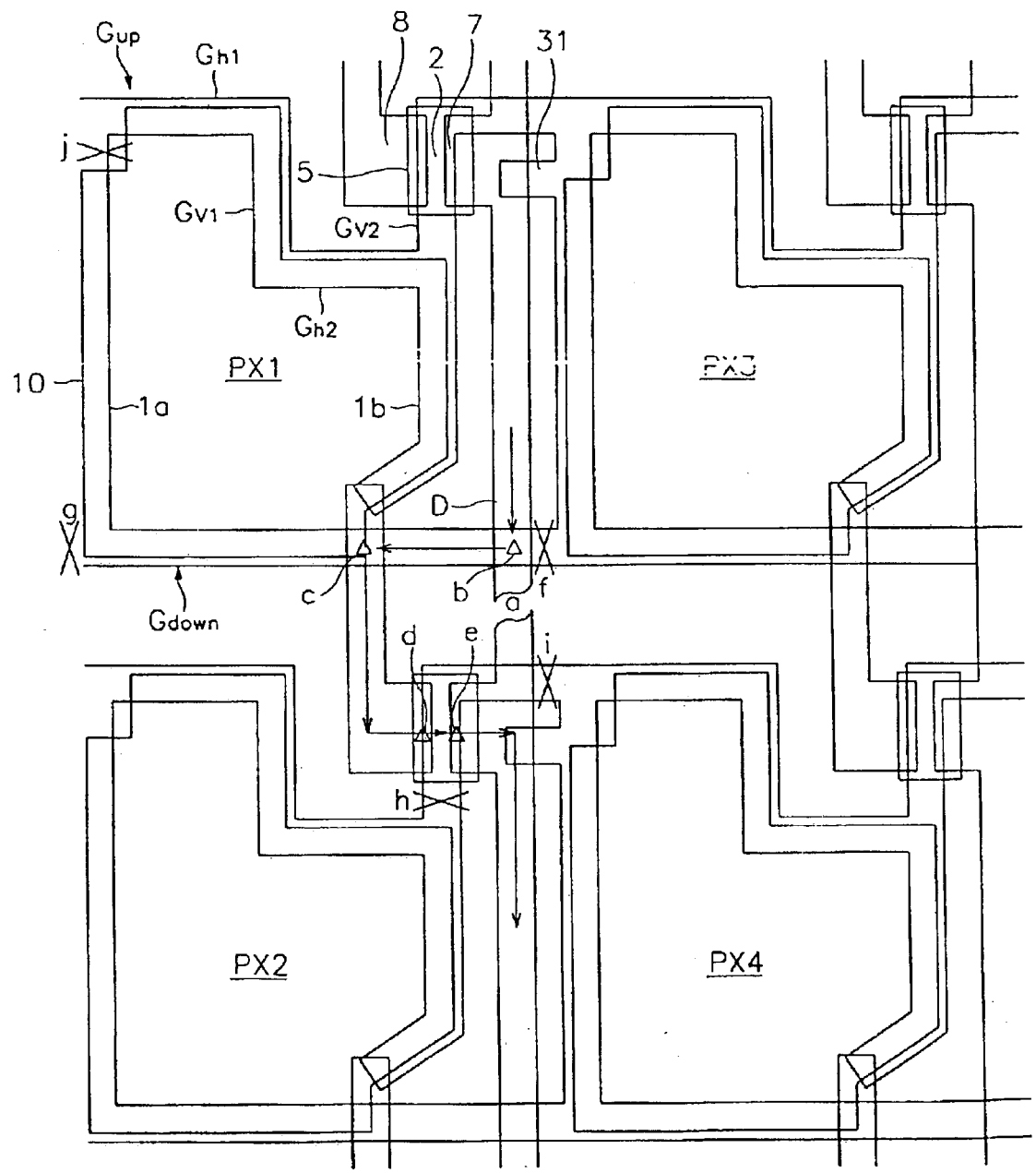

FIG. 20 is an arrangement plan of a pixel layout of a third embodiment of the TFT array panel of the matrix-type LCD according to the present invention, and FIGS. 21A and 21B are diagrams of illustrating a method of repairing the disconnection of the data line in the LCD according to the third preferred embodiment of the present invention.

As shown in FIG. 20, in the substrate of the matrix-type LCD according to the third embodiment of the present invention, a connect portion 31 as a branch of a left auxiliary gate line 1a of a pixel PX3 extends toward the data line located at the left of the left auxiliary gate line 1a to be overlapped with a diverging point of the source electrode 7. Here, in order to repair all disconnection of the data line D, it is important that the connect portion 31 should overlap the source electrode 7 at the diverging point of the source electrode 7 or at above the diverging point. Also, the pixel electrode 10 overlaps the left auxiliary gate line 1a. However, a portion of the pixel electrode, being from the upper gate line $G_{up}$ to the diverging point of the connect portion 31, is not overlapped with the left auxiliary gate line 1a, so that the pixel electrode 10 is not damaged with respect to the disconnection. On the other hand, the data line D and the connect portion 31 have the gate oxide layer 3 and the gate insulating layer 4 of FIG. 4 therebetween. Also, a right auxiliary gate line 1b is not connected to a lower gate line $G_{down}$ and is bent toward a connect point between the drain electrode 8 and the pixel electrode 10 while being overlapped with the drain electrode 8. The remaining portions are similar with those of the layouts shown in FIGS. 3 and 4.

The inferiority of the data line in the above matrix-type LCD can be repaired using the following methods one of which is selected in accordance with the locations of the disconnection.

First, as shown in FIG. 21A, supposing that the data line D placed between a cross point of the data line D and the connect-portion 31 or the diverging point of the source electrode 7 and a cross point of the data line D and the lower gate line $G_{down}$ is disconnected (a), so that a data signal cannot be transferred to a portion following the disconnected point. Here, the arrows shown in FIG. 21A represent the flow of the signal.

The cross point between the data line D located above the disconnect point a of the data line D, and the connect portion 31 is shorted (b) using a laser, so that a data signal flows into the left auxiliary gate line 1a of the right pixel PX3. Then, a point located above a diverging point of the connect portion 31 from the left auxiliary gate line 1a is disconnected (d). Therefore, the data signal comes to flow into the lower gate line $G_{down}$ along the left auxiliary gate line 1a.

Subsequently, the cross point between the lower gate line $G_{down}$ and the disconnected data line D of the pixel PX1 is shorted (c) using a laser and then the lower gate line $G_{down}$ located at the left of the short point c and the lower gate line $G_{down}$ located at the right of the connect point between the right auxiliary gate line 1b and the lower gate line $G_{down}$ are disconnected (e and f). Thus, the data signal comes to flow into the data line D via the short point c.

As a result, the data signal flows along the data line D via the connect portion 31, the right auxiliary gate line 1a and the lower gate line $G_{down}$ of the right pixel PX3.

Next, as shown in FIG. 21B, supposing that the data line D placed between a cross point of the data line D and the lower gate line $G_{down}$ and a diverging point of the source electrode 7 of a pixel PX2 is disconnected (a), so that a data signal cannot be transferred to a portion following the disconnected point. Here, the arrows shown in FIG. 21B represent the flow of the signal.

The cross point between the data line D located above the disconnect point a of the data line D and the lower gate line $G_{down}$ is shorted (b) using a laser and then the lower gate line $G_{down}$ located at the right of the short point b is disconnected (f), so that a data signal flown into the data line D comes to flow along the lower gate line $G_{down}$ via the short point b in left direction, around the disconnect point a.

Subsequently, the cross point between the drain electrode 8 of the pixel PX2, connected to the pixel electrode 10 of the pixel PX1, and the lower gate line $G_{down}$ is shorted (c) and then the lower gate line $G_{down}$ and the auxiliary gate line 1a which are located at the left of the short point c are disconnected (g and j). Here, the pixel electrode 10, the lower gate line $G_{down}$ and the drain electrode 8 are simultaneously shorted at the short point c, so that the gate line and the data line may be defected. However, the defect does not matter due to the same reason described in the above second embodiment.

Then, the drain electrode 8 and the gate electrode 2, and the gate electrode 2 and the source electrode 7 of the pixel PX2 are shorted respectively (d and e) and two points of the upper gate line $G_{up}$ of the pixel PX2, located at both sides of a transistor thereof, are disconnected (h and i). As a result, the data signal comes to flow along the data line D again from the drain electrode 8 via the gate electrode 2 and the source electrode 7.

That is, the data signal comes to flow the data line D via the lower gate line $G_{down}$ of the pixel PX1, and the drain electrode 8, the gate electrode 2 and the source electrode 7 of the pixel PX2.

In the above case, a gate signal is applied to a pixel PX4 which is located at the right of the pixel PX2 via only the lower gate line $G_{down}$. However, the gate signal is not applied to the gate electrode 2 of the pixel PX2.

The fourth embodiment of the matrix-type display in accordance with the present invention is based on the basic layout shown in FIG. 14, where the defect of a data line is repaired using up and down connect means for connecting up and down ends of an auxiliary gate line which is separated from the up and lower gate lines via insulator, and a connect means for connecting each left auxiliary gate line of two upper and lower pixels which are in the same column. As described above, in order to connect the data line and both ends of the auxiliary gate line, a branch from the data line may extend to the auxiliary gate line or both ends of the auxiliary gate line may extend to the data line. Here, this embodiment adopts the later case. Also, in order to achieve means for connecting each auxiliary gate line of upper and lower pixels being adjacent each other, there is prepared a pattern of the connect means formed of material composing the data line or the pixel electrode. In addition, the upper gate line and the lower gate line, and the left and right auxiliary gate lines are overlapped at the pixel electrode and the periphery of the pixel electrode via an insulation layer, thereby forming a ring-type capacitor.

When occurring a pixel defect, since the left auxiliary gate line is overlapped with the pixel electrode, the left auxiliary gate line and the pixel electrode is short-circuited to repair the pixel defect.

Hereinafter, the fourth embodiment will be described in detail with reference to FIGS. 22 and 23A to 23C.

Figure 22:
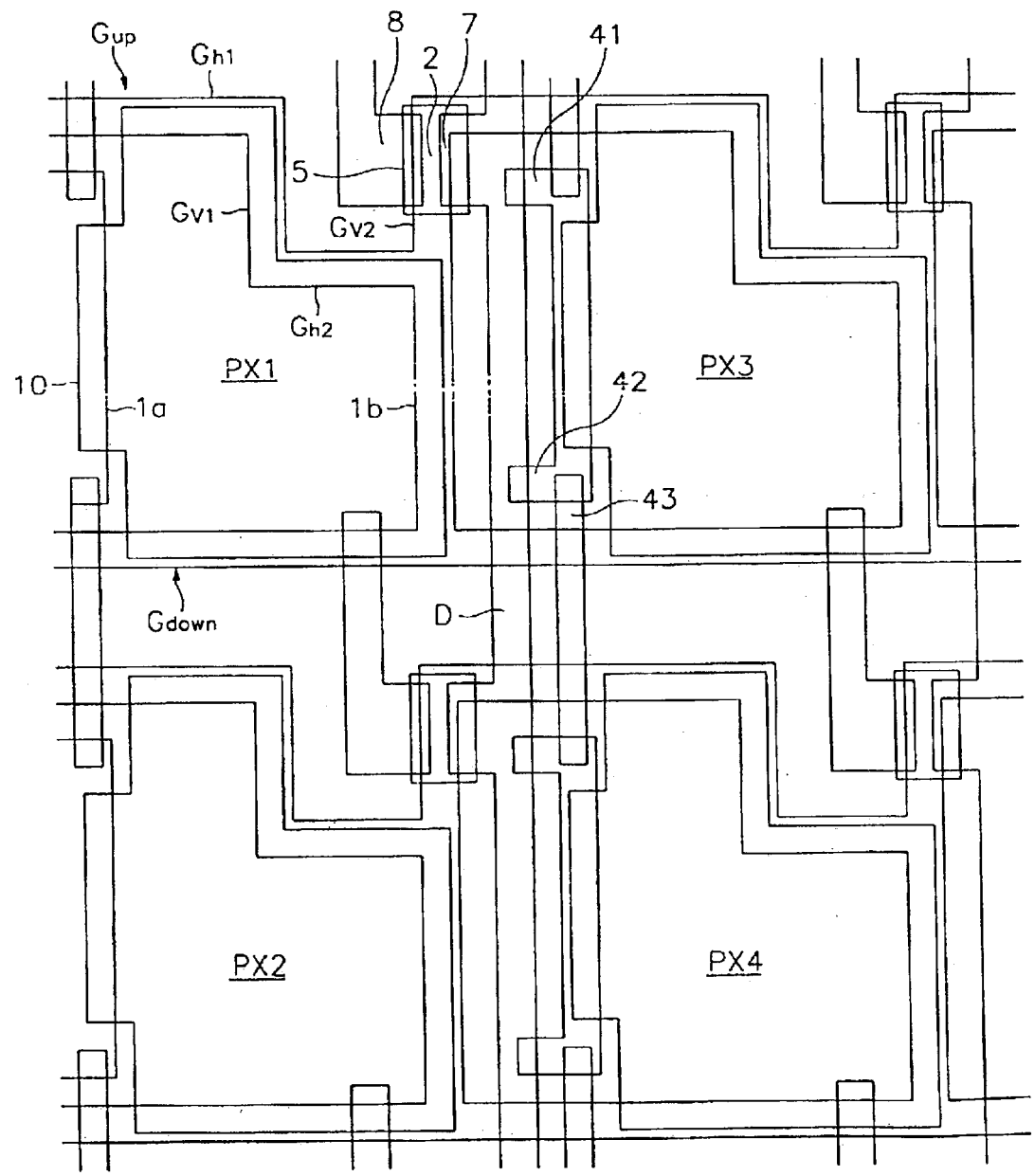
FIG. 22 shows a layout of a fourth embodiment of a TFT array panel of an LCD according to the present invention.
Figure 23A:
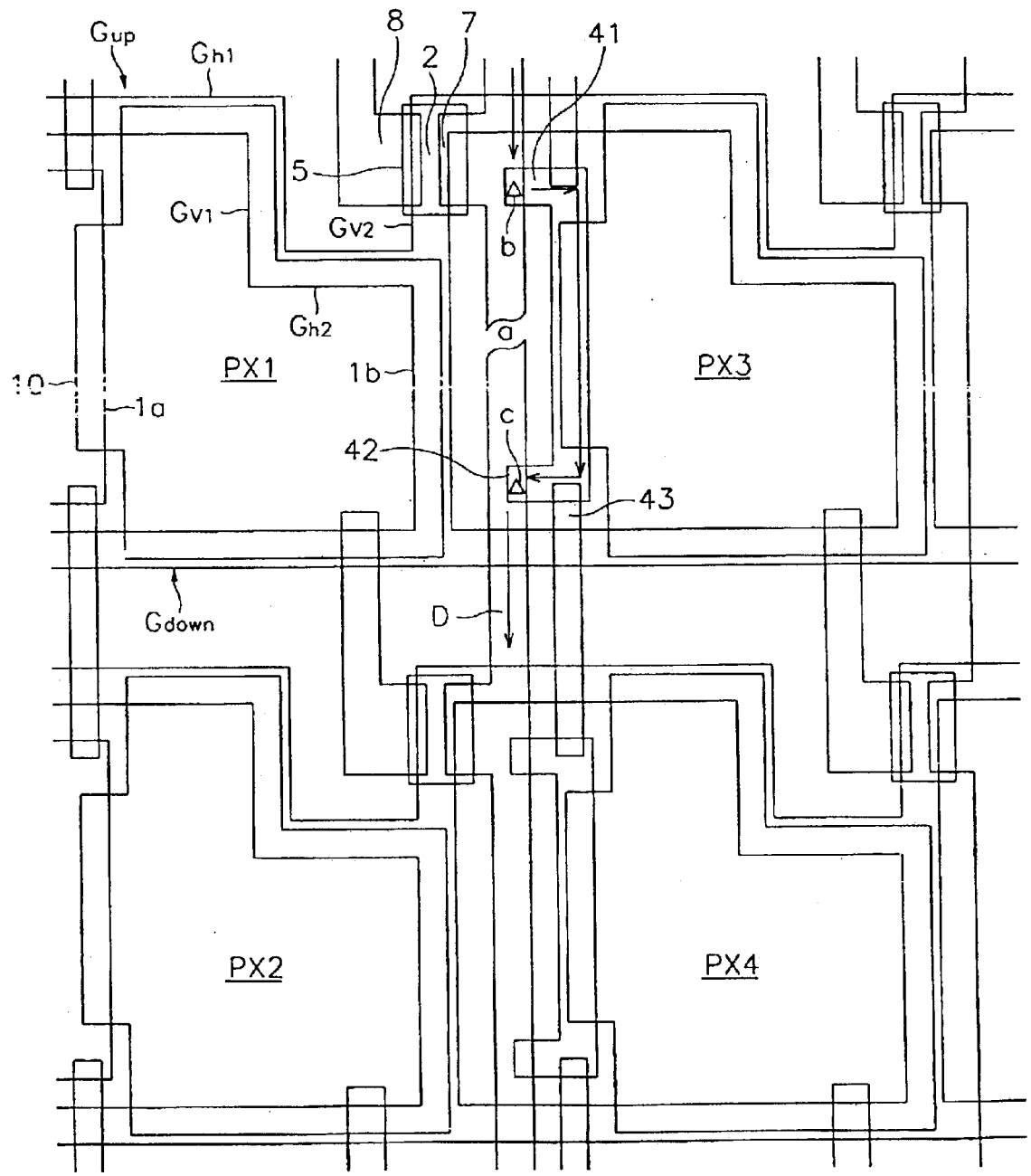
FIGS. 23A and 23C illustrates methods for repairing defects of the LCD shown in FIG. 22.
Figure 23B:
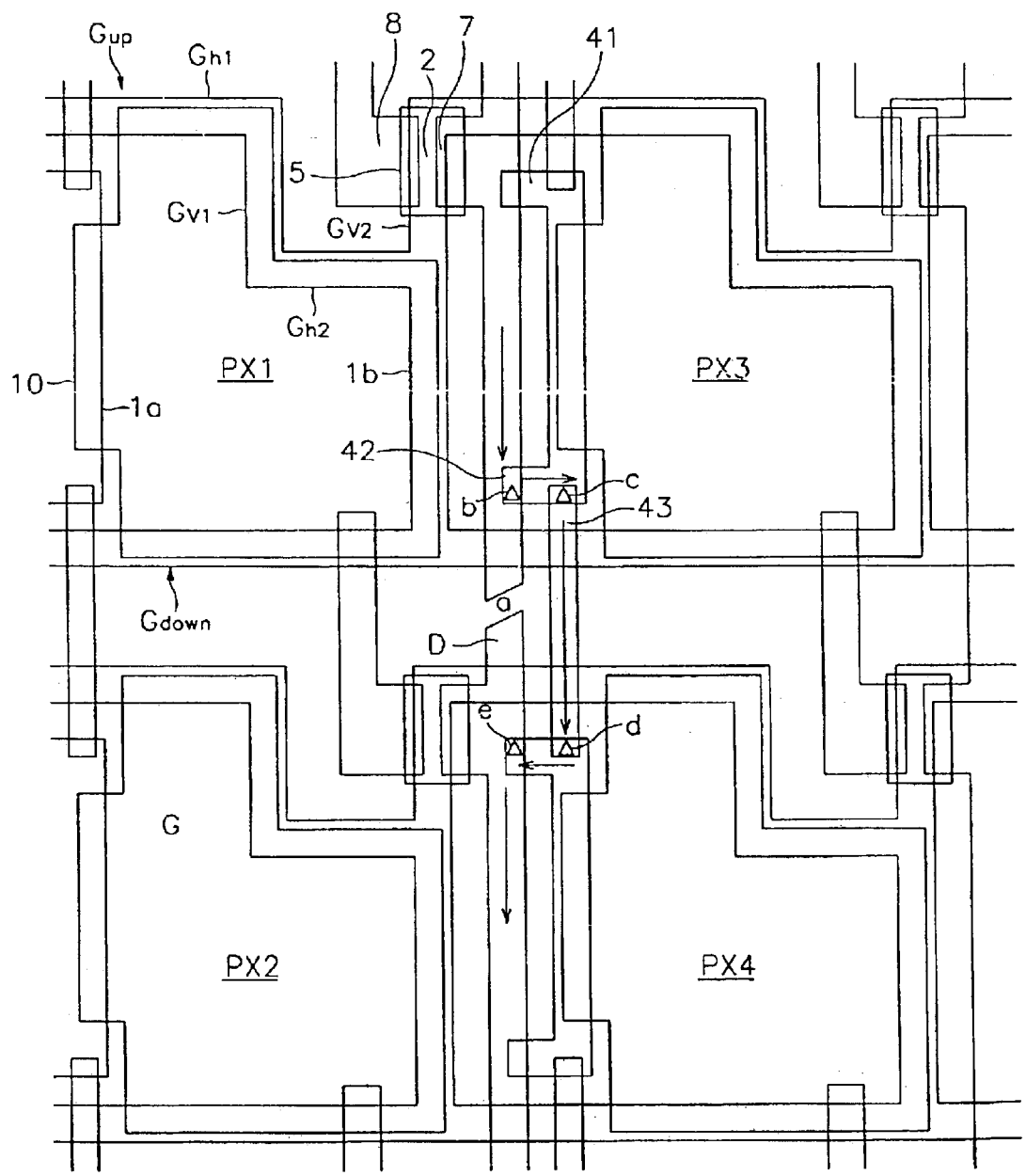
Figure 23C:
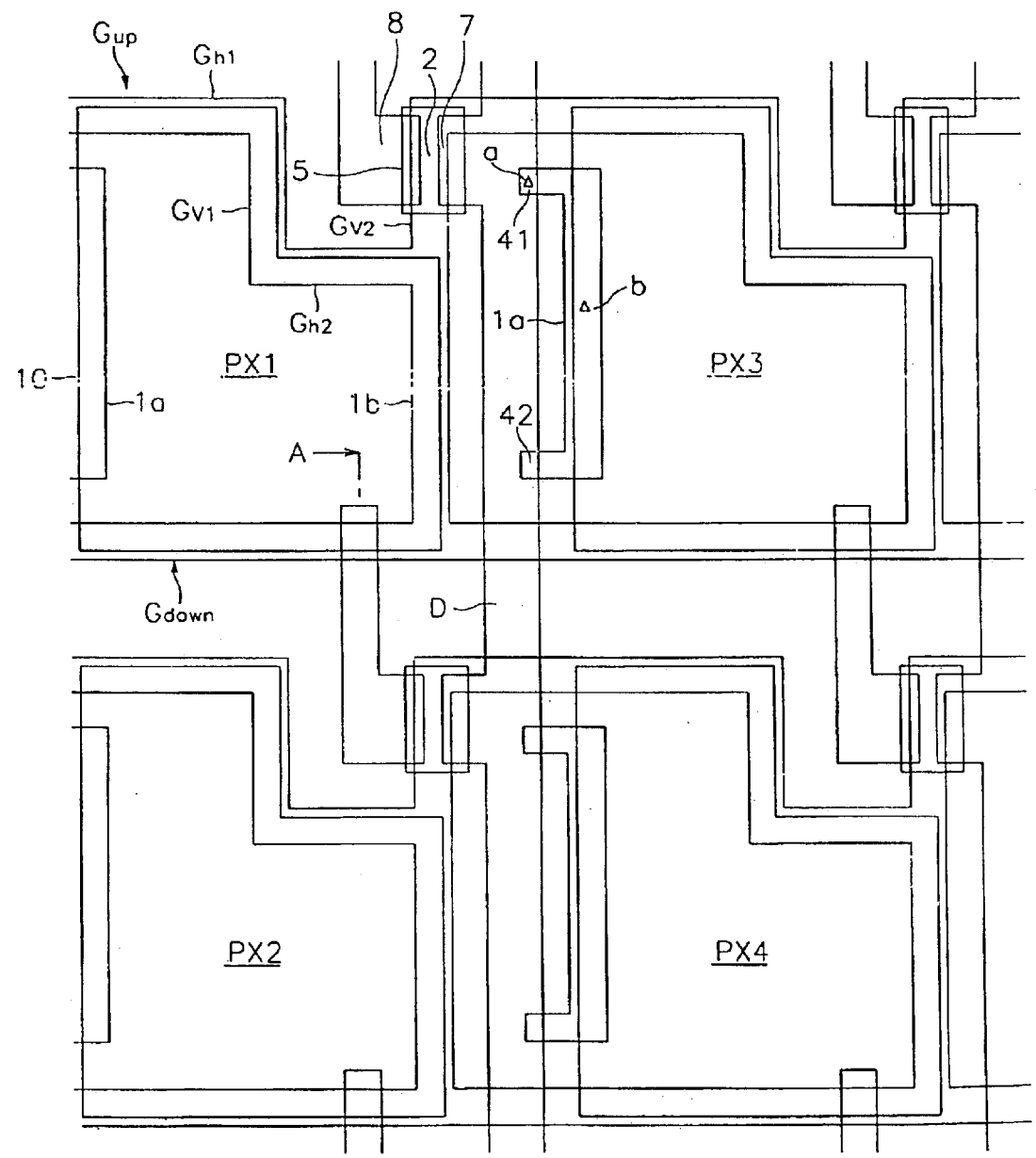

FIG. 22 shows a layout of a pixel of the TFT array panel of the matrix-type LCD according to fourth embodiment of the present invention, FIGS. 23A and 23B are diagrams of illustrating a method of repairing the data line open in the LCD according to the fourth embodiment, and FIG. 23C shows a method for repairing the pixel defect in the LCD according to the fourth embodiment.

As shown in FIG. 22, in the substrate of the matrix-type LCD according to the fourth embodiment of the present invention, a left auxiliary gate line 1a is formed while being separated from the up and lower gate lines $G_{up}$ and $G_{down}$ and the up and down ends of the left auxiliary gate line 1a are bent in the left to form up and down first connect portions 41 and 42 which overlap the data line D of the pixel PX1 located at the left of the pixel PX3. Also, a second connect portion 43 is formed while being overlapped with the left auxiliary gate lines 1a of the upper pixel PX1 or PX3 and the lower pixel PX2 or PX4 which is located below the pixel PX1 or PX3, crossing the lower gate line $G_{down}$ of the upper pixel PX1 or PX3 and the upper gate line $G_{up}$ of the lower pixel PX2 or PX4. Also, the pattern of the pixel electrode 10 is not formed at the overlap portion between the second connect portion 43 and the left auxiliary gate line 1a to prevent the pixel electrode 10 from being shorted when the second connect portion 43 and the left auxiliary gate line 1a are shorted. Here, the data line D and the up and down first connect portions 41 and 42 are formed where the gate oxide layer 3 and the gate insulating layer 4 of FIG. 4 are interposed therebetween. The second connect portion 43 is formed of material composing the data line D or the pixel electrode 10, or a dual layer in which two kinds of material composing the data line D and the pixel electrode 10 are patterned. Here, the gate oxide layer 3 and the insulating layer 4 or the gate oxide layer 3, the insulating layer 4 and the passivation layer 9 of FIG. 4 are interposed among the left auxiliary gate line 1a and the up and lower gate lines $G_{up}$ and $G_{down}$. The remaining portions are similar with those of the layouts shown in FIGS. 3 and 4.

The inferiority of the data line in the above LCD can be repaired using the following methods one of which is selected in accordance with the locations of the disconnection.

First, as shown in FIG. 23A, supposing that the data line D placed between a cross point of the data line D and the up first connect portion 41 and a cross point of the data line D and the down first connect portion 42 is disconnected (a), so that a data signal cannot be transferred to a portion following the disconnected point. Here, the arrows shown in FIG. 23A represent the flow of the signal.

The cross point between the data line D located above the disconnect point a and the up connect portion 41 is shorted (b) using a laser, so that a data signal flows into the left auxiliary gate line 1a of the right pixel PX3. Then, the cross point between the data line D and the down first connect portion 42 is shorted (c). As a result, the data signal comes to flow along the data line D again.

That is, the data signal comes to flow along the data line D via the up first connect portion 41, the left auxiliary gate line 1a and the down first connect portion 42 of the right pixel PX3.

Next, as shown in FIG. 23B, supposing that the data line D placed between a cross point of the data line D and the down first connect portion 42 of the pixel PX3 and a cross point of the up first connect portion 41 of a pixel PX4 located below the pixel PX3 and the data line D is disconnected (a), so that a data signal cannot be transferred to a portion following the disconnected point (a). Here, the arrows shown in FIG. 23B represent the flow of the signal.

The cross point between the data line D located above the disconnect point a of the data line D and the down first connect portion 42 of the pixel PX3 is shorted (b) using a laser, so that a data signal flown along the data line D flows into the down first connect portion 42 via the short point b, around the disconnect point a.

Subsequently, a cross point between the left auxiliary gate line 1a and the second connect portion 43 of the right pixel PX3 is shorted (c) and a cross point between the second connect portion 43 and a left auxiliary gate line 1a of a pixel PX4 located below the pixel PX3 is shorted (d). Then, the up first connect portion 41 of the pixel PX4 and the data line D are shorted (e). As a result, the data signal returns to the data line D via the short point c, the second connect portion 43, the short point d, the up first connect portion 41 of the pixel PX4, and the short point e in sequence.

Finally, a method for repairing a pixel defect is described with reference to FIG. 23C. It is noted that the second connect portion 43 is abbreviated in FIG. 23C for convenience.

When a pixel defect occurs, the first connect portion 41 and the data line D are short-circuited at point a, and the left auxiliary gate line 1a connected to the first connect portion 41 and the pixel electrode 10 are short-circuited.

Here, a pattern made of the material of which the data line is made is formed between the left auxiliary gate line 1a and the pixel electrode 10. Then, since aluminium of the auxiliary gate line 41 and ITO of the pixel electrode 10 are not in contact with each other, the repair is more effective.

The fifth embodiment of the matrix-type display in accordance with the present invention is based on the basic layout shown in FIG. 12 or 14, where the defect such as the disconnection of a data line or the loss of a gate electrode is repaired using a means for connecting the data line to an auxiliary gate line whose up end is separated from the upper gate line, and a means for connecting the data lines of two upper and lower pixels in the same column. As described above, in order to connect the data line and the both ends of the auxiliary gate line, a branch from the data line may extend to the auxiliary gate line or the both ends of the auxiliary gate line may extend to the data line. Here, this embodiment adopts the later case. Also, in order to connect each data line of upper and lower pixels being adjacent each other, there is prepared a pattern formed of material composing the pixel electrode. In addition, the upper gate line and the lower gate line, and the left and right auxiliary gate lines are overlapped at the pixel electrode and the periphery of the pixel electrode via an insulation layer, thereby forming a ring-type capacitor.

Since the left auxiliary gate line is overlapped with the pixel electrode as in the fourth embodiment, the left auxiliary gate line and the pixel electrode is short-circuited to repair the pixel defect.

Hereinafter, the fifth embodiment will be described in detail with reference to FIGS. 24 and 25A to 25F.

Figure 24:
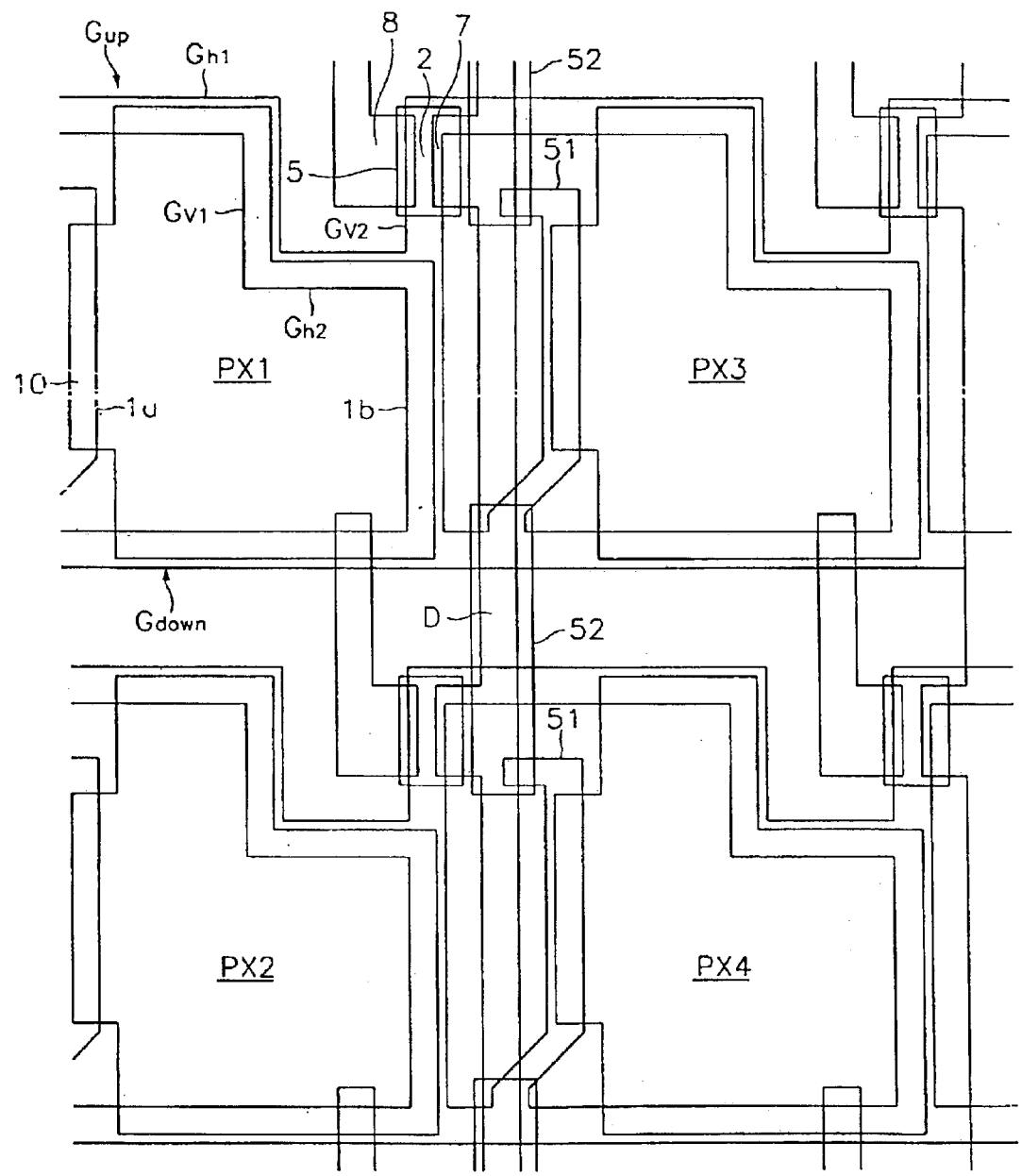
FIG. 24 shows a layout of a fifth embodiment of a TFT array panel of an LCD according to the present invention.
Figure 25A:
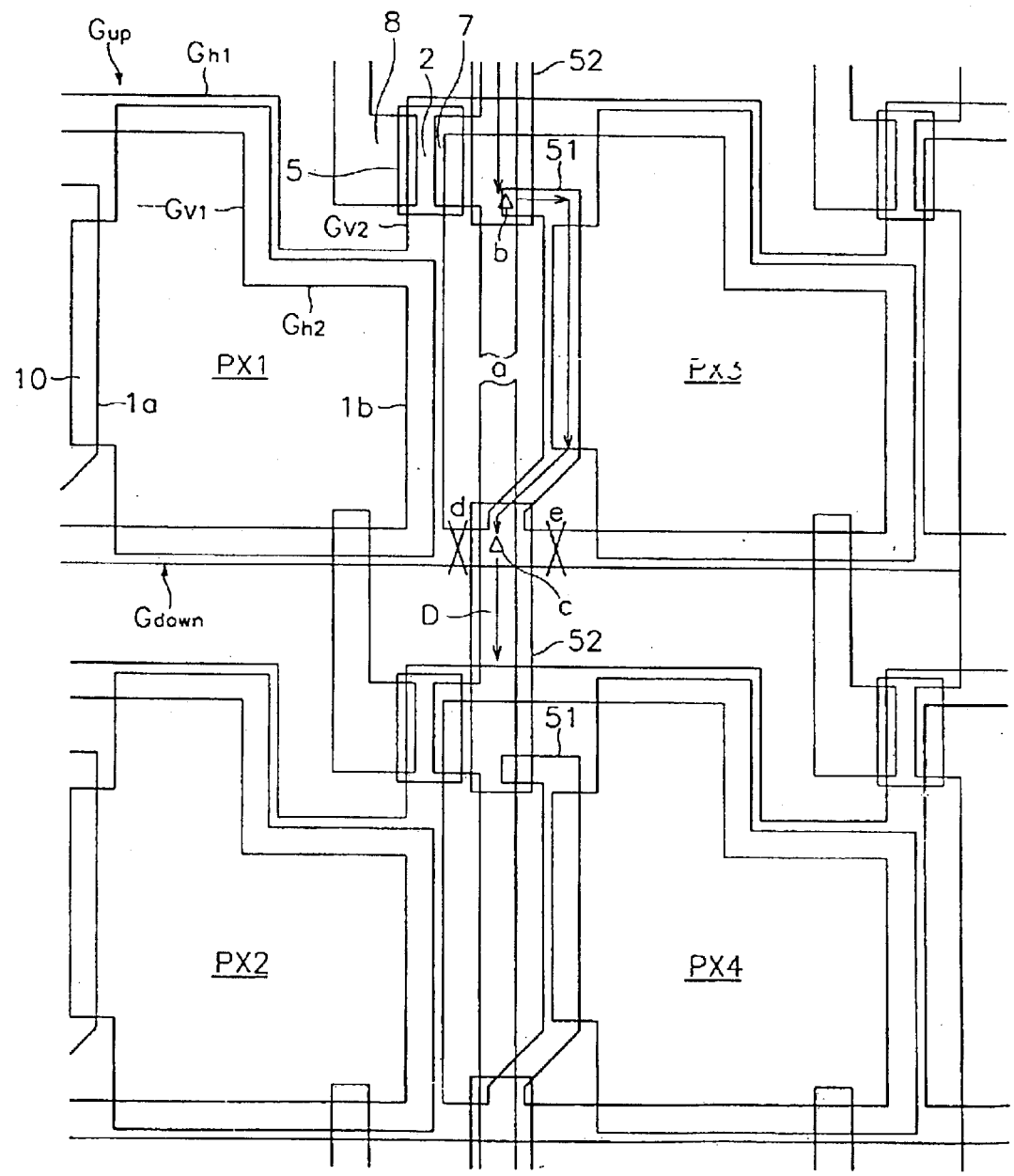
FIGS. 25A to 25F illustrates methods for repairing defects of the LCD shown in FIG. 24.
Figure 25B:
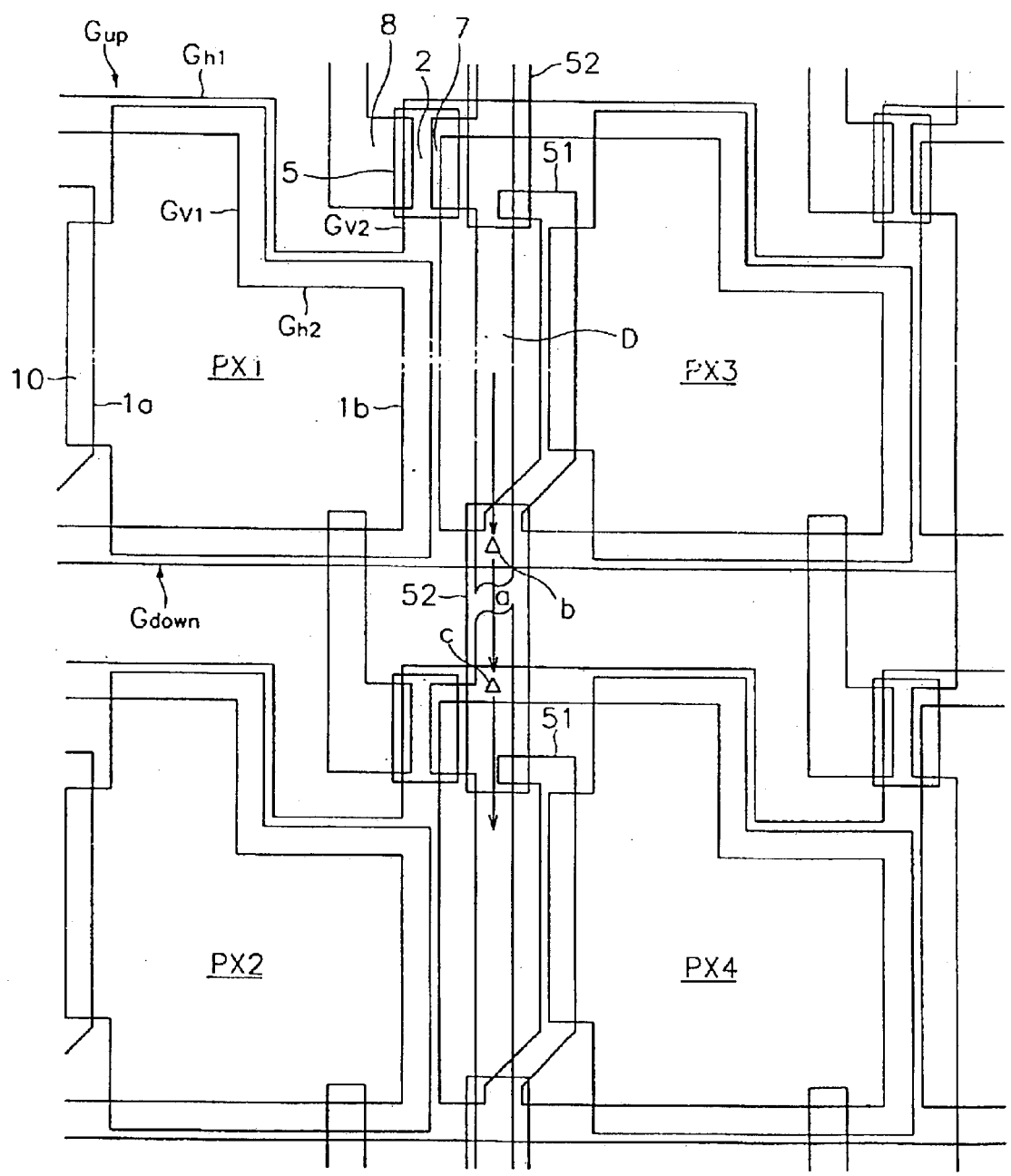
Figure 25C:
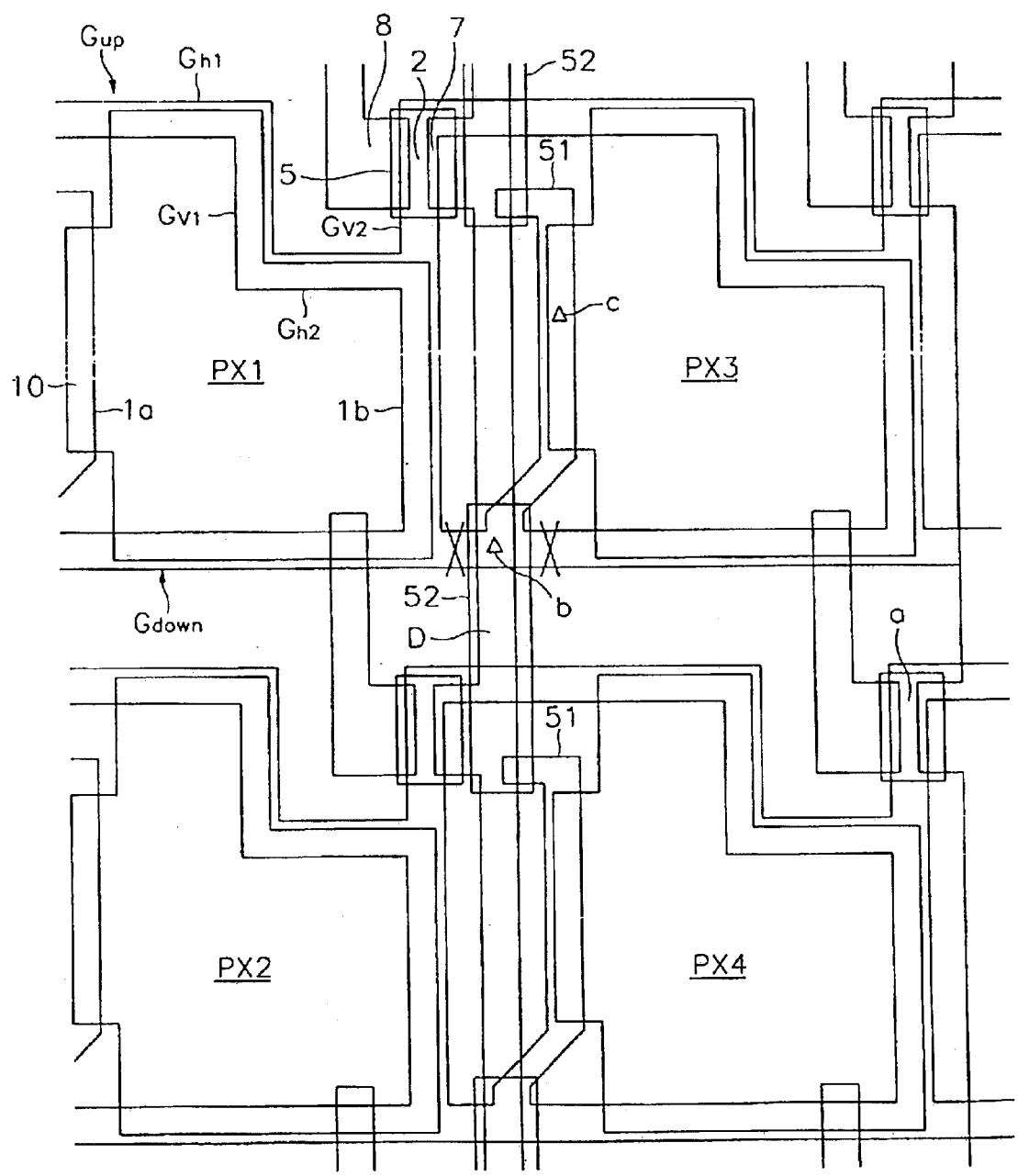
Figure 25D:
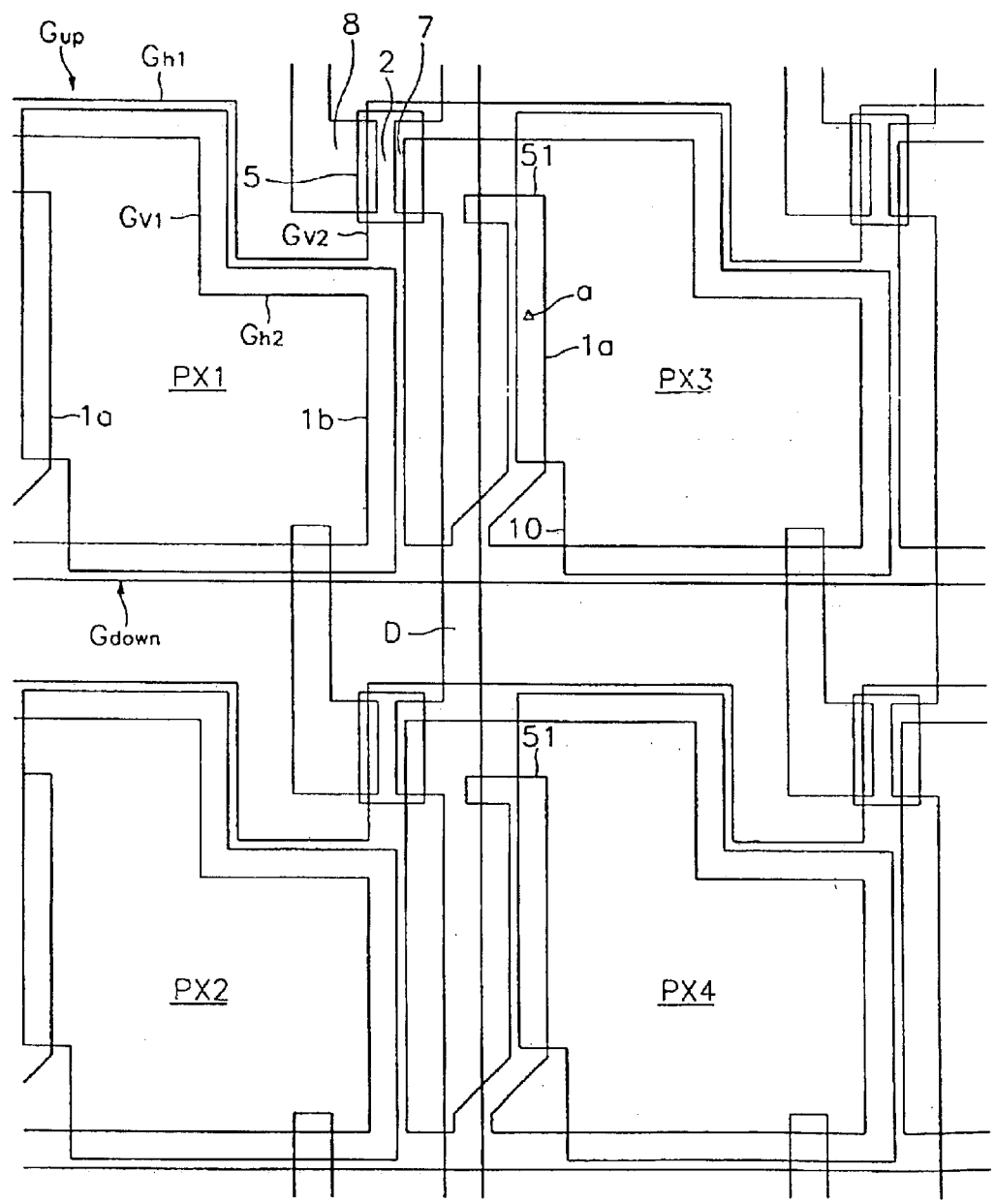
Figure 25E:
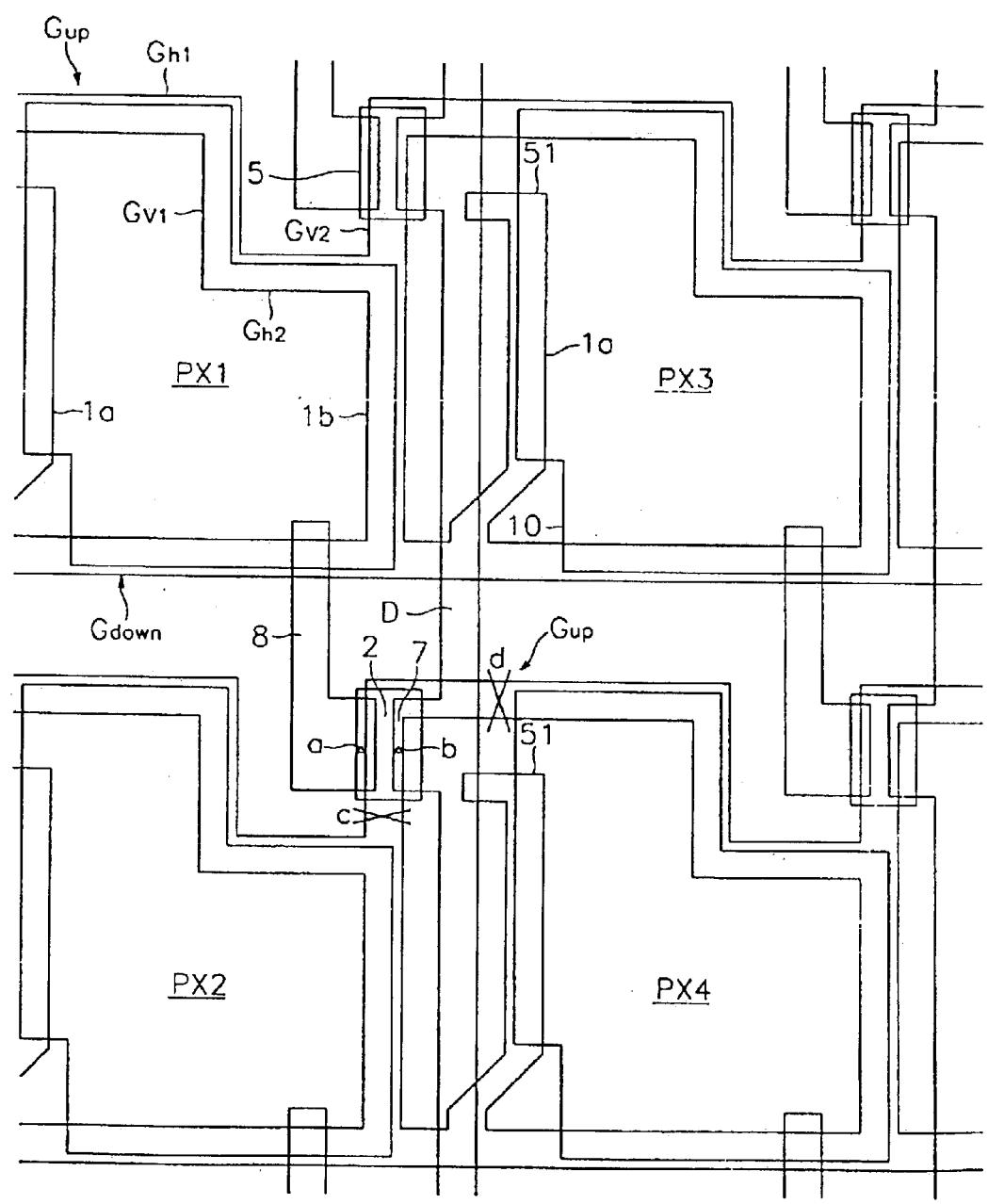
Figure 25F:
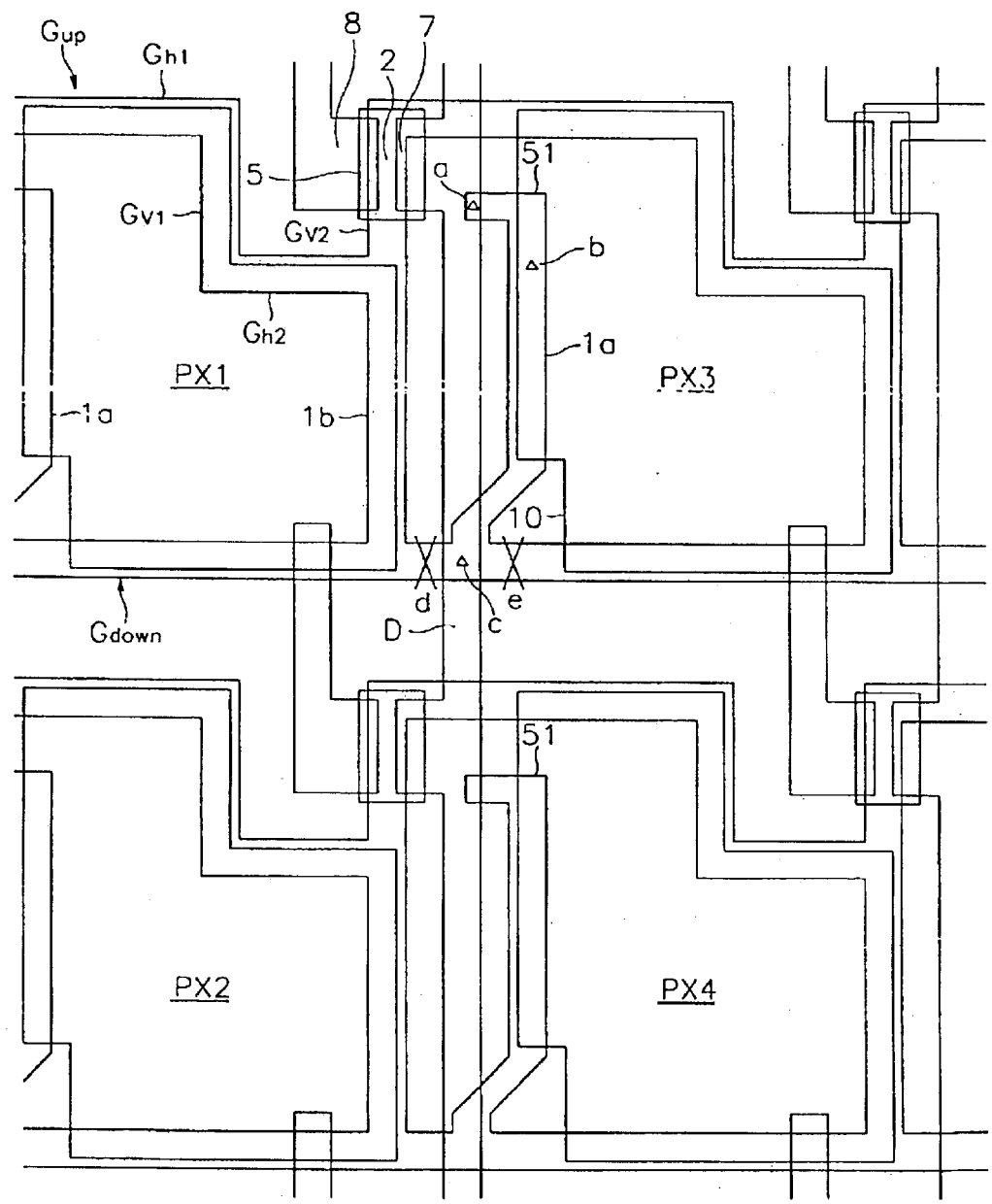

FIG. 24 shows a pixel layout of the TFT array panel of the matrix-type LCD according to of a fifth embodiment of the present invention, FIGS. 25A and 25B illustrate a method for repairing the disconnection of the data line in the LCD substrate according to the fifth embodiment, FIG. 25C illustrates a method for repairing a defect in that a gate electrode is lost, and FIGS. 25D to 25F show repair methods of pixel defects.

As shown in FIG. 24, in the substrate of the matrix-type LCD according to the fifth embodiment of the present invention, a left auxiliary gate line 1a of a pixel PX3 is formed while being separated from the upper gate line $G_{up}$ and a first connect portion 51 is formed by bending the upper end of the left auxiliary gate line 1a to the left while being overlapped with the data line D of the left pixel PX1. Also, the lower end of the left auxiliary gate line 1a is slantingly bent in the left to be connected with the lower gate line $G_{down}$ while being overlapped with the data line D. A second connect portion 52 is formed covering the data line D ranged from the cross point among the lower gate line $G_{down}$, the left auxiliary gate line 1a and the data line of the pixel PX3 to a cross point between the data line D and the first connect portion, 51 of the lower pixel PX4. The pixel electrode 10 overlaps the left auxiliary gate line 1a, however, a corner of the pixel electrode 10 is indented away from the data line at both ends of the auxiliary gate line 1a to prevent the pixel electrode 10 from being overlapped with the left auxiliary gate line 1a. Here, the data line D and the first connect portion 51 are formed while the gate oxide layer 3 and the gate insulating layer 4 of FIG. 4 are interposed therebetween. The second connect portion 52 is formed of transparent conductive material composing the pixel electrode 10 while the passivation layer 9 is interposed between the second connect portion 52 and the data line D. The remaining portions are similar with those of the layouts shown in FIGS. 3 and 4.

The inferiority of the data line in the above LCD can be repaired using the following methods one of which is selected in accordance with the locations of the disconnection.

First, as shown in FIG. 25A, supposing that the data line D placed between a cross point of the data line D and the first connect portion 51 and a cross point among the data line D, the lower gate line $G_{down}$ and the left auxiliary gate line 1a of the right pixel PX3 is disconnected (a), so that a data signal cannot be transferred to a portion following the disconnected point. Here, the arrows shown in FIG. 25A represent the flow of the signal.

The cross point between the data line D located above the disconnect point a and the first connect portion 51 is shorted (b) using a laser, so that a data signal flows into the left auxiliary gate line 1a of the right pixel PX3. Then, the cross point among the left auxiliary gate line 1a, the lower gate line $G_{down}$ and the data line D is shorted (c), and then two points of the lower gate line $G_{down}$, respectively located at the left and right sides of the short point c, are disconnected (d and e). As a result, the data signal comes to flow into the data line D again.

That is, the data signal comes to flow along the data line D via the first connect portion 51 and the left auxiliary gate line 1a of the right pixel PX3. Here, the gate signal is applied to the right pixel PX3 via only the upper gate line $G_{up}$.

Next, referring to FIG. 25B, supposing that the data line D placed between a cross point of the left auxiliary gate line 1a of the right pixel PX3 and the lower gate line $G_{down}$ and a cross point of the first connect portion 51 of a pixel PX4 located below the pixel PX3 and the data line D is disconnected (a), so that a data signal cannot be transferred to a portion following the disconnected point. Here, the arrows shown in FIG. 25B represent the flow of the signal.

The data line D between the cross point of the lower gate line $G_{down}$ and the left auxiliary gate line 1a of the right pixel PX3, and the disconnect point (a), and the second connect portion 52 are shorted (b) using a laser, and the data line D located below the disconnect point (b) and the second connect portion 52 are shorted (c). Thus, the data signal flown along the data line D flows into the second connect portion 52 via the short point b, around the disconnect point a, and then comes to flow along the data line D via the short point c.

As a result, the data signal flown along the data line D comes to flow into the data line D via the second connect portion 52.

As a third repairing method of this fifth embodiment, the method of repairing a defect in that a gate electrode is lost or damaged will be described. For example, as shown in FIG. 25C, supposing that a gate electrode 2 of a pixel PX4 located below the pixel PX3 is lost (a).

When the gate electrode 2 is lost, a data signal cannot be transferred to the pixel electrode 10 of the pixel PX3 located above the pixel PX4, which is connected to the drain electrode 8 of pixel PX4. Thus, in order to continuously apply the data signal to the pixel electrode 10, a data line D? should be connected to the pixel electrode 10. For this purpose, the cross point between the data line D and the lower gate line $G_{down}$, which simultaneously corresponds to the cross point between the data line D and the left auxiliary gate line 1a of the right pixel PX3, is shorted (b) using a laser. Then, two points of the lower gate line $G_{down}$, located at the left and right of the short point b, are disconnected (d and e), and then the left auxiliary gate line 1a and the pixel electrode 10 are shorted (c). As a result, a data signal comes to flow into the pixel electrode 10 via the left auxiliary gate line 1a. Here, the gate signal is applied to the right pixel PX3 via only the upper gate line $G_{up}$.

Finally, referring to FIGS. 25C to 25F, repair methods of pixel defects are described. It is noted that the second connect portion is abbreviated for convenience.

FIG. 25D shows a simple method called off-type repair method. The pixel electrode 10 in a pixel PX3 is connected to the left auxiliary gate line 1a using a laser shot, thereby a scanning signal being applied to the pixel electrode 10.

This method has an advantage in that it is simple. However, since ITO of the pixel electrode 10 is in contact with aluminium of the left auxiliary gate line 1a, where ITO easily reacts with the aluminium, their contact would become to bad. Furthermore, since the scanning voltage is high, the properties of the liquid crystal molecules readily get worse.

FIG. 25E shows so called a D-type repair method. The drain electrode 8, connected to the defected pixel PX1, of a TFT is connected to a gate electrode 2 of the TFT, the gate electrode 2 is connected to the source electrode 7 of the TFT, and both the sides of the gate electrode 2 are cut. Then, an image signal from the data line D is transmitted to the pixel electrode 10.

This method has an advantage, compared with the off-type repair method, in that the properties of the liquid crystal molecules do not readily get worse. However, there are problems that the cutting process is added and that the broken pieces of lines produced during the cutting process pour onto the pixel electrode 10, thereby resulting in another pixel defect. In addition, repair is impossible when the TFT is cut out.

FIG. 25F shows another repair method. The data line D is short-circuited at point a with the first connect portion connected to the left auxiliary gate line 1a in the defected pixel PX3, and the left auxiliary gate line 1a and the pixel electrode are short-circuited at point b. Further, the points of the lower gate line $G_{down}$ on either side of the cross point of the left gate line 1a and the lower gate line $G_{down}$ in order to separating the left auxiliary gate line 1a from the lower gate line $G_{down}$. When required, the left auxiliary gate line 1a and the data line 10 is short-circuited at point c. As a result, the pixel electrode is applied with an image signal through the left auxiliary gate line 1a.

The sixth embodiment of the matrix-type display in accordance with the present invention is based on the basic layout shown in FIG. 8, where two auxiliary gate lines are separated from the upper gate line and two auxiliary gate lines are connected together with the down data line to form a closed region. Then, there are provided a bridge for connecting the connected auxiliary gate line and the gate line and a means for connecting the auxiliary gate line of the lower pixel and the lower gate line of the upper pixel to repair the defect such as the disconnection of a gate line, the short between the auxiliary gate line or the lower gate line and the pixel electrode, and the loss of a gate electrode.

Hereinafter, the sixth embodiment will be described in detail with reference to FIGS. 26, 27A to 27D.

Figure 26:
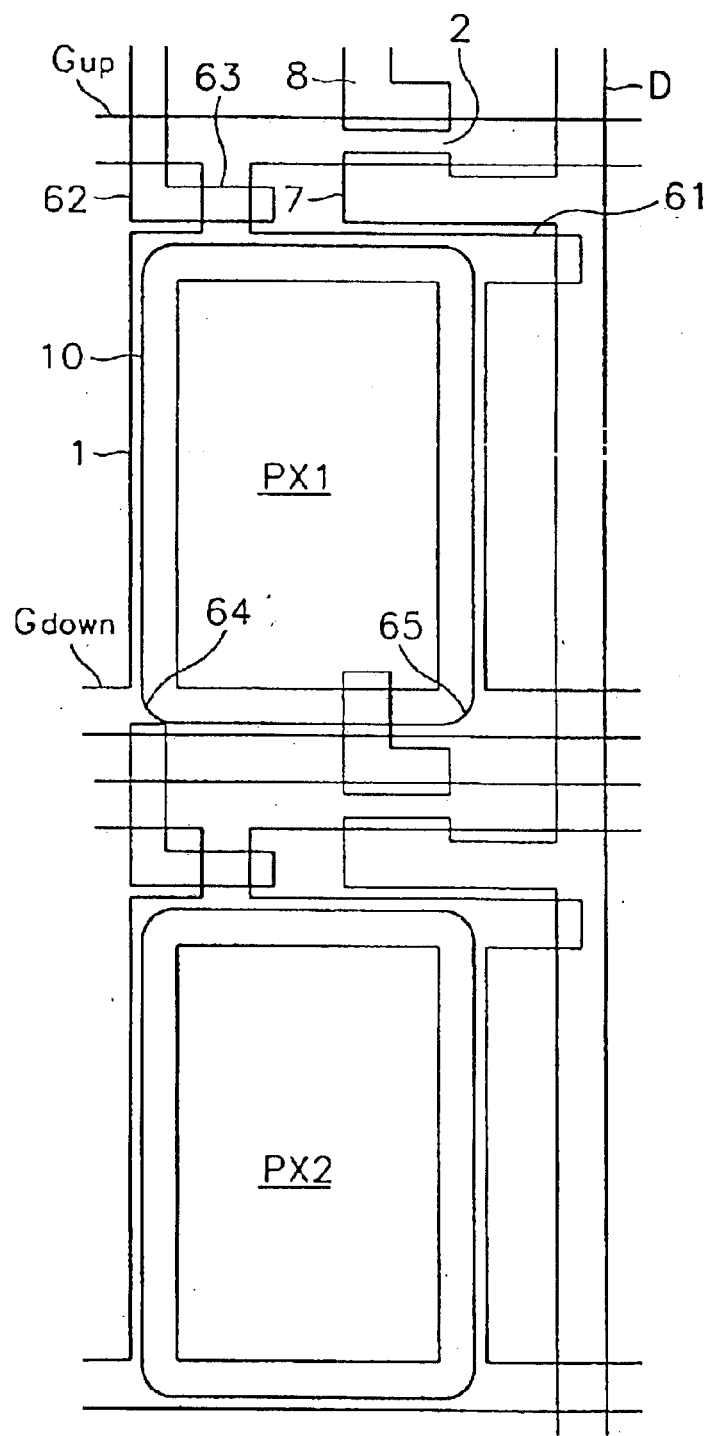
FIG. 26 shows a layout of a sixth embodiment of a TFT array panel of an LCD according to the present invention.

FIG. 26 is an arrangement plan of a pixel layout of a sixth embodiment of the TFT array panel of the LCD according to the present invention, and FIGS. 27A to 27D are diagrams of illustrating a method of repairing the disconnection of the data line of the LCD according to the sixth embodiment.

As shown in FIG. 26, in the substrate of the matrix-type LCD according to the sixth embodiment of the present invention, an upper gate line $G_{up}$ extends straightly in the horizontal direction, differently from the above described upper gate line $G_{up}$ which is bent with the horizontal and vertical portions. Also, the layout of the TFT is also different from that of the conventional LCD. A auxiliary gate line 1 is formed by connecting the above described left and right auxiliary gate lines and connected to the up first gate line $G_{up}$ via a bridge 63. Also, the auxiliary gate line 1 is connected to the lower gate line $G_{down}$ an at left and right connect points 64 and 65, thereby forming a closed region. A first connect portion 61 as a branch of the auxiliary gate line 1 extends to the data line D while being overlapped with the data line D, and a second connect portion 62 is formed while being overlapped with the lower gate line $G_{down}$ of pixel PX1 and the bridge 63 (here, the second connect portion 62 may overlap the auxiliary gate line 1 instead of the bridge 63), crossing the upper gate line $G_{up}$ of pixel PX2 located below the lower gate line $G_{down}$, of pixel PX1. Here, the data line D and the first connect portion 61 are formed while the gate oxide layer 3 and the gate insulating layer 4 of FIG. 4 are interposed therebetween. The second connect portion 62 is formed of material composing the data line D or the pixel electrode 10 while being separated from the up and lower gate lines $G_{up}$ of pixel PX2 and $G_{down}$ of pixel PX1 and the bridge 63, wherein the gate oxide layer 3 and the gate insulating layer 4 or the gate oxide layer 3, the gate insulating layer 4 and the passivation layer 9 are interposed between the second connect portion 62, and the up and lower gate lines $G_{up}$ and $G_{down}$ and the bridge 63. In addition, the upper gate line $G_{up}$ and the lower gate line $G_{down}$, and the left and right auxiliary gate lines 1a and 1b are overlapped at the pixel electrode 10 and the periphery of the pixel electrode 10 via an insulation layer, thereby forming a ring-type capacitor. The remaining portions are similar with those of the layouts shown in FIGS. 3 and 4.

The inferiority of the data line in the above LCD can be repaired using the following methods one of which is selected in accordance with the locations of the disconnection.

First, as shown in FIG. 27A, supposing that the data line D placed between a cross point of the data line D and the first connect portion 61 and a cross point of the data line D and the lower gate line $G_{down}$ is disconnected (a), so that a data signal cannot be transferred to a portion following the disconnected point. Here, the arrows shown in FIG. 27A represent the flow of the signal.

The cross point between the data line D located above the disconnect point a and the first connect portion 61 is shorted (b) using a laser so that a data signal flows into the left auxiliary gate line 1 and then comes to flow left and further right. Then, the data line D and the lower gate line $G_{down}$ are shorted (c) and then the bridge 63, the lower gate line $G_{down}$ located at the left of the left connect point 64 and the lower gate line $G_{down}$ located at the right of the short point c are disconnected (d, e, f). Thus, the data signal flows into the data line D again via the auxiliary gate line 1.

That is, the data signal comes to flow along the data line D again via the first connect portion 61, the auxiliary gate line 1 and the lower gate line $G_{down}$. Here, the gate signal of the pixel PX1 is transferred to a left pixel via only the upper gate line $G_{up}$.

Next, referring to FIG. 27B, supposing that the data line D placed between a cross point of the data line D and the down gate lint $G_{down}$ and a cross point of the data line D and the first connect portion 61 of a pixel PX2 located below the pixel PX1 is disconnected (a), so that a data signal cannot be transferred to a portion following the disconnected point. Here, the arrows shown in FIG. 27B represent the flow of the signal.

The cross point between the data line located above the data line D and the lower gate line $G_{down}$ is shorted (b), so that the signal flown along the data line D comes to flow the auxiliary gate line 1 around the disconnect point a. Then, the lower gate line $G_{down}$ located at the right of the short point b and the bridge 63 are disconnected (g and h), and the second connect portion 62 and the lower gate line $G_{down}$ are shorted (c), and the lower gate line $G_{down}$ located at the left of the short point c is disconnected (f). As a result, the data signal comes to flow along the second connect portion 62. Then, the second connect portion 62 and the bridge 63 of the pixel PX2 are shorted (d) using a laser, so that the data signal flows along the auxiliary gate line 1. Also, two points of the lower gate line $G_{down}$, located at the left of the left connect point 64 and the right of the right connect point 65, are disconnected (j and k) and the first connect portion 61 and the data line D are shorted (e). Thus, the flow of the data signal returns to the data line D.

That is, the data signal comes to flow along the data line D again via the lower gate line $G_{down}$, the second connect portion 62 of the pixel PX1, and the auxiliary gate line 1 of the pixel PX2. Here, the gate signal of the pixel PX1 is transferred to a right pixel via only the upper gate line $G_{up}$ and the gate signal of the pixel PX2 is also transferred to a right pixel via only the upper gate line $G_{up}$.

In the pixel layout according to the sixth preferred embodiment, when the pixel electrode 10 and the auxiliary gate line are shorted, and the gate electrode 2 of the transistor is damaged or lost, the defect can be repaired.

Figure 27C:
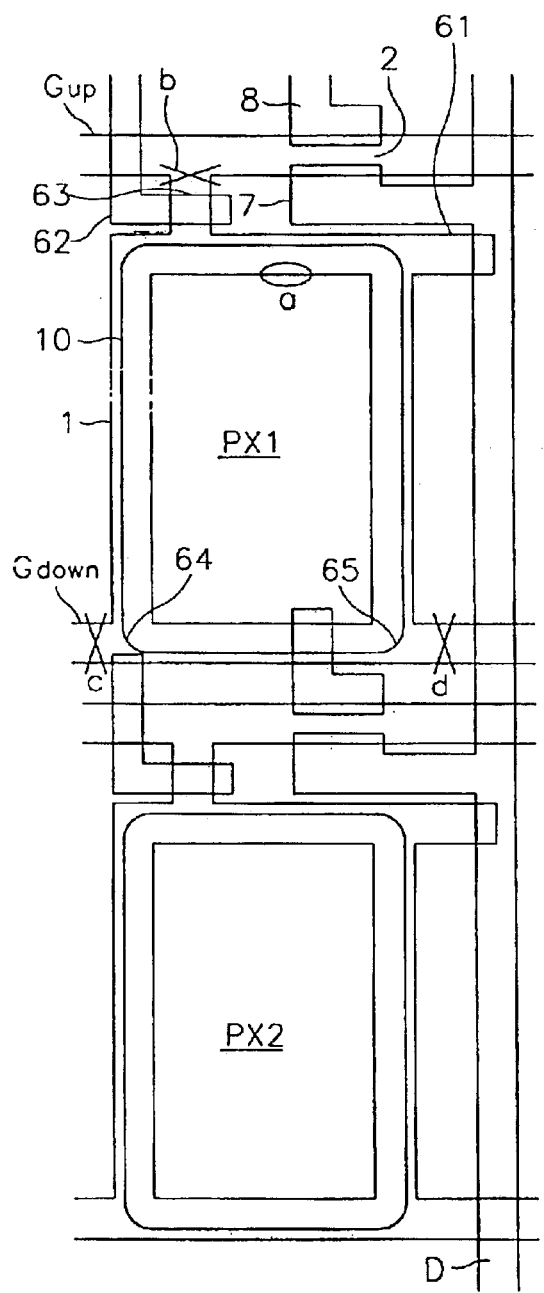

As shown in FIG. 27C, supposing that the auxiliary gate line 1 and the pixel electrode 10 are shorted (a). In this case, the bridge 63 which connects the auxiliary gate line 1 and the upper gate line $G_{up}$, and two points of the lower gate line $G_{down}$, located at the left of the left connect point 64 and the right of the right connect point 65, are disconnected (b, c and d) to separate the auxiliary gate line 1 and the lower gate line $G_{down}$ connected to the auxiliary gate line 1 from the surroundings thereof. As a result, the gate signal flows along only the upper gate line $G_{up}$.

Figure 27D:
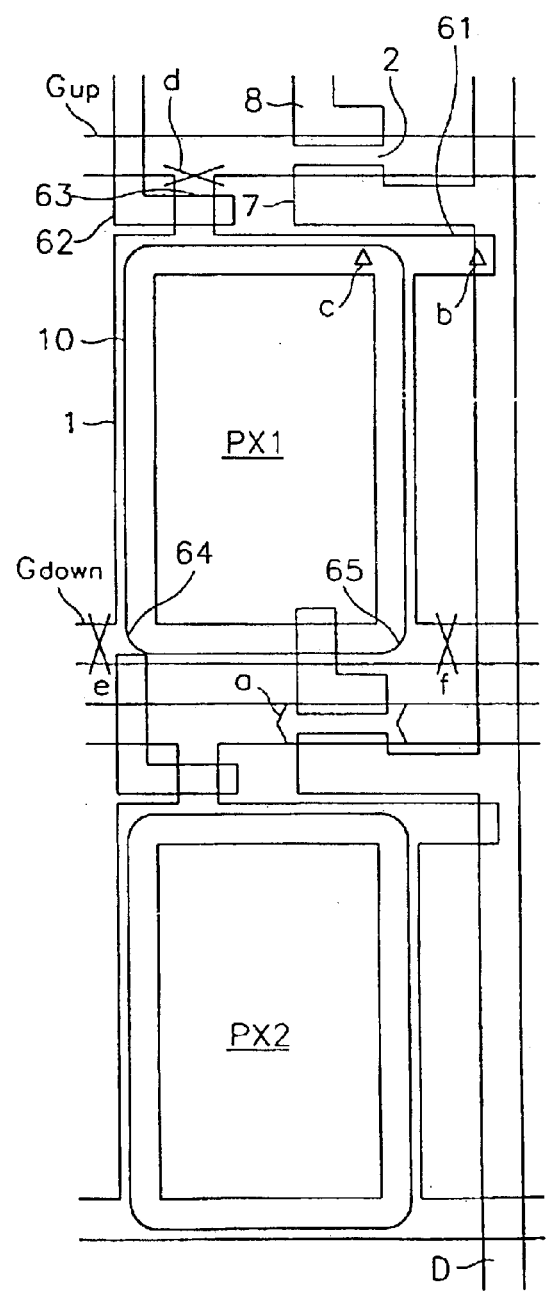

Also, as shown in FIG. 27D, supposing that the gate electrode 2 of the pixel PX2 is damaged or lost. In this case, the data line D and the first connect portion 61 are shorted (b) using a laser and the auxiliary gate line 1 and the pixel electrode 10 are shorted (c) to flow the data signal into the pixel electrode 10. Then, the bridge 63 and two points of the lower gate line $G_{down}$, located at the left of the left connect point 64 and at the right of the right connect point 65, are disconnected (d, e and f) to prevent the data signal and the gate signal from being mixed each other.

Figure 28:
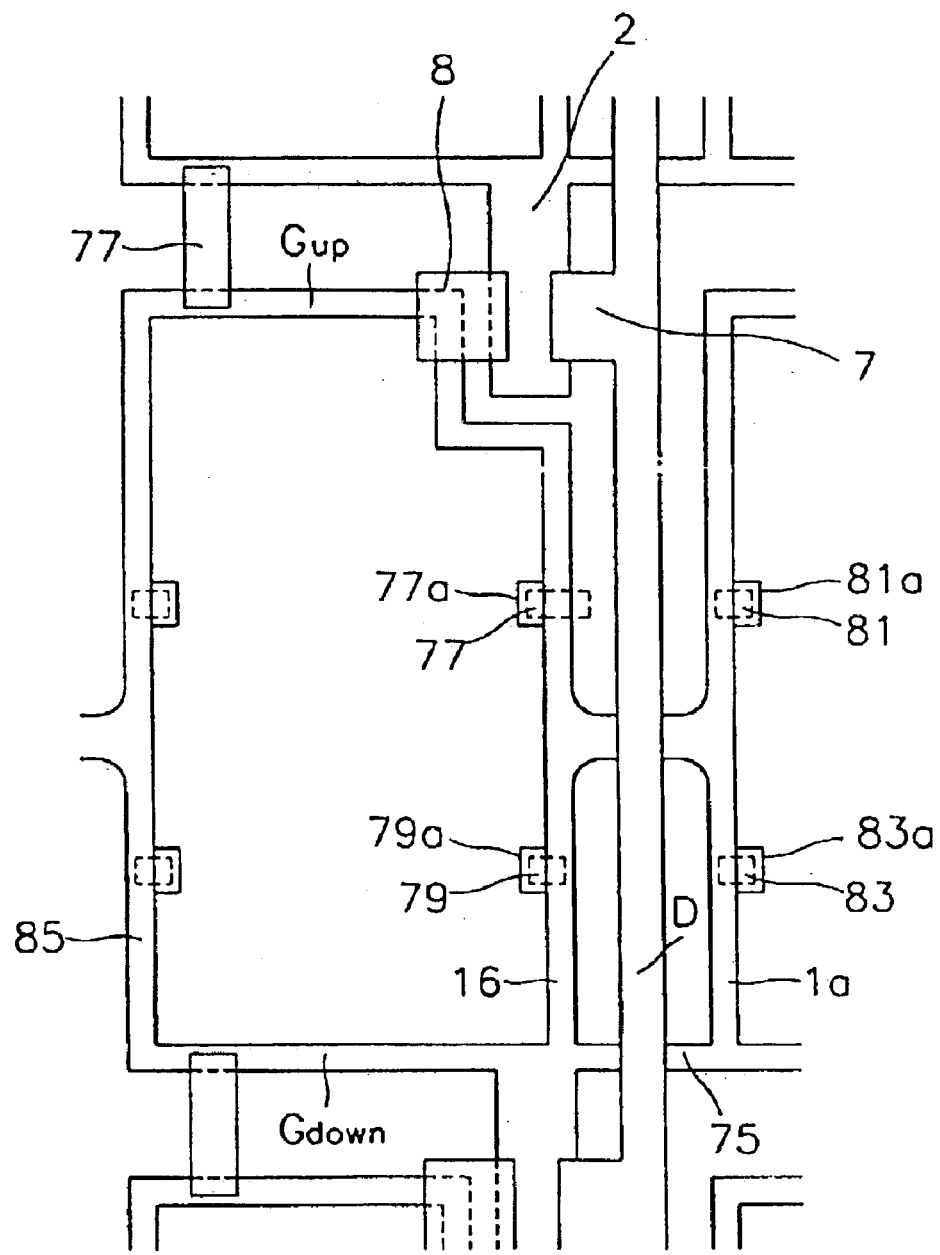
FIG. 28 shows a layout of a seventh embodiment of a TFT array panel of an LCD according to the present invention.
Figure 29A:
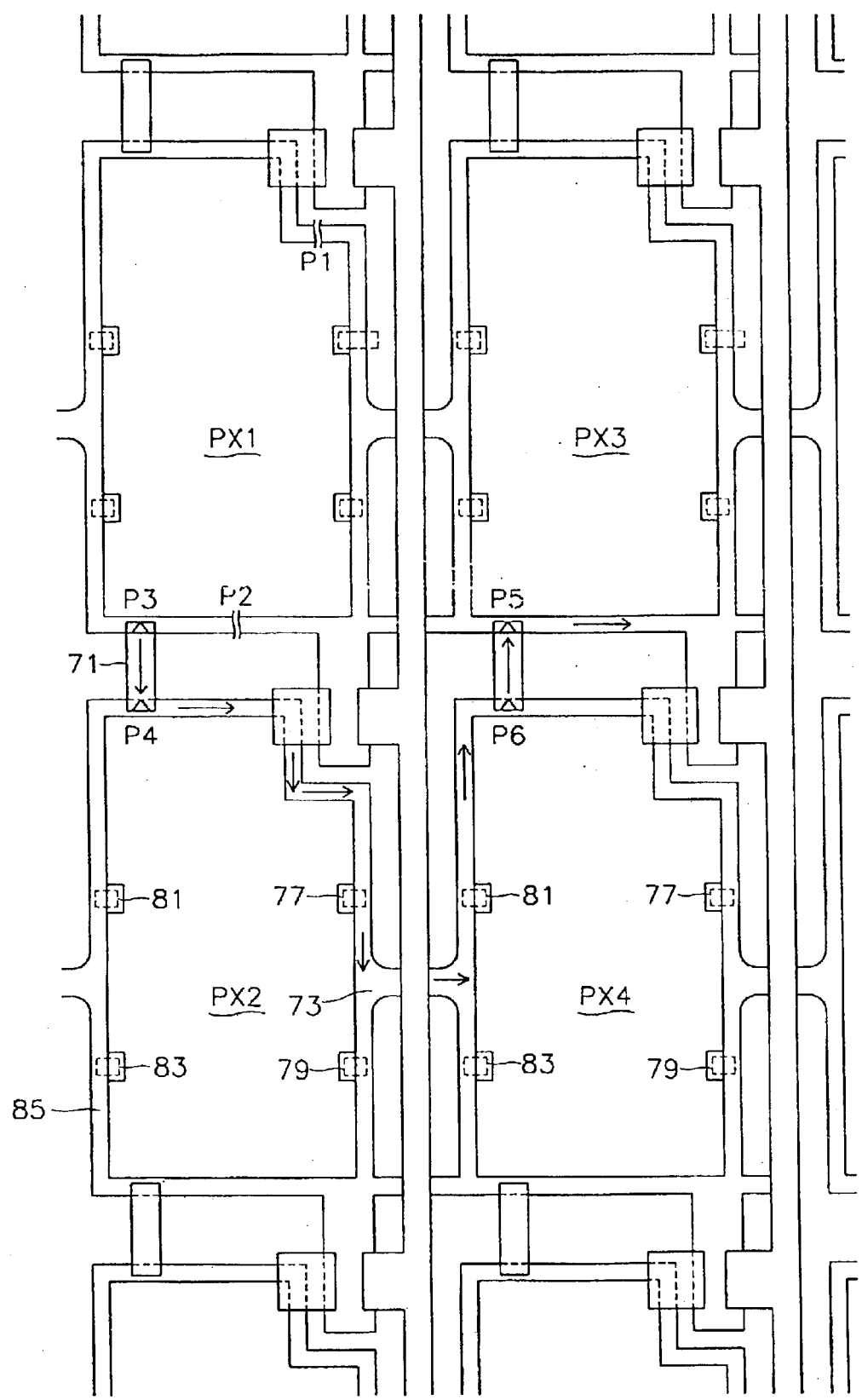
FIGS. 29A to 29C illustrates methods for repairing defects of the gate line and data line of the TFT array panel of the LCD according to the present invention.
Figure 29B:
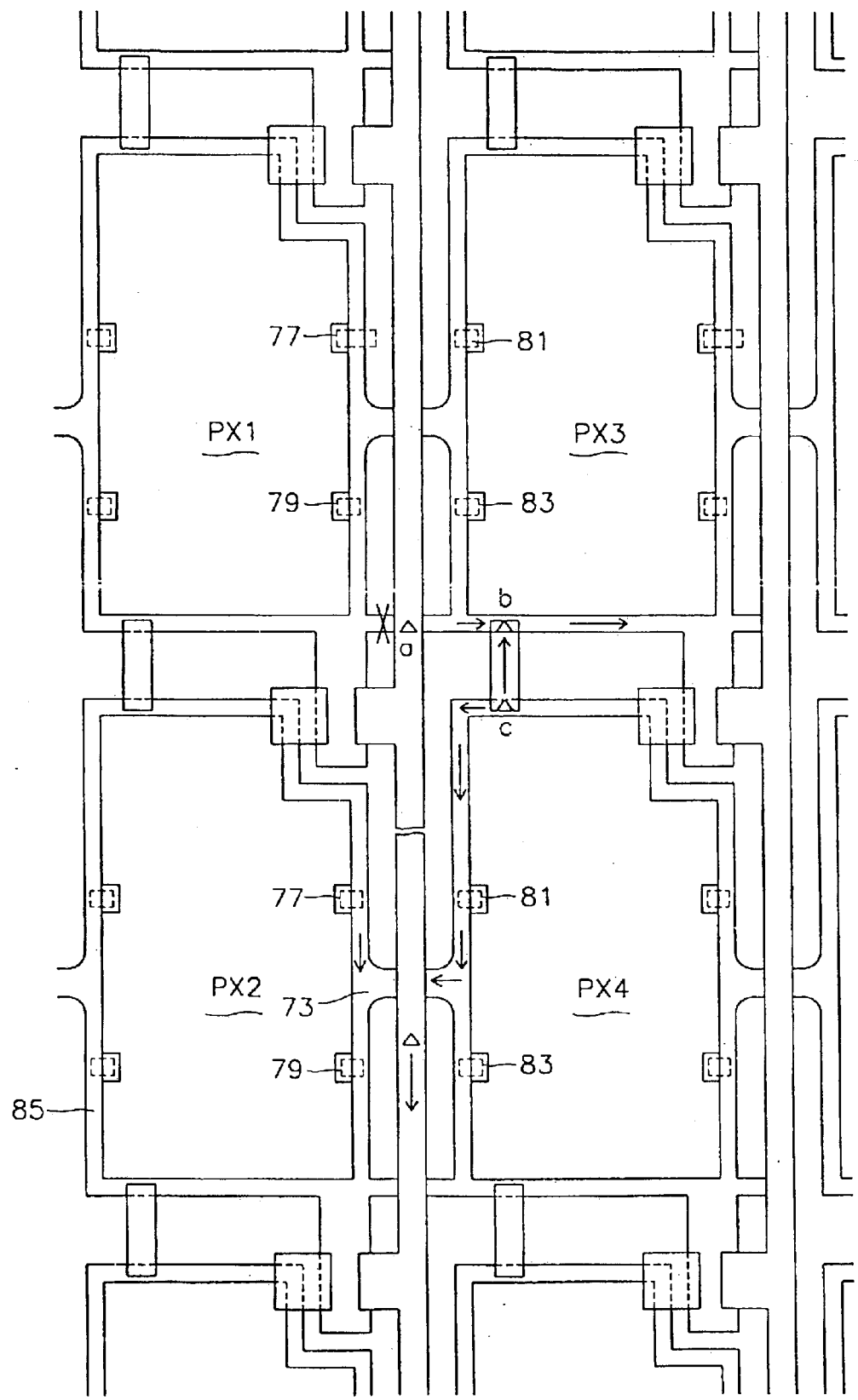
Figure 29C:
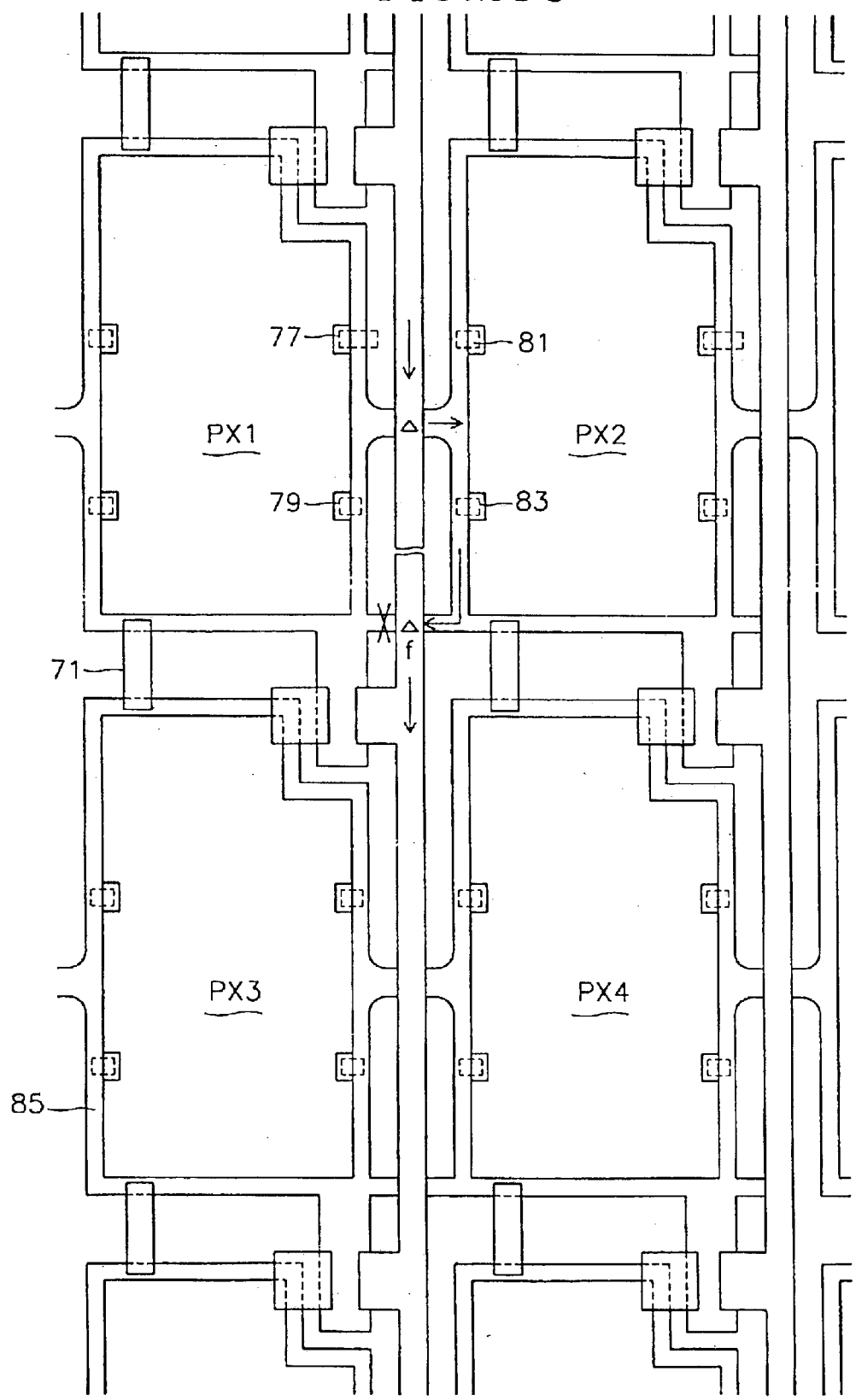

FIG. 28 is an arrangement plan of a seventh embodiment of the TFT array panel of the LCD according to the present invention, and FIGS. 29A to 29C are diagrams of illustrating a method of repairing the disconnection of the gate line and data line of the TFT array panel of the LCD according to the present invention.

As shown in FIG. 28, the TFT array panel of the LCD includes a conductive pad 71 for connecting the up and lower gate lines of the adjacent pixels which are in the same pixel column, a first connect portion 73 as a portion extended from an auxiliary gate line, for connecting the auxiliary gate lines of the adjacent pixels which are in the same pixel row, and a second connect portion 75 as a portion extended from the lower gate line, for connecting the lower gate lines of the adjacent left and right pixels, thereby repairing the defects of the gate line and data line. However, differently from the above-described LCDs, the upper gate line of this embodiment is comprised of a first horizontal portion and a first vertical portion without a second vertical portion. Also, a source 7 of the transistor is connected to the data line D, a drain is connected to the lower gate line of the upper pixel and a pixel electrode. Also, the up and lower gate lines, and the right and left auxiliary gate lines partially cross with the pixel electrode along the periphery of the pixel electrode via an insulation layer, thereby forming a first electrode 85 as an additional capacitance. Also, cutting portions 77, 79, 81 and 83 and protection grooves 77a, 79a, 81a and 83a are formed at the periphery of the first connect portion, wherein the cutting portions are for disconnecting the first electrode as the additional capacitance so as to prevent the disconnection of the gate line when the conductive pad is connected to the gate line adjacent to the additional capacitance, and the protection grooves are for preventing the damage of the pixel electrode when the cutting portions are cut.

First, a method of repairing the inferiority of the gate line will be described with reference to FIG. 29A.

Supposing that the gate line of the pixel PX1 is disconnected at two points P1 and P2, two conductive pads adjacent to the pixel having the defects are shorted (P3, P4, P5 and P6), thereby connecting the lower gate line of the upper pixels PX1 and PX3 and the upper gate line of the lower pixels PX2 and PX4. Thus, a gate signal whose flowing is blocked by the P1 and P2 comes to flow along the upper gate line, right auxiliary gate line and the first connect portion of the pixel 2 via P3 and P4 of the conductive pad, and then be transferred to the lower gate line of the pixel PX3 via the left auxiliary gate line of the pixel PX4, and P6 and P5 of the conductive pad.

Then, a method of repairing the inferiority of the data line will be described with reference to FIG. 29B.

As shown in FIG. 29B, supposing that the data line between the upper gate line and the first connect portion 73 is disconnected, a cross point of the lower gate line of the pixel PX1 and the data line is shorted (a) using a laser and then the lower gate line located at the left of the short point a is disconnected. Thus, the signal of the data line passes the short point a to flow along the lower gate line of the pixel PX3. Then, both ends of the conductive pad connecting the gate lines of the pixels PX3 and PX4 are shorted (b and c) to transfer the data signal to the up gate of the pixel PX4. Then, a cross point of the first connect portion which connects the pixels PX2 and PX4, and the data line is shorted (d) using a laser, and the cutting portions 77 and 79 of the pixel PX2, and the cutting portion 83 of the pixel PX4 are then disconnected, so that the data signal of the pixel PX4 comes to return to the data line. Here, the lower gate line of the pixel PX1 is disconnected. However, the signal is transferred to the lower gate line of the pixel PX3 via the right auxiliary gate line of the pixel PX1, the first connect portion of the pixels PX1 and PX3, and the left auxiliary gate line of the pixel PX3, by disconnecting the cutting portion 77 of the pixel PX1 and the cutting portion 81 of the pixel PX3.

FIG. 29C is a diagram of illustrating a method of repairing a defect of the data line between the first and second connect portions which connect the gate lines of the adjacent left and right pixels.

The data line on the first connect portion of the pixels PX1 and PX3 and the data line on the second connect portion are shorted (e and f) using a laser, and the cutting portions 77 and 79 of the pixel PX1, the cutting portion 81 of the pixel PX3 and the lower gate line located at the left of the second connect portion are then disconnected. As a result, the data signal returns to the data line via the first connect portion, the left auxiliary gate line and the lower gate line of the pixel PX3, and the second connect portion. Here, the lower gate line of the pixel PX1 is disconnected. However, if both ends of the conductive pad 71 connecting the pixels PX1 and PX2, and both ends of the pixels PX1 and PX3 are shorted, and the cutting portions 79 and 83 of the pixels PX2 and PX4 are disconnected, the signal of the gate line comes to be transferred to the down gate of the pixel PX3.

Finally, the two embodiments of repairing pixel defects are described.

Figure 30:
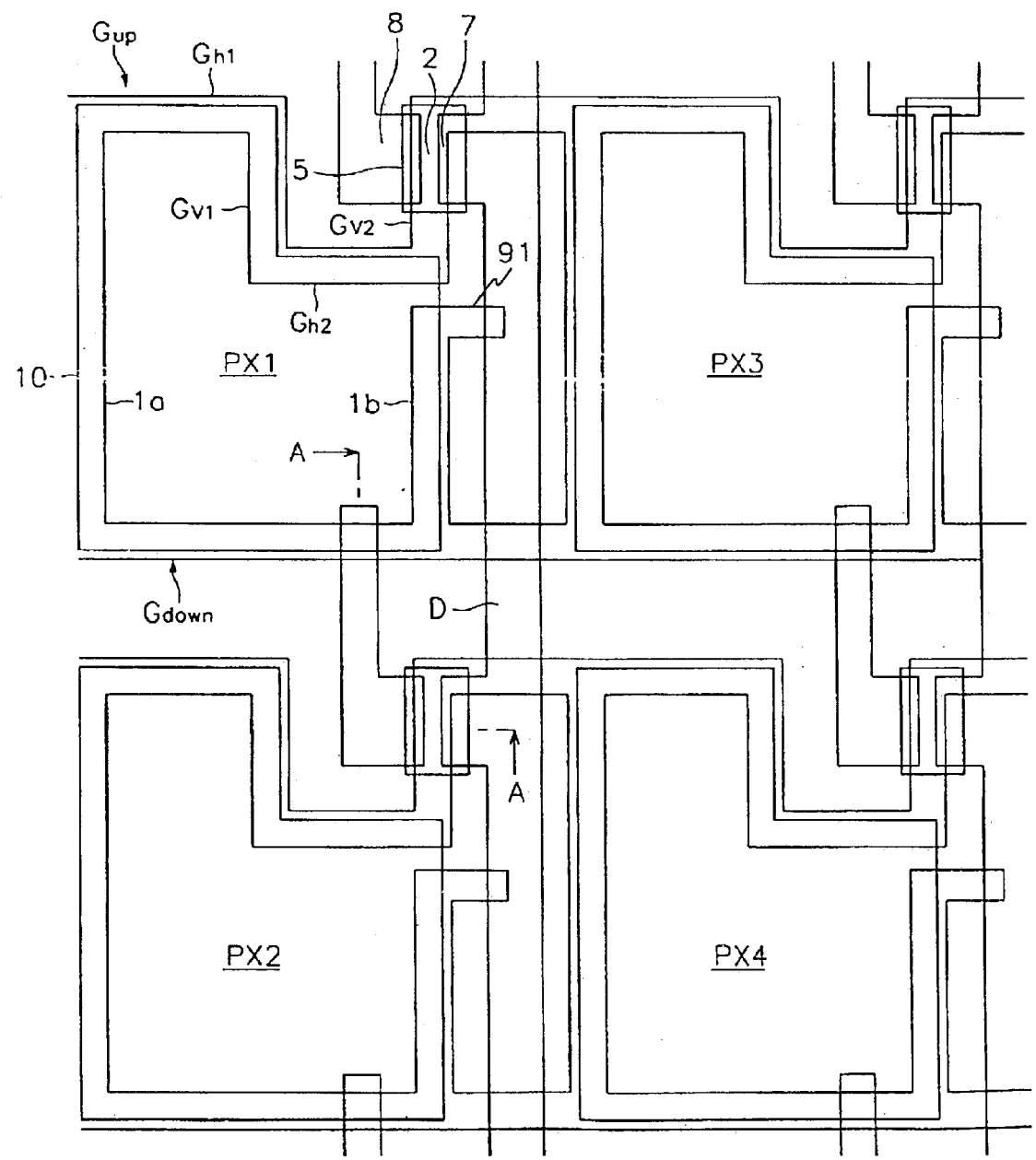
FIG. 30 shows a layout of a TFT array panel according to an eighth embodiment of the present invention.

FIG. 30 shows a pixel layout of the TFT array panel of an LCD according to the eighth embodiment of the present invention.

The right auxiliary gate line 1b is separated from the upper gate line $G_{up}$, and a connect portion 91 formed by bending the upper end of the right auxiliary gate line 1b to the right is overlapped with the data line D. The gate oxide 3 and the gate insulating layer 4 shown in FIG. 4 lies between the data line D and the connect portion. The remaining structure is similar to that in FIGS. 3 and 4.

When a pixel defect is produced, the connect portion 91 and the data line D, and the right auxiliary gate line 1b and the pixel electrode 10 are short-circuited respectively at the points a and b. Furthermore, the points of the lower gate line $G_{down}$ on either side of the cross point of the right gate line 1b and the lower gate line $G_{down}$ in order to separating the right auxiliary gate line 1b from the lower gate line $G_{down}$. As a result, the pixel electrode 10 is applied with an image signal through the right auxiliary gate line 1b.

Figure 32:
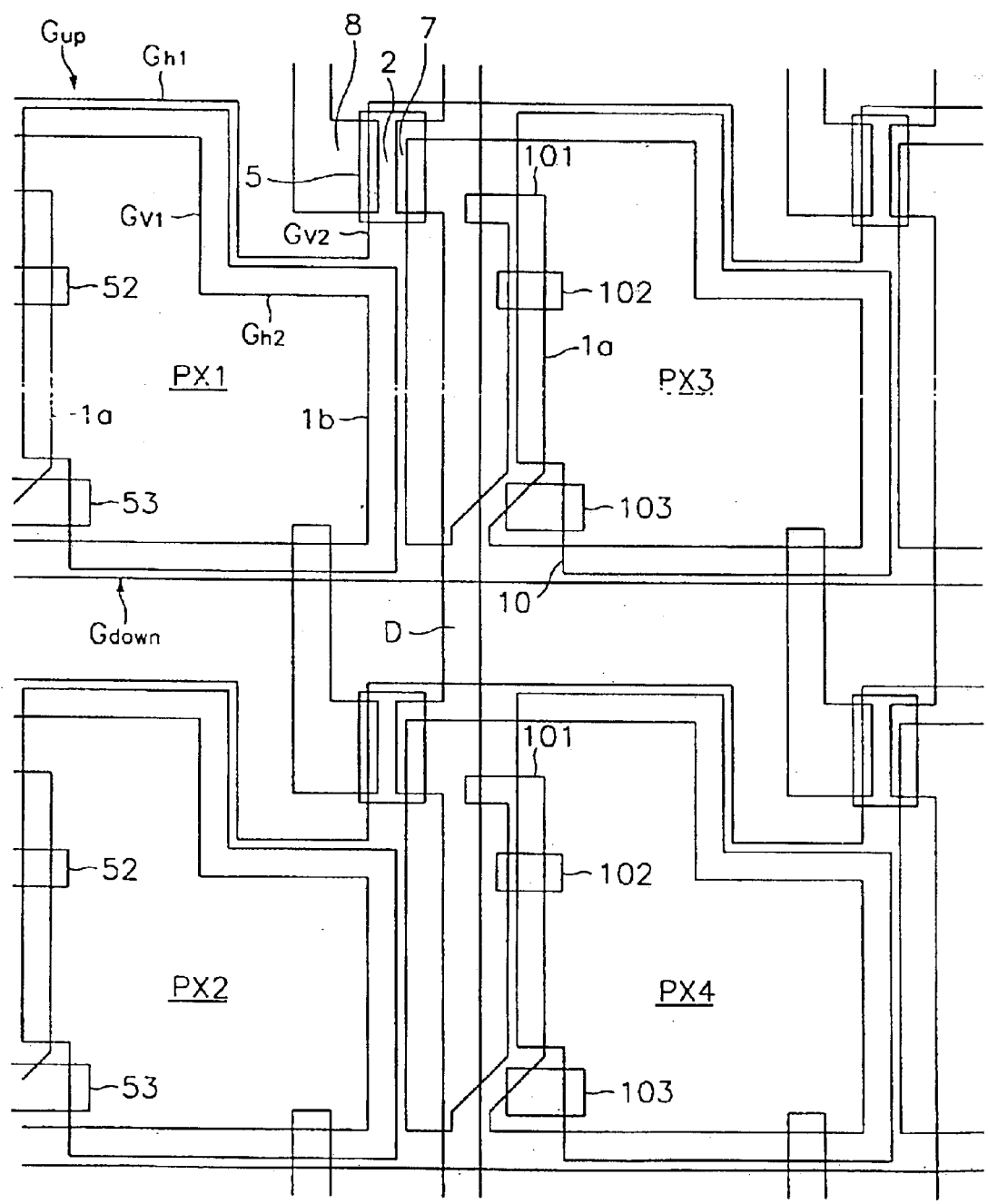
FIG. 32 shows a layout of a TFT array panel according to an ninth embodiment of the present invention.
Figure 33A:
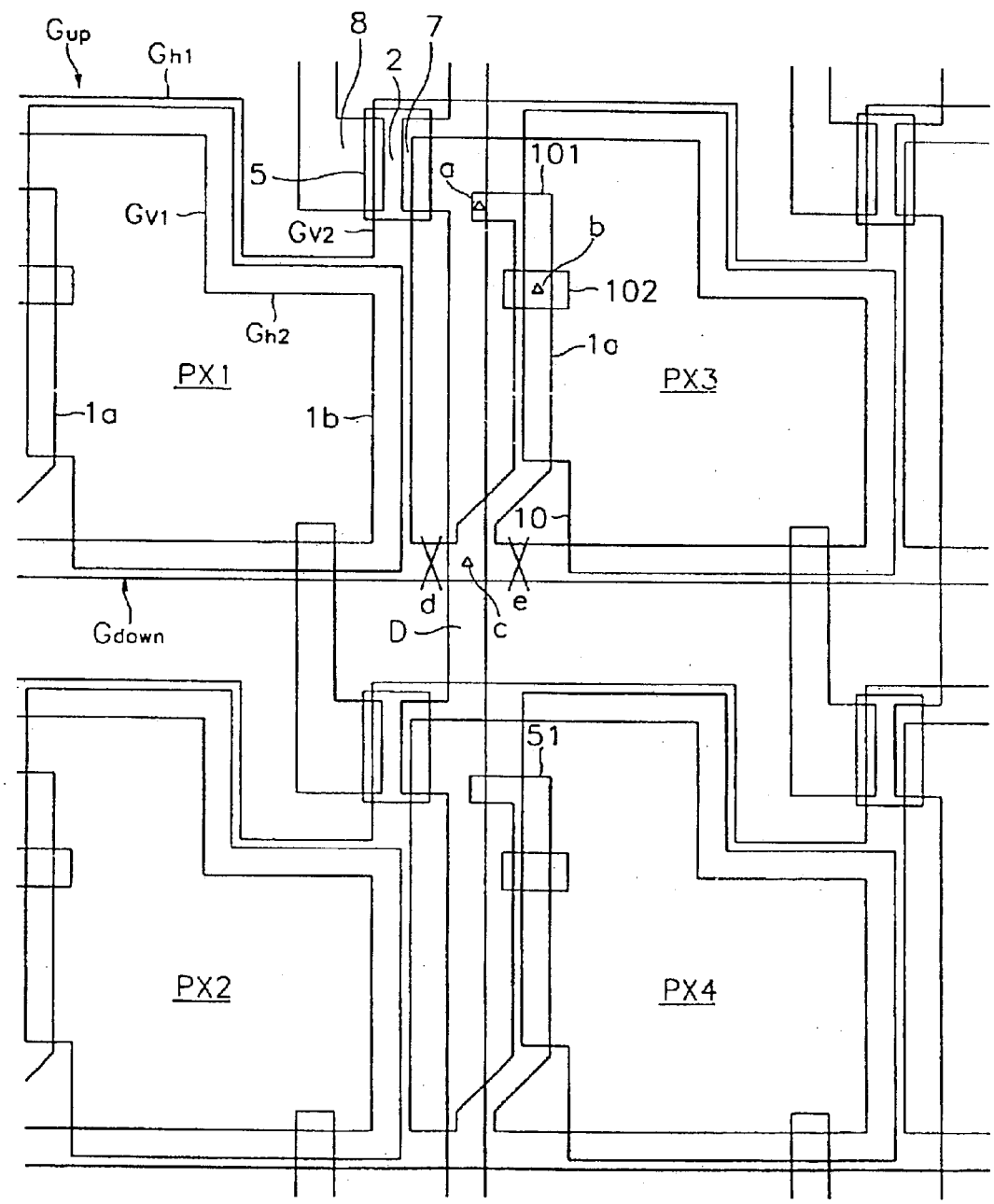
FIGS. 33A and 33B illustrate methods for repairing pixel defects of the TFT array panel according to the ninth embodiment of the present invention.
Figure 33B:
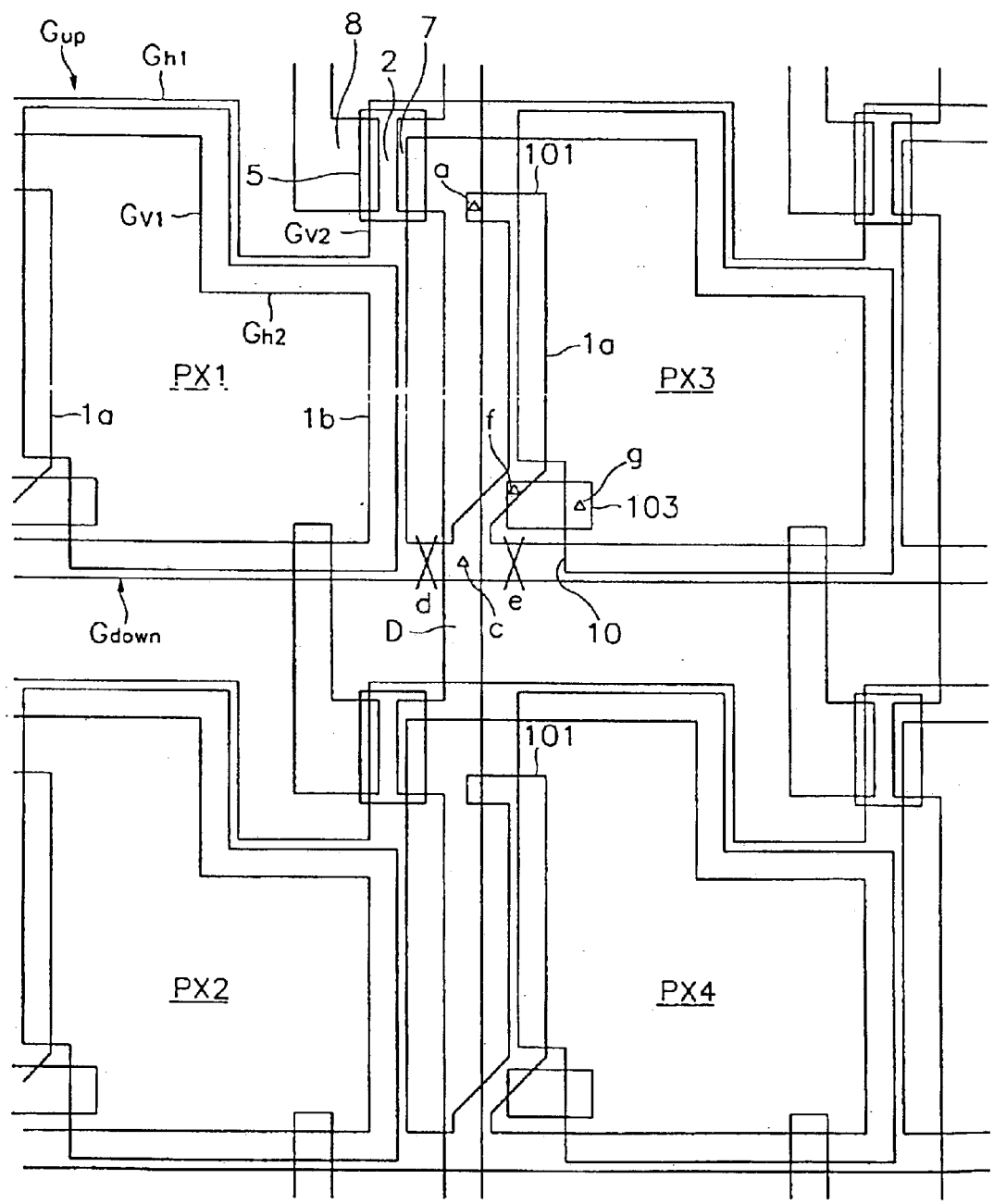

FIG. 32 shows a pixel layout of the TFT array panel of an LCD according to the ninth embodiment of the present invention.

The TFT array panel according to this embodiment has similar structure to that of the panel depicted in FIGS. 25C to 25F. However, there is a difference in that a second connect portion 102 or 103 made of the data line material is formed between the left auxiliary gate line 1a and the pixel electrode 10 in this embodiment. When viewing the cross-section, the gate insulating layer 4 in FIG. 4 lies between the left auxiliary gate line 1a and the second connect portion 102, and the passivation layer 9 in FIG. 4 lies between the second connect portion 102 and the pixel electrode 10. The position of the second connect portion 102 or 103 is variable. For example, the reference numeral 102 represents the case that the left auxiliary gate line 1a, the second connect portion 102 and the pixel electrode 10 is overlapped at one point. The other case represented by the reference numeral 103 is that the overlapped point of the left auxiliary gate line 1a and the second connect portion 102 is different from that of the second connect portion 102 and the pixel electrode 10.

The repair method according to this invention is essentially similar to that shown in FIG. 25F. However, it is noted that the left auxiliary gate line 1a and the pixel electrode 10 are short-circuited at the position of the second connect portion 102.

Figure 31:
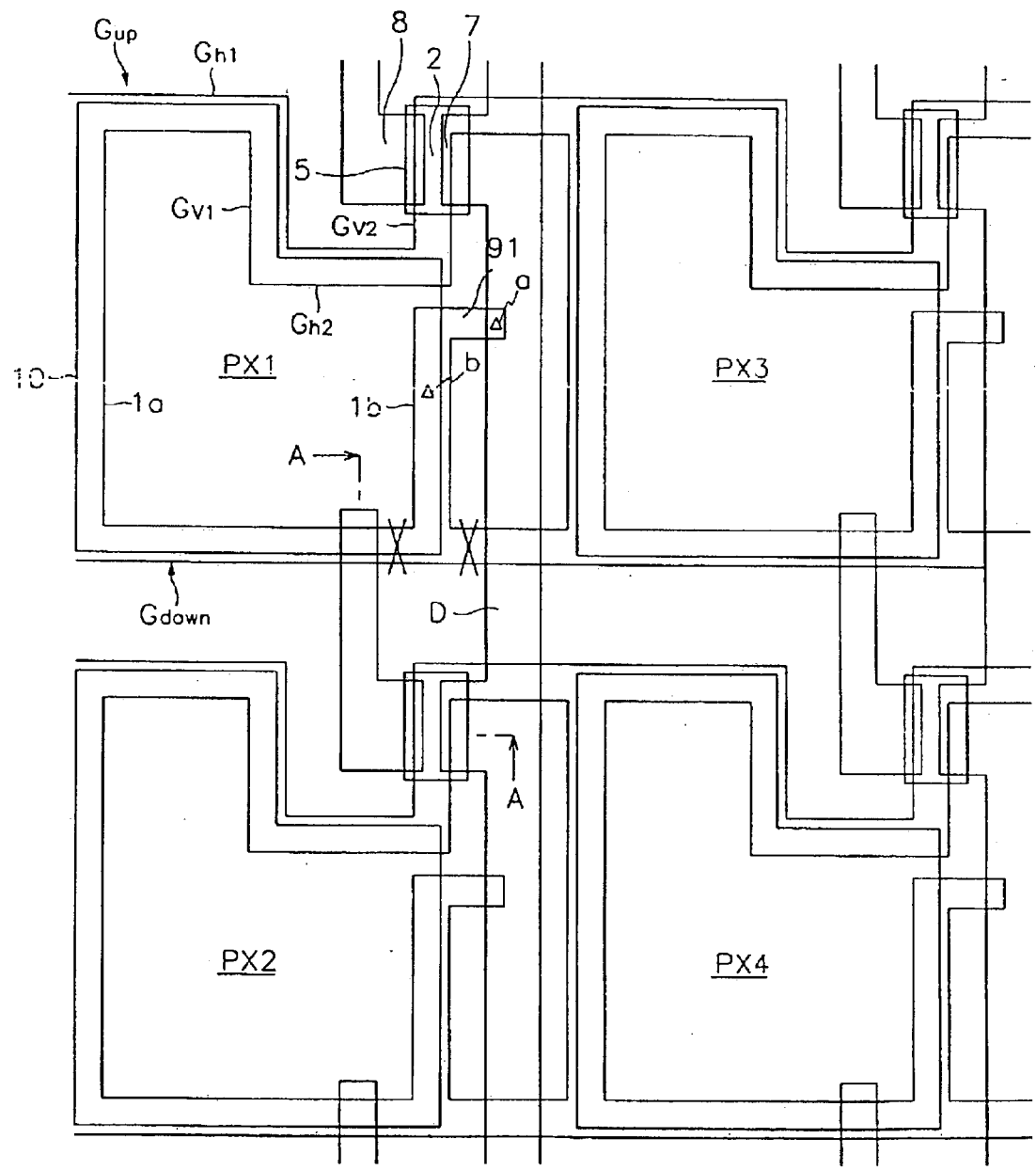
FIG. 31 illustrates a method for repairing a pixel defect of the TFT array panel according to the eighth embodiment of the present invention.

When the left auxiliary gate line 1a, the second connect portion 102 and the pixel electrode 10 is overlapped at one point, the pixel electrode 10 is connected to the left auxiliary gate line 1a through the second connect portion 102 using one laser shot. However, in case that the overlapped point of the left auxiliary gate line 1a and the second connect portion 102 is different from that of the second connect portion 102 and the pixel electrode 10, the laser is shot at two overlapped point, thereby connecting the left auxiliary gate line 1a and the second connect portion 102, and the second connect portion 102 and the pixel electrode 10, respectively. As a result, since the ITO of the pixel electrode 10 and the aluminum of the second connect portion 102 is not in direct contact with each other, the repair is more effective than that in FIGS. 25F and 31.

As described above, the up and lower gate lines cross with the data line at above three points together with the auxiliary gate line according to the pixel layouts of the TFT array panel of the first to sixth preferred embodiments while the pixel layout of the TFT array panel of the seventh preferred embodiment has only two cross points. Also, when the data line has defects, the cross points are shorted using a laser and the auxiliary signal line is separated from the up or lower gate line, thereby repairing the defective data line. In addition, repair method of pixel defects by supplying a scanning signal or an image signal are described in the fourth, the fifth, the eight and the ninth embodiments.

Therefore, using repair methods and structures of the matrix-type LCD according to the present invention, nearly all disconnection of the signal lines is effectively repaired while preventing decrease of an aperture ratio and delay of RC time, and the defects caused by short between pixel electrodes and signal lines and by loss of electrodes of switching elements, as well as a pixel defect, can be repaired by a pixel unit.

What is claimed is:

1. A matrix-type display, comprising:
    a first signal line and a second signal line electrically connected to each other;
    a third signal line intersecting the first and the second signal lines and being insulated from the first and the second signal lines;
    a switching element electrically connected to one of the first and the second signal lines and connected to the third signal line;
    a first auxiliary member placed adjacent to the third signal line; and
    a pixel electrode located substantially between the first and the second signal lines,
    wherein at least one intersecting member intersects the third signal line at a first intersection and a second intersection and forms a first path between the first intersection and the second intersection, and the switching element is not disposed on the path, and wherein said at least one intersecting member comprises at least one of: (1) the second signal line; and (2) the first auxiliary member.

2. The matrix-type display of claim 1, wherein the at least one intersecting member comprises the first auxiliary member and one selected from the group consisting of the second signal line and a second auxiliary member, and the first path includes a connection or an overlap between the first auxiliary member and the one selected from the group consisting of the second signal line and the second auxiliary member.

3. The matrix-type display of claim 1, wherein the first auxiliary member is connected to at least one of the first signal line and the second signal line.

4. The matrix-type display of claim 3, wherein the first auxiliary member is connected to the first and the second signal lines.

5. The matrix-type display of claim 1, wherein the first auxiliary member is disconnected from the first and the second signal lines.

6. The matrix-type display of claim 5, wherein the first auxiliary member includes the same layer as the first and the second signal lines.

7. The matrix-type display of claim 1, wherein the third signal line has a connect portion extending to the second intersection.

8. The matrix-type display of claim 1, wherein the first signal line intersects the third signal line at a third intersection and the first signal line and the at least one of the intersecting member form a second path between the first intersection and the third intersection.

* * * * *